(12) United States Patent
Mu et al.

(10) Patent No.: US 9,830,238 B2
(45) Date of Patent: Nov. 28, 2017

(54) TECHNIQUES FOR MAINTAINING COMMUNICATIONS SESSIONS AMONG NODES IN A STORAGE CLUSTER SYSTEM

(71) Applicant: NETAPP, INC., Sunnyvale, CA (US)

(72) Inventors: Paul Yuedong Mu, Sunnyvale, CA (US); Manoj Sundararajan, Sunnyvale, CA (US); Paul Ngan, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 139 days.

(21) Appl. No.: 14/473,779

(22) Filed: Aug. 29, 2014

(65) Prior Publication Data

US 2016/0062856 A1 Mar. 3, 2016

(51) Int. Cl.
*G06F 11/00* (2006.01)
*G06F 11/20* (2006.01)
*G06F 11/14* (2006.01)

(52) U.S. Cl.
CPC ...... *G06F 11/2092* (2013.01); *G06F 11/2071* (2013.01); *G06F 11/1443* (2013.01); *G06F 11/2005* (2013.01); *G06F 11/2097* (2013.01)

(58) Field of Classification Search
CPC ........... G06F 11/1451; G06F 2201/805; G06F 11/2028; G06F 11/2092; G06F 11/2071; G06F 11/1443
See application file for complete search history.

(56) References Cited

U.S. PATENT DOCUMENTS

| | | | | |
|---|---|---|---|---|
| 8,639,770 B1 * | 1/2014 | Raley | ............... | G06F 17/30132 709/216 |
| 8,862,928 B2 * | 10/2014 | Xavier | ............... | G06F 11/2092 714/4.11 |
| 9,612,923 B1 * | 4/2017 | Shaw | ................. | G06F 11/2002 |
| 2006/0259815 A1 * | 11/2006 | Graham | ............. | G06F 11/1662 714/11 |
| 2011/0007739 A1 * | 1/2011 | Diab | .................... | H04L 12/413 370/389 |
| 2011/0126059 A1 * | 5/2011 | Klein | .................. | G06F 11/3006 714/47.1 |
| 2012/0131126 A1 * | 5/2012 | Bandyopadhyay | . | H04L 67/1097 709/213 |

* cited by examiner

Primary Examiner — Bryce Bonzo
Assistant Examiner — Jonathan Gibson
(74) Attorney, Agent, or Firm — Cooper Legal Group, LLC

(57) ABSTRACT

Various embodiments are generally directed to techniques for preparing to respond to failures in performing a data access command to modify client device data in a storage cluster system. An apparatus may include a processor component of a first node coupled to a first storage device; an access component to perform a command on the first storage device; a replication component to exchange a replica of the command with the second node via a communications session formed between the first and second nodes to enable at least a partially parallel performance of the command by the first and second nodes; and a multipath component to change a state of the communications session from inactive to active to enable the exchange of the replica based on an indication of a failure within a third node that precludes performance of the command by the third node. Other embodiments are described and claimed.

30 Claims, 23 Drawing Sheets

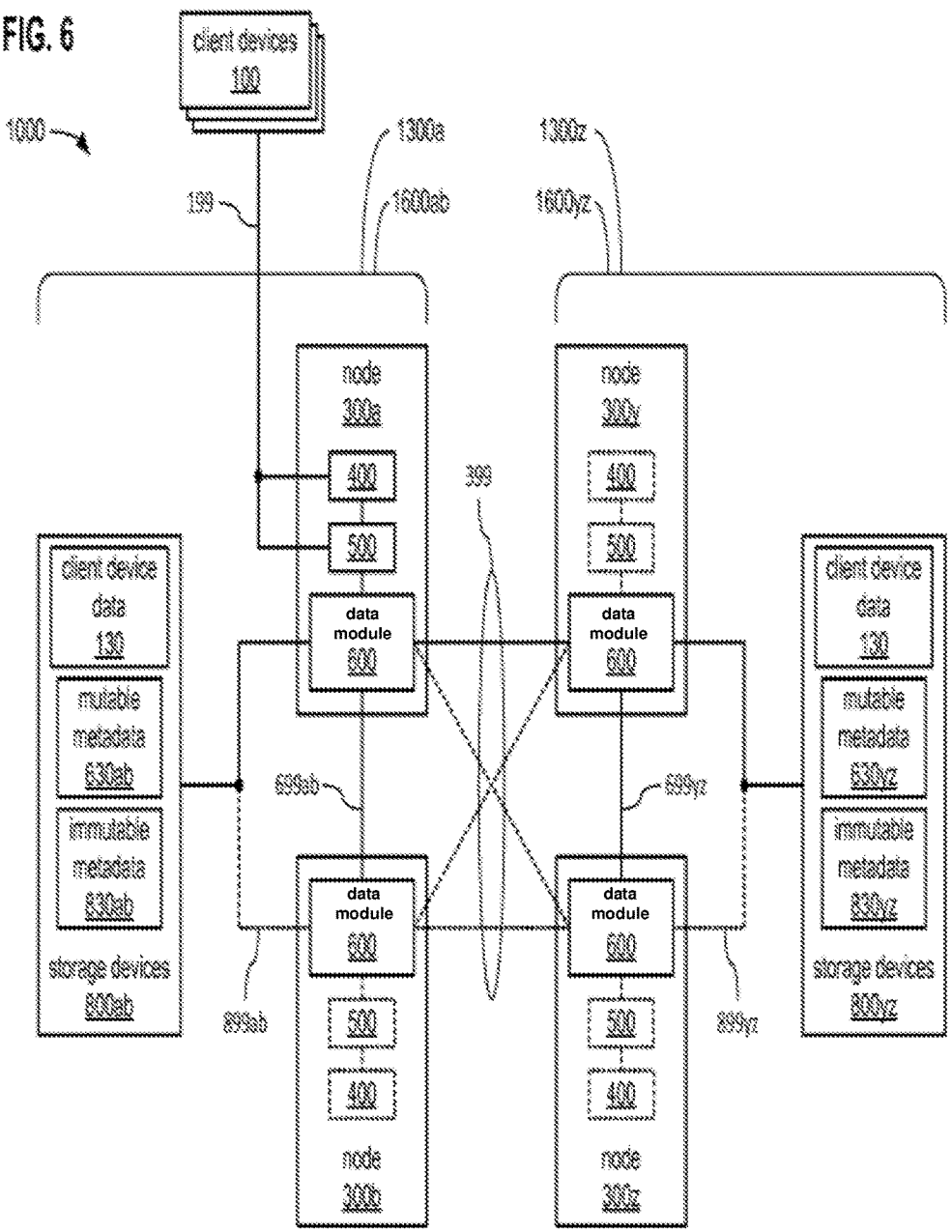

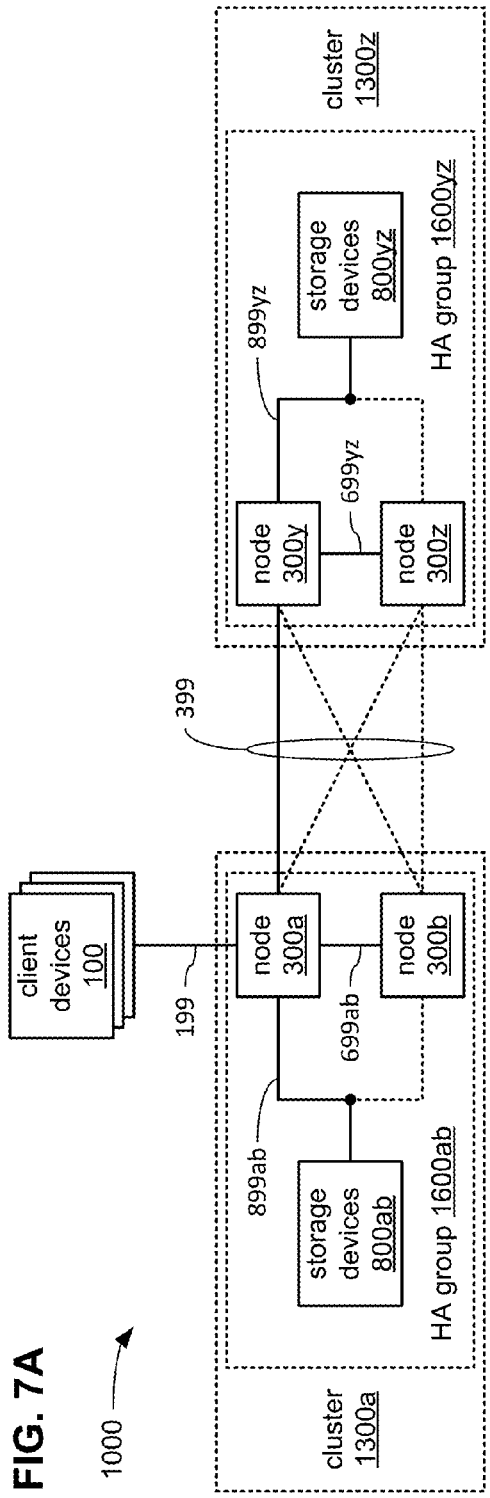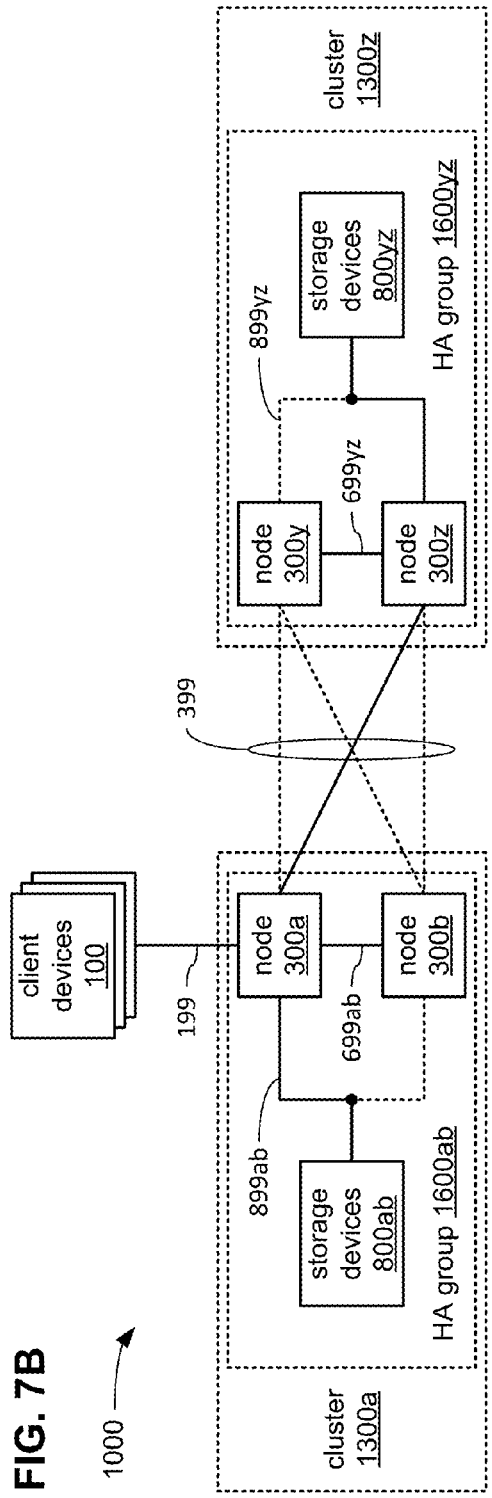

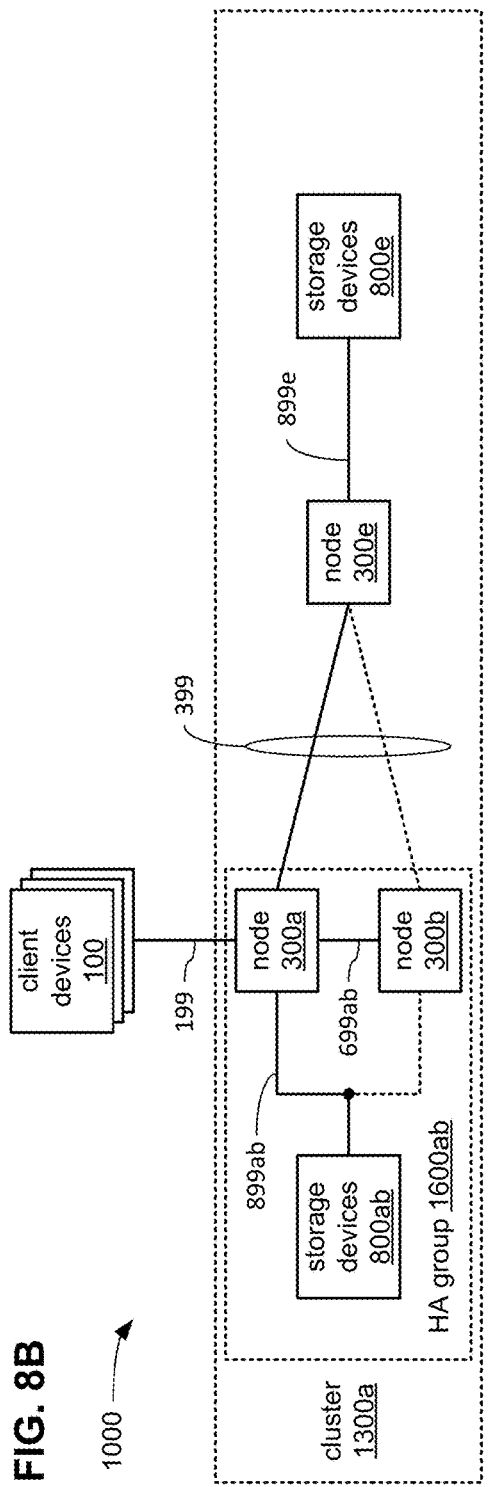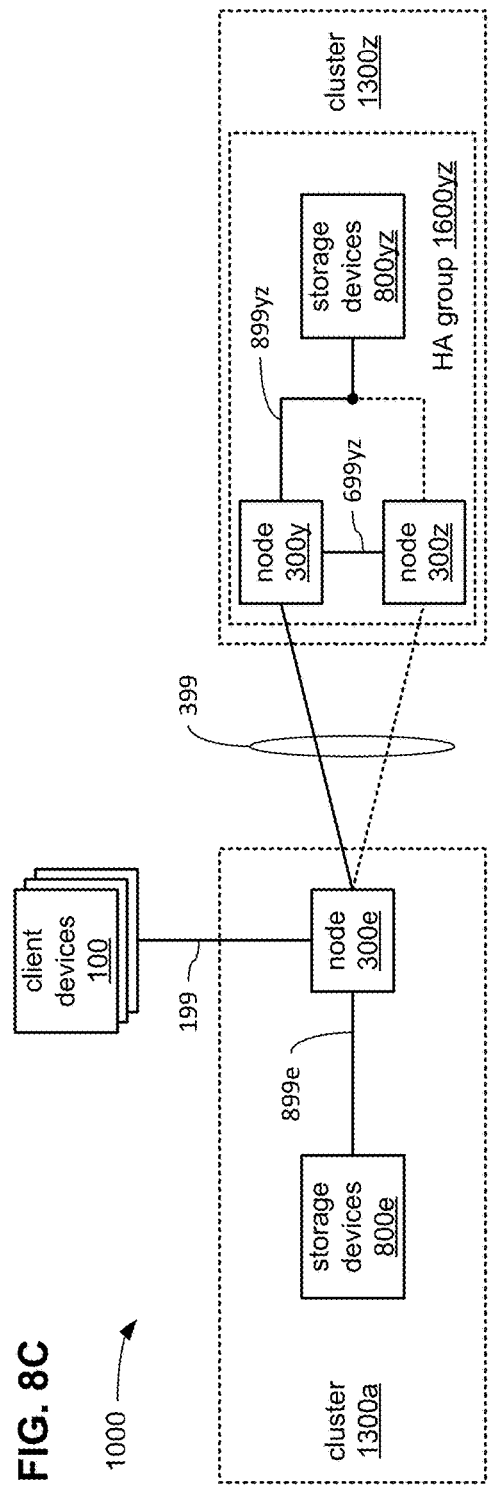

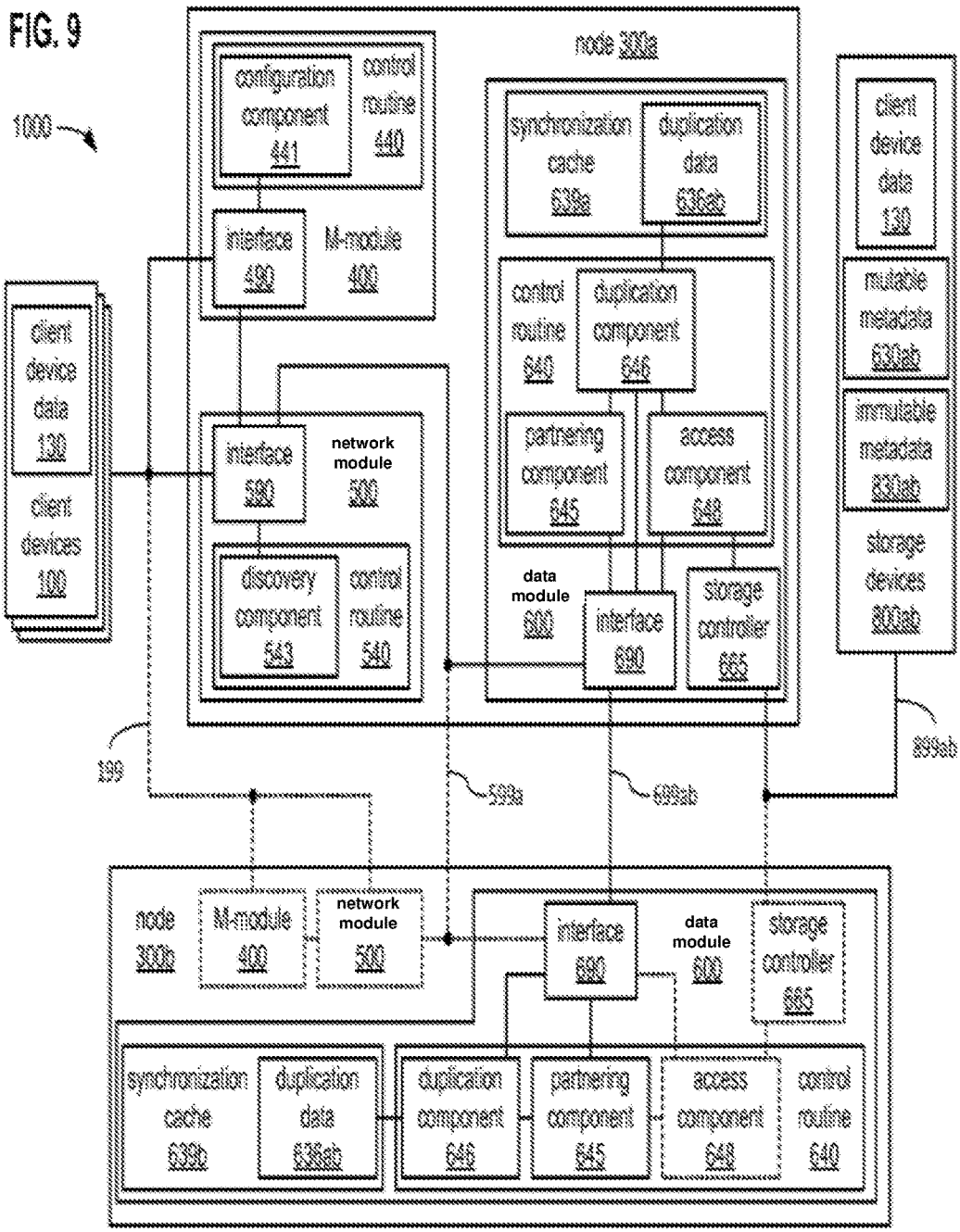

TECHNIQUES FOR MAINTAINING COMMUNICATIONS SESSIONS AMONG NODES IN A STORAGE CLUSTER SYSTEM

BACKGROUND

Remotely accessed storage cluster systems may include multiple interconnected nodes that may be geographically dispersed to perform the storage of client device data in a fault-tolerant manner and to enable the speedy retrieval of that data. Each of such nodes may include multiple interconnected modules, each of which may be specialized to perform a portion of the tasks of storing and retrieving client device data. Distant communications may need to occur on short notice among multiple ones of such nodes to coordinate handling of an error that may arise in the performance of such tasks. Thus, the architectures of such storage cluster systems may be quite complex.

In contrast, client devices may not be configured to monitor and/or control aspects of such complex architectures or the complexities of the manner in which they achieve fault tolerance. Client devices may communicate with storage cluster systems using protocols that are not well suited to convey the details of such complexities, and client devices may employ operating systems that provide little flexibility in dealing with delays arising from such complexities.

BRIEF DESCRIPTION OF THE DRAWINGS

FIG. 6 illustrates an example embodiment of a mesh of communications sessions.

FIGS. 7A, 7B and 7C, together, illustrate an example embodiment of operating a mesh of communications sessions.

FIGS. 8A, 8B and 8C each illustrate an alternate example embodiment of a mesh of communications sessions.

FIG. 9 illustrates an example embodiment of duplicating metadata between nodes.

DETAILED DESCRIPTION

Figure 1:
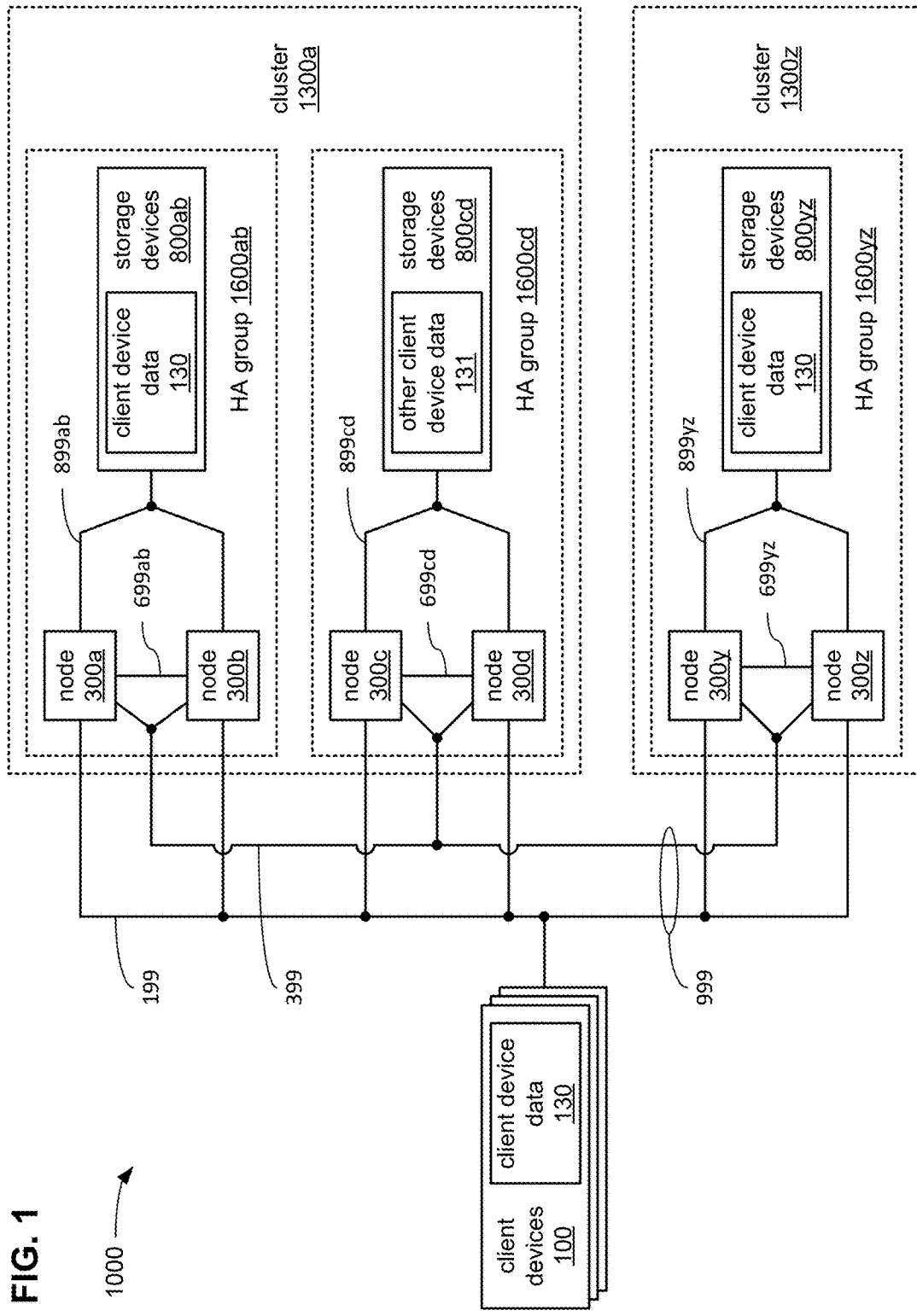
FIG. 1 illustrates an example embodiment of a storage cluster system.

Various embodiments are generally directed to techniques for preparing to respond to failures in performing a data access command to modify client device data in a storage cluster system. In a storage cluster system, multiple nodes may be grouped into two or more clusters that may each be made up of one or more high availability (HA) groups of nodes. The two or more clusters may be positioned at geographically distant locations and may be coupled via one or more interconnects extending through networks such as the Internet or dedicated leased lines. A single node of a HA group of each cluster may be an active node that communicates with the other via an active communications session to replicate the performance of data access commands between them to synchronize the state of stored client device data between their HA groups. Within each HA group, at least one other node may be an inactive node partnered with the active node and prepared via duplication of metadata to take over for the active node in response to an error. In support of such a takeover, multiple nodes of each HA group may form a mesh of communications sessions thereamong that includes the one active communications session and multiple inactive communications sessions. As an inactive node of a HA group takes over for an active node in the same HA group in response to an error, the active communications session may become inactive and one of the inactive communication sessions may become the active communications session. In support of forming the mesh, each node may maintain and/or store metadata that includes network addresses of one or more of the other nodes to minimize delays in forming the mesh following rebooting of one or more of the nodes.

Each of the nodes may include one or more of a management module (M-module), a network protocol module and a data storage module. The M-module may couple a node to a client interconnect to provide one or more client devices a mechanism to configure at least a portion of the storage cluster system. The network protocol module may couple a node to the client interconnect to enable a request for storage services from one or more of the client devices to be received at the node. The network protocol module may translate the storage services request into at least one data access command. The data storage module may be coupled to the network protocol module to receive the at least one data access command therefrom. The data storage module may also couple the node to one or more storage devices to store client device data and from which client device data may be retrieved. Individual ones of those storage devices and/or groups of those storage devices may be designated and treated by the data storage module as logical units (LUs). The data storage module may define an aggregate within the storage space provided by a single LU or a group of LUs, and may define one or more volumes within the storage space of that aggregate. The client device data and/or metadata may be stored within one or more volumes so defined within that aggregate.

In addition to performing a data access command received from the network protocol module, the data storage module of one active node of one HA group may replicate the data access command and transmit the resulting replica of that data access command to another active node of another HA group to enable at least partially parallel performance of the data access command by the data storage modules of the two active nodes. Such transmission of a replica data access command may be performed via an inter-cluster interconnect that may extend through the same network through which the client interconnect may extend. The data storage module of that other node may reply to the transmission of the replica data access command with an indication of success or failure in the performance of the replica data access command.

In support of enabling exchanges of replica data access commands and responses thereto between an active node of a first HA group and an active node of a second HA group, the two active nodes may cooperate to form and maintain an active communications session therebetween through the inter-cluster interconnect. In such an active communications session, information concerning the current state of each of the two active nodes may be recurringly exchanged therebetween. Other inactive nodes of the first and second HA groups may also establish and maintain inactive communications sessions that extend between nodes of the first and second HA groups to support a takeover of the active node of either HA group by an inactive node of the same HA group in response to an error occurring within that active node. The two active nodes may exchange information concerning other inactive nodes of the first and second HA groups to enable formation and maintenance of the inactive communications sessions. In the event of an error resulting in the takeover of one of the active nodes by an inactive node, the active communications session between the two active nodes may become inactive while one of the inactive communications sessions may become the active communications session.

One error that may trigger a takeover may be a failure within the active node of the first HA group that precludes that node from receiving requests for storage services from a client device, from converting the request into a data access command, from performing the data access command or from transmitting a replica of the data access command to the active node of the second HA group via the active communications session. If the error is a short term error that the active node of the first HA group is able to resolve within a relatively short period of time, then the active node of the first HA group may retry receiving or converting the request, performing the data access command or transmitting the replica data access command to the active node of the second HA group. However, if the error is a long term error that the active node of the first HA group cannot resolve within a relatively short period of time and/or that requires intervention by personnel to resolve, then an inactive node of the first HA group may take over for the active node of the first HA group. In so doing, the inactive node of the first HA group may become the new active node of the first HA group, and may cooperate with the active node of the second HA group to change the state of a communications session extending therebetween from inactive to active. Further, the active node of the second HA group may then change the state of the active communications session extending between it and what was the active node of the first HA group from active to inactive.

Another error that may trigger a takeover may be a failure within the active node of the second HA group that precludes that node from receiving a replica data access command from the active node of the first HA group via the active communications session, or from performing the replica data access commands despite successfully receiving the replica data access command. If the error is a short term error that the active node of the second HA group is able to resolve within a relatively short period of time, then the active node of the first HA group may retry transmitting the replica data access command to the active node of the second HA group via the active communications session. However, if the error is a long term error that the active node of the second HA group cannot resolve within a relatively short period of time and/or that requires intervention by personnel to resolve, then the active node of the first HA group may retry transmitting the replica data access command to an inactive node of the second HA group that may take over for the active node of the second HA group. In so doing, the active node of the first HA group may cooperate with the inactive node of the second HA group to change the state of a communications session extending therebetween from inactive to active. Further, the active node of the first HA group may change the state of the active communications session extending between it and what was the active node of the second HA group from active to inactive.

In support of forming and maintaining the mesh of communications sessions, the M-module, network protocol module and/or data storage module of each active node may cooperate to derive, store and/or exchange metadata that may include indications of network addresses of multiple ones of the nodes of the first and second HA groups and/or other information pertinent to establishing at least a subset of the communications sessions of the mesh. A M-module of an active node may receive information making up a portion of metadata and/or a network protocol module of the active node may perform tests to discover information making up another portion of metadata. One or both of the M-module and the network protocol module may then provide their portions of metadata to a data storage module of the active node. The data storage module may transmit a duplicate of the metadata to data storage module(s) of one or more inactive nodes of the same HA group and may store a copy of the metadata within a volume and/or aggregate within one or more storage devices to which the data storage modules of the active node and the one or more inactive nodes may share access. As a result, when one of such data storage modules reboots following a reset or being powered up, that data storage module may be able to retrieve information pertinent to its node establishing communications sessions with nodes of another HA group by retrieving the metadata from the one or more storage devices, and may then employ that information to form one or more of the communications sessions of the mesh more quickly. In embodiments in which different ones of the nodes in each of multiple HA groups may occasionally be rebooted for any of a variety of reasons, faster reestablishment of communications sessions following such a reboot may serve to minimize periods of time in which portions of such a mesh of communications sessions are not in place. Where errors are encountered that result in a change in which communications session(s) are active or inactive, the metadata stored within the one or more storage devices may be updated to enable faster reestablishment of communications sessions with the new configuration of active and inactive communications sessions following a reboot.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result.

These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of a storage cluster system 1000 incorporating one or more client devices 100 and one or more clusters, such as the depicted clusters 1300a and 1300z. As depicted, the cluster 1300a may incorporate one or more of nodes 300a-d and sets of storage devices 800ab and 800cd, and the cluster 1300z may incorporate one or more of nodes 300y-z and a set of storage devices 800yz. As further depicted, the cluster 1300a may be made up of a HA group 1600ab incorporating the partnered nodes 300a-b and the set of storage devices 800ab, and a HA group 1600cd incorporating the partnered nodes 300c-d and the set of storage devices 800cd. Correspondingly, the cluster 1300z may be made up of a HA group 1600yz incorporating the partnered nodes 300y-z and the set of storage devices 800yz.

The clusters 1300a and 1300z may be positioned at geographically distant locations to enable a degree of redundancy in storing and retrieving client device data 130 provided by one or more of the client devices 100. Such positioning may be deemed desirable to enable continued access to the client device data 130 by one or more of the client devices 100 despite a failure or other event that may render one or the other of the clusters 1300a or 1300z inaccessible to one or more of the client devices 100. As depicted, one or both of the clusters 1300a and 1300z may additionally store other client device data 131 that may be entirely unrelated to the client device data 130.

The formation of the HA group 1600ab with at least the two nodes 300a and 300b partnered to share access to the set of storage devices 800ab may enable a degree of fault tolerance in accessing the client device data 130 as stored within the set of storage devices 800ab by enabling one of the nodes 300a-b to take over for its partner (e.g., the other of the nodes 300a-b) in response to an error condition within one of the nodes 300a-b. Correspondingly, the formation of the HA group 1600yz with at least the two nodes 300y and 300z partnered to share access to the set of storage devices 800yz may similarly enable a degree of fault tolerance in accessing the client device data 130 as stored within the set of storage devices 800yz by similarly enabling one of the nodes 300y-z to similarly take over for its partner (e.g., the other of the nodes 300y-z).

As depicted, any of the nodes 300a-d and 300y-z may be made accessible to the client devices 100 via a client interconnect 199. As also depicted, the nodes 300a-d and 300y-z may be additionally coupled via an inter-cluster interconnect 399. In some embodiments, the interconnects 199 and 399 may both extend through the same network 999. Each of the interconnects 199 and 399 may be implemented as virtual private networks (VPNs) defined using any of a variety of network security protocols through the network 999. The network 999 may be a single network limited to extending within a single building or other relatively limited area, may include a combination of connected networks extending a considerable distance, and/or may include the Internet. As an alternative to coexisting within the same network 999, the interconnects 199 and 399 may be implemented as entirely physically separate networks. By way of example, the client interconnect 199 may extend through the Internet to enable the client devices 100 to be positioned at geographically diverse locations, while the inter-cluster interconnect 399 may include a leased line extending between the two geographically distant locations at which each of the clusters 1300a and 1300z are positioned.

As depicted, the partnered nodes within each of the HA groups 1600ab, 1600cd and 1600yz may be additionally coupled via HA interconnects 699ab, 699cd and 699yz, respectively. As also depicted, the nodes within each of the HA groups 1600ab, 1600cd and 1600yz may be coupled to the sets of storage devices 800ab, 800cd and 800yz in a manner enabling shared access via storage interconnects 899ab, 899cd and 899yz, respectively. The partnered nodes and set of storage devices of each of the HA groups 1600ab, 1600cd and 1600yz may be positioned within relatively close physical proximity to each other such that the interconnects 699ab, 899ab, 699cd, 899cd, 699yz and 899yz may each traverse a relatively short distance (e.g., extending within a room and/or within a cabinet).

More broadly, the network 999 and/or one or more of the interconnects 199, 399, 699ab, 699cd and 699yz may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Each of the interconnects 899ab, 899cd and 899yz may be based on any of a variety of widely known and used storage interface standards, including and not limited to, SCSI, serially-attached SCSI (SAS), Fibre Channel, etc.

It should be noted that despite the depiction of specific quantities of clusters and nodes within the storage cluster system 1000, other embodiments are possible that incorporate different quantities of clusters and nodes. Similarly, despite the depiction of specific quantities of HA groups and nodes within each of the clusters 1300*a* and 1300*z*, other embodiments are possible that incorporate differing quantities of HA groups and nodes. Further, although each of the HA groups 1600*ab*, 1600*cd* and 1600*yz* is depicted as incorporating a pair of nodes 300*a-b*, 300*c-d* and 300*y-z*, respectively, other embodiments are possible in which one or more of the HA groups 1600*ab*, 1600*cd* and 1600*yz* may incorporate more than two nodes.

Figure 2A:
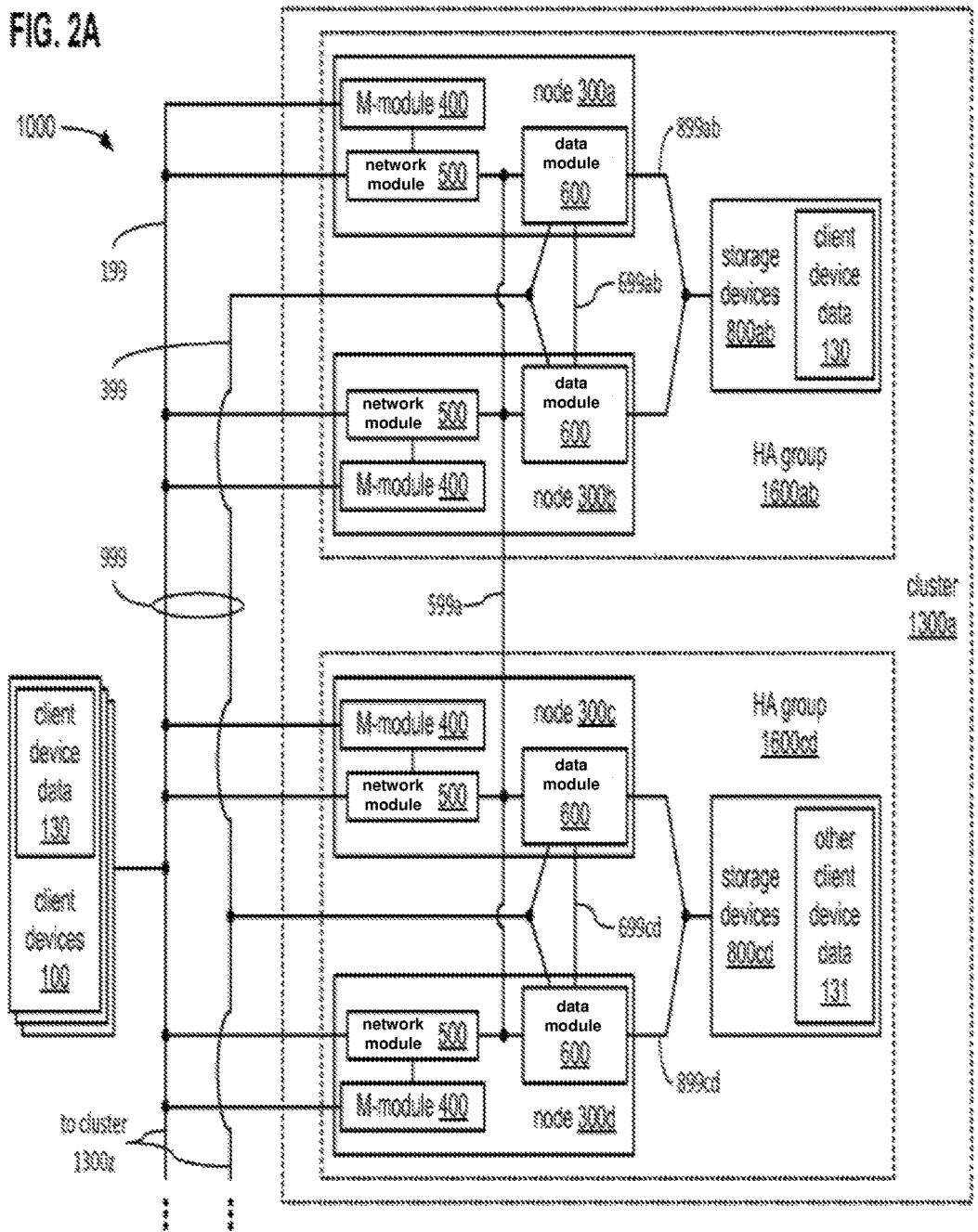
FIG. 2A illustrates an example embodiment of a pair of high availability groups of a cluster.
Figure 2B:
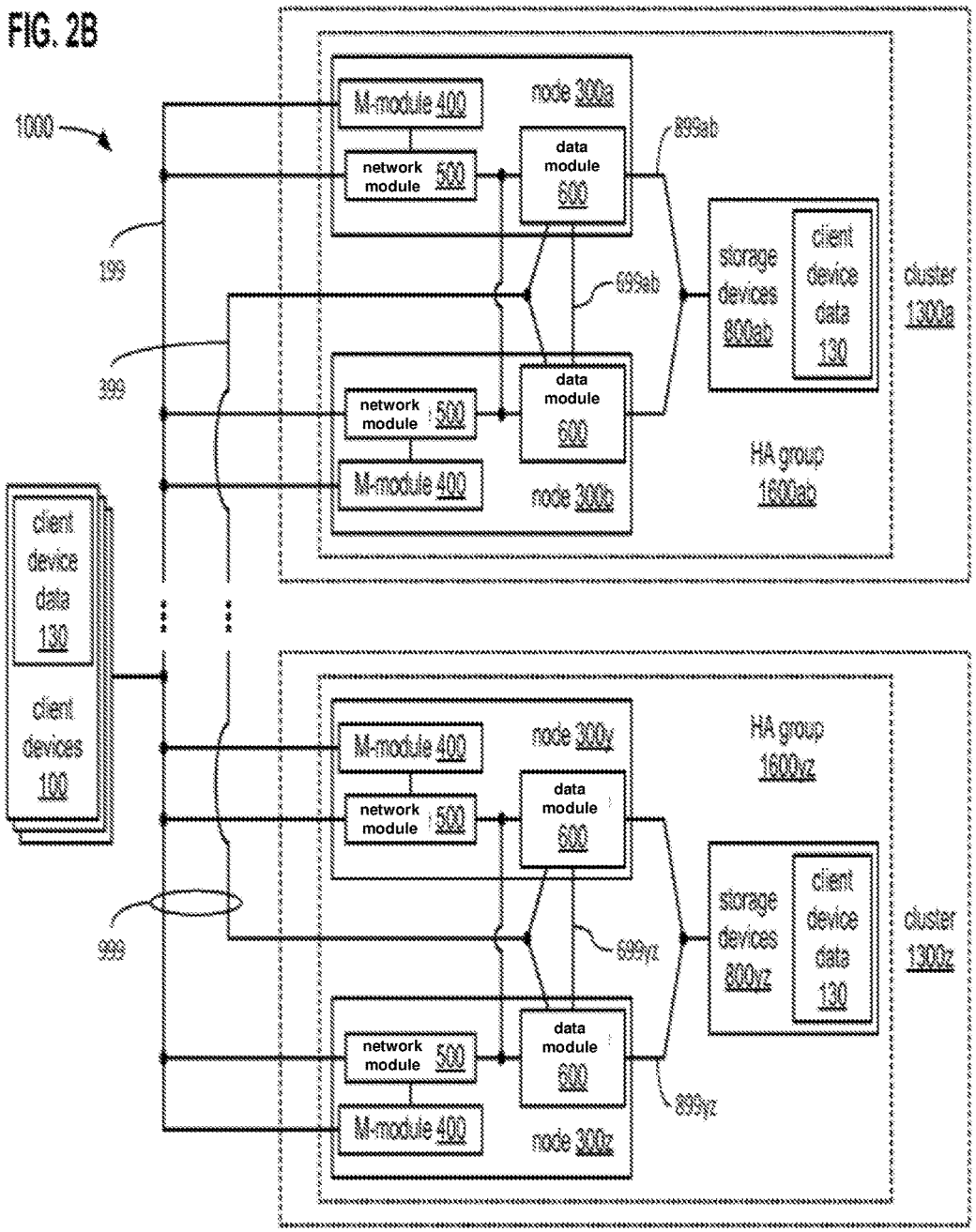
FIG. 2B illustrates an example embodiment of a pair of high availability groups of different clusters.

FIGS. 2A and 2B each illustrates a block diagram of an example portion of the storage cluster system 1000 in greater detail. More specifically, FIG. 2A depicts aspects of the nodes 300*a-d* and of interconnections among the nodes 300*a-d* within the cluster 1300*a* in greater detail. FIG. 2B depicts aspects of the interconnections among the nodes 300*a-b* and 300*y-z*, including interconnections extending between the clusters 1300*a* and 1300*z*, in greater detail.

Referring to both FIGS. 2A and 2B, each of the nodes 300*a-d* and 300*y-z* may incorporate one or more of a M-module 400, a network protocol module 500 and a data storage module 600. As depicted, each of the M-modules 400 and the network protocol modules 500 may be coupled to the client interconnect 199, by which each may be accessible to one or more of the client devices 100. The M-module 400 of one or more active ones of the nodes 300*a-d* and 300*y-z* may cooperate with one or more of the client devices 100 via the client interconnect 199 to allow an operator of one of the client devices 100 to configure various aspects of the manner in which the storage cluster system 1000 stores and provides access to the client device data 130 provided by one or more of the client devices 100. The network protocol module 500 of one or more active ones of the nodes 300*a-d* and 300*y-z* may receive and respond to requests for storage services from one or more of the client devices 100 via the client interconnect 199, and may perform a protocol conversion to translate each storage service request into one or more data access commands.

As depicted, the data storage modules 600 of all of the nodes 300*a-d* and 300*y-z* may be coupled to each other via the inter-cluster interconnect 399. Also, within each of the HA groups 1600*ab*, 1600*cd* and 1600*yz*, data storage modules 600 of partnered nodes may share couplings to the sets of storage devices 800*ab*, 800*cd* and 800*yz*, respectively. More specifically, the data storage modules 600 of the partnered nodes 300*a* and 300*b* may both be coupled to the set of storage devices 800*ab* via the storage interconnect 899*ab*, the data storage modules 600 of the partnered nodes 300*c* and 300*d* may both be coupled to the set of storage devices 800*cd* via the storage interconnect 899*cd*, and the data storage modules 600 of the nodes partnered 300*y* and 300*z* may both be coupled to the set of storage devices 800*yz* via the storage interconnect 899*yz*. The data storage modules 600 of active ones of the nodes 300*a-d* and 300*y-z* may perform the data access commands derived by one or more of the network protocol modules 500 of these nodes from translating storage service requests received from one or more of the client devices 100.

Thus, the data storage modules 600 of active ones of the nodes 300*a-d* and 300*y-z* may access corresponding ones of the sets of storage devices 800*ab*, 800*cd* and 800*yz* via corresponding ones of the storage interconnects 899*ab*, 899*cd* and 899*yz* to store and/or retrieve client device data 130 as part of performing the data access commands. The data access commands may be accompanied by portions of the client device data 130 to store, and/or may be accompanied by updated portions of the client device data 130 with which to update the client device data 130 as stored. Alternatively or additionally, the data access commands may specify portions of the client device data 130 to be retrieved from storage for provision back to one or more of the client devices 100.

Further, and referring to FIG. 2B, the data storage module 600 of an active one of the nodes 300*a-b* and 300*y-z* of one of the clusters 1300*a* or 1300*z* may replicate the data access commands and transmit the resulting replica data access commands via the inter-cluster interconnect 399 to another active one of the nodes 300*a-b* and 300*y-z* of the other of the clusters 1300*a* or 1300*z* to enable performance of the data access commands at least partially in parallel by two of the data storage modules 600. In this way, the state of the client device data 130 as stored within one of the sets of storage devices 800*ab* or 800*yz* may be mirrored within another of the sets of storage devices 800*ab* or 800*yz*, as depicted.

Referring again to both FIGS. 2A and 2B, and as previously discussed, the sharing of access via the storage interconnects 899*ab*, 899*cd* and 899*yz* to each of the sets of storage devices 800*ab*, 800*cd* and 800*yz*, respectively, among partnered ones of the nodes 300*a-d* and 300*y-z* may enable continued access to one of the sets of storage devices 800*ab*, 800*cd* and 800*yz* in the event of a failure occurring within one of the nodes 300*a-d* and 300*y-z*. As depicted, in support of enabling such continued access in spite of such a failure, the data storage modules 600 of partnered ones of the nodes 300*a-d* and 300*y-z* may be coupled within each of the HA groups 1600*ab*, 1600*cd* and 1600*yz* via the HA interconnects 699*ab*, 699*cd* and 699*yz*, respectively. Through the HA interconnects 699*ab*, 699*cd* or 699*yz*, the data storage modules 600 of each of these nodes may each monitor the status of the data storage modules 600 their partners. More specifically, the data storage modules 600 of the partnered nodes 300*a* and 300*b* may monitor each other, the data storage modules 600 of the partnered nodes 300*c* and 300*d* may monitor each other, and the data storage modules 600 of the partnered nodes 300*y* and 300*z* may monitor each other.

Such monitoring may entail recurring exchanges of "heartbeat" and/or other status signals (e.g., messages conveying the current state of performance of a data access command) via one or more of the HA interconnects 699*ab*, 699*cd* or 699*yz* in which an instance of an absence of receipt of such a signal within a specified recurring interval may be taken as an indication of a failure of the one of the data storage modules 600 from which the signal was expected. Alternatively or additionally, such monitoring may entail awaiting an indication from a monitored one of the data storage modules 600 that a failure of another component of one of the nodes 300*a-d* or 300*y-z* has occurred, such as a failure of a M-module 400 and/or of a network protocol module 500 of that one of the nodes 300*a-d* or 300*y-z*. In response to such an indication of failure of one of the nodes 300*a-d* or 300*y-z* belonging to one of the HA groups 1600*ab*, 1600*cd* or 1600*yz*, its partner among the nodes 300*a-d* or 300*y-z* of the same one of the HA groups 1600*ab*, 1600*cd* or 1600*yz* may take over. Such a "takeover" between partnered ones of the nodes 300*a-d* or 300*y-z* may be a complete takeover inasmuch as the partner that is taking over may perform all of the functions that were to be performed by the failing one of these nodes.

However, in some embodiments, at least the network protocol modules 500 and the data storage modules 600 of multiple ones of the nodes 300*a-d* and/or 300*y-z* may be interconnected in a manner enabling a partial takeover in response to the failure of a portion of one of the nodes 300*a-d* or 300*y-z*. More specifically, and referring more specifically to FIG. 2A, the network protocol modules 500 of each of the nodes 300*a-d* may be coupled to the data storage modules 600 of each of the nodes 300*a-d* via an intra-cluster interconnect 599*a*. In other words, within the cluster 1300*a*, all of the network protocol modules 500 and all of the data storage modules 600 may be coupled to enable data access commands to be exchanged between network protocol modules 500 and data storage modules 600 of different ones of the nodes 300*a-d*. Thus, by way of example, where the network protocol module 500 of the node 300*a* has failed, but the data storage module 600 of the node 300*a* is still operable, the network protocol module 500 of its partner node 300*b* (or of one of the nodes 300*c* or 300*d* with which the node 300*a* is not partnered in a HA group) may take over for the network protocol module 500 of the node 300*a*.

The nodes and sets of storage devices making up each of the clusters 1300*a* and 1300*z* may be positioned within relatively close physical proximity to each other such that the intra-cluster interconnects 599*a* and 599*z* may each traverse a relatively short distance (e.g., extending within a room and/or within a cabinet). More broadly, one or more of the intra-cluster interconnects 599*a* and 599*z* may be based on any of a variety (or combination) of communications technologies by which signals may be exchanged, including without limitation, wired technologies employing electrically and/or optically conductive cabling, and wireless technologies employing infrared, radio frequency or other forms of wireless transmission. By way of example, the intra-cluster interconnect 599*a* may be made up of a mesh of point-to-point interconnects coupling each network protocol module 500 of each of the nodes 300*a-d* to each data storage module 600 of each of the nodes 300*a-d*. By way of another example, the intra-cluster interconnect 599*a* may include a network switch (not shown) to which each of the network protocol modules 500 and each of the data storage modules 600 of the nodes 300*a-d* may be coupled.

It should be noted, however, that it may be deemed desirable to disallow such partial takeovers in favor of takeovers in which one node takes over all functions of another node in which a failure has occurred. This may be the result of portions of the intra-cluster interconnects 599*a* and/or 599*z* that extend between network protocol modules 500 and data storage modules 600 within one or more of the nodes 300*a-d* and/or 300*y-z* having the capability to transfer commands and/or data significantly more quickly than portions of the intra-cluster interconnects 599*a* and/or 599*z* that extend between network protocol modules 500 and data storage modules 600 of different nodes. Thus, in some embodiments, portions of the intra-cluster interconnects 599*a* and/or 599*z* that extend between different ones of the nodes 300*a-d* or 300*y-z*, respectively, may not be used.

It should also be noted that despite the depiction of only a single one of each of the M-module 400, the network protocol module 500 and the data storage module 600 within each of the nodes 300*a-d* and 300*y-z*, other embodiments are possible that may incorporate different quantities of one or more of the M-module 400, the network protocol module 500 and the data storage module 600 within one or more of these nodes. By way of example, embodiments are possible in which one or more of the nodes 300*a-d* and/or 300*y-z* incorporate more than one network protocol module 500 to provide a degree of fault-tolerance for communications with one or more of the client devices 100, and/or incorporate more than one data storage module 600 to provide a degree of fault-tolerance in accessing a corresponding one of the sets of storage devices 800*ab*, 800*cd* or 800*yz*.

Figure 3:
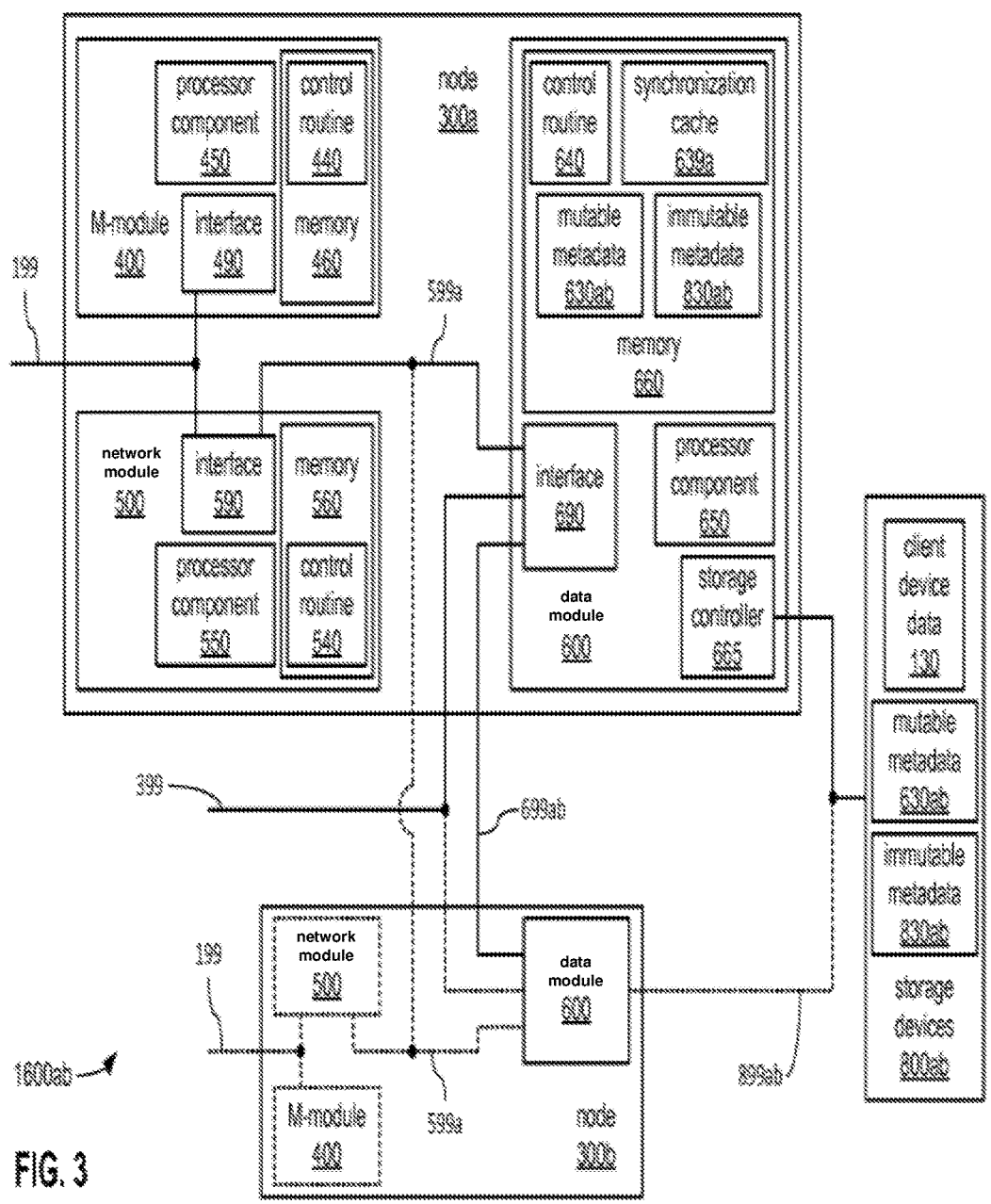
FIG. 3 illustrates an example embodiment of a HA group of partnered nodes.

FIG. 3 illustrates a block diagram of an example embodiment of the HA group 1600*ab* of the cluster 1300*a* of the storage cluster system 1000 in greater detail. As depicted, of the nodes 300*a* and 300*b* of the HA group 1600*ab*, the node 300*a* may be active to engage in communications with a client device 100 and perform operations altering the client device data 130 within the set of storage devices 800*ab*, while the node 300*b* may be inactive and awaiting a need to take over for the node 300*a*. More specifically, the M-module 400 and the network protocol module 500 may not engage in communications with the client devices 100 (as indicated with the M-module 400 and the network protocol module 500 being drawn with dotted lines). As also depicted, each of the nodes 300*a-b* may incorporate one or more of a M-module 400, a network protocol module 500 and a data storage module 600.

In various embodiments, the M-module 400 of the node 300*a* incorporates one or more of a processor component 450, a memory 460 and an interface 490 to couple the M-module 400 to at least the client interconnect 199. The memory 460 may store a control routine 440. The control routine 440 may incorporate a sequence of instructions operative on the processor component 450 in its role as a main processor component of the M-module 400 to implement logic to perform various functions.

In executing the control routine 440, the processor component 450 may operate the interface 490 to accept remotely supplied configuration information. Specifically, the processor component 450 may provide a web server, telnet access, instant messaging and/or other communications service(s) by which aspects of the operation of the node 300*a*, the HA group 1600*ab* or the cluster 1300*a* to which the node 300*a* belongs, and/or other components of the storage cluster system 1000, may be remotely configured. In some embodiments, such remote configuration may emanate from one or more of the client devices 100. By way of example, security protocols by which each of the client devices 100 may be authenticated to allow access to the client device data 130 stored at least within the set of storage devices 800*ab* may be remotely configured, as well as what protocols may be employed in communications via the client interconnect 199, what file system may be employed in storing client device data 130 within the set of storage devices 800*ab*, what other one(s) of the nodes 300*a-d* or 300*y-z* may be partnered with the node 300*a* to form the HA group 1600*ab*, what other node and/or HA group may cooperate with the node 300*a* and/or the HA group 1600*ab* to provide further fault tolerance, what network addresses may be allocated to others of the nodes 300*a-d* and/or 300*y-z* on various interconnects, etc. As the processor component 450 receives such configuration information and/or subsequent to receiving such information, the processor component 450 may operate the interface 490 to relay it and/or updates thereto to the network protocol module 500 and/or the data storage module 600 as a portion of metadata.

In various embodiments, the network protocol module 500 of the node 300*a* incorporates one or more of a processor component 550, a memory 560 and an interface 590 to couple the network protocol module 500 to one or both of the client interconnect 199 and the intra-cluster interconnect 599*a*. The memory 560 may store a control routine 540. The control routine 540 may incorporate a sequence of instructions operative on the processor component 550 in its role as a main processor component of the network protocol module 500 to implement logic to perform various functions.

In executing the control routine 540, the processor component 550 may operate the interface 590 to perform various tests to detect other devices with which to communicate and/or assign network addresses by which other devices may be contacted for communication. At least as part of rebooting following being reset or powered on, the processor component 550 may perform various tests on the inter-cluster interconnect 399 and/or the intra-cluster interconnect 599*a* to determine addresses and/or communications protocols for communicating with one or more components (e.g., M-modules 400, network protocol modules 500 and/or data storage modules 600) of one or more of the nodes 300*a-d* and/or 300*y-z*. Alternatively or additionally, in embodiments in which at least a portion of the intra-cluster interconnect 599*a* supports internet protocol (IP) addressing, the processor component 550 may function in the role of a dynamic host control protocol (DCHP) server to assign such addresses. Also alternatively or additionally, the processor component 550 may receive configuration information from the M-module 400. In some embodiments, configuration information received from the M-module 400 may be employed by the processor component 550 in performing tests on the inter-cluster interconnect 399 and/or the intra-cluster interconnect 599*a* (e.g., the configuration information so received may include a range of IP addresses to test). As the processor component 550 performs such tests and/or subsequent to performing such tests, the processor component 550 may operate the interface 590 to relay indications of the results of those tests and/or updates thereto to the data storage module 600 as a portion of metadata. Further, as the processor component 550 interacts with one or more of the client devices 100 and/or other devices, the processor component 550 may detect changes in information determined from the performance of various tests, and may operate the interface 590 to provide indications of those changes to the data storage module 600 as portions of updated metadata.

In further executing the control routine 540, the processor component 550 may operate the interface 590 to exchange storage service requests, responses thereto and client device data 130 with one or more of the client devices 100 via the client interconnect 199. The client devices 100 and the network protocol module(s) 500 of one or more active ones of the nodes 300*a-d* and 300*y-z* may interact with each other via the client interconnect 199 in accordance with a client/server model for the handling of client device data 130. Stated differently, each of the client devices 100 may issue requests for storage services to one or more active ones of the nodes 300*a-d* and 300*y-z* related to the storage of client device data 130. In so doing, the client devices 100 and the network protocol module 500 may exchange packets over the client interconnect 199 in which storage service requests may be transmitted to the network protocol module 500, responses (e.g., indications of status of handling of the requests) may be transmitted to the client devices 100, and client device data 130 may be exchanged therebetween. The exchanged packets may utilize any of a variety of file-based access protocols, including and not limited to, Common Internet File System (CIFS) protocol or Network File System (NFS) protocol, over TCP/IP. Alternatively or additionally, the exchanged packets may utilize any of a variety of block-based access protocols, including and not limited to, Small Computer Systems Interface (SCSI) protocol encapsulated over TCP (iSCSI) and/or SCSI encapsulated over Fibre Channel (FCP).

Also in executing the control routine 540, the processor component 550 may operate the interface 590 to exchange commands and/or data, including client device data 130, with the data storage module 600 via the intra-cluster interconnect 599*a*. Such exchanges of commands and/or data may or may not employ a protocol in which packets are used. In some embodiments, data access commands and/or data to effect exchanges of client device data 130 may be exchanged through the intra-cluster interconnect 599*a* in a manner that may be agnostic of any particular file system that may be selected for use in storing the client device data 130 within the set of storage devices 800*ab*. More specifically, the manner in which portions of client device data 130 may be referred to in data access commands to store and/or retrieve it may entail identification of file names, identification of block identifiers, etc. in a manner meant to be independent of a selection of a file system.

Given the possible differences in protocols and/or other aspects of communications, the processor component 550 may be caused to perform protocol conversions to translate between protocols employed in communications with one or more of the client devices 100 via the client interconnect 199 and protocols employed in communications with the data storage module 600 via the intra-cluster interconnect 599*a*. Alternatively or additionally, one or more of the protocols employed in communications via the client interconnect 199 may employ file and/or block identification in a manner enabling a minimal degree of protocol conversion between such communications and communications via the intra-cluster interconnect 599*a*.

In performing such protocol conversions, the processor component 550 may be caused to relay requests from one or more of the client devices 100 for storage services to the data storage module 600 as data access commands to store and/or retrieve client device data 130. More specifically, requests received via the client interconnect 199 for storage services to retrieve client device data 130 may be translated into data access commands conveyed to the data storage module 600 via the intra-cluster interconnect 599*a* to retrieve client device data 130 from the set of storage devices 800*ab* and to provide the client device data 130 to the network protocol module 500 to be relayed by the network protocol module 500 to the requesting one of the client devices 100. Also, requests received via the client interconnect 199 for storage services to store client device data 130 may be converted into data access commands conveyed to the data storage module 600 via the intra-cluster interconnect 599*a* to store the client device data 130 within the set of storage devices 800*ab*.

In various embodiments, the data storage module 600 of the node 300*a* incorporates one or more of a processor component 650, a memory 660, a storage controller 665 to couple the data storage module 600 to the set of storage devices 800*ab* via the storage interconnect 899*ab*, and an interface 690 to couple the data storage module 600 to one or more of the intra-cluster interconnect 599*a*, the inter-cluster interconnect 399 and the HA interconnect 699*ab*. The memory 660 stores one or more of a control routine 640, mutable metadata 630*ab* and immutable metadata 830*ab*. Also, and as will be explained in greater detail, a portion of the memory 660 may be allocated to serve as a synchronization cache 639*a*. The control routine 640 incorporates a sequence of instructions operative on the processor component 650 in its role as a main processor component of the data storage module 600 to implement logic to perform various functions.

In executing the control routine 640, the processor component 650 may operate the interface 690 to receive portions of metadata and/or updates thereto from the M-module 400 and/or the network protocol module 500 via the intra-cluster interconnect 599a. Regardless of whether aspects of the operation of the node 300a are remotely configured via the M-module 400 and/or are configured based on the results of tests performed by the network protocol module 500, the metadata portions received therefrom indicating the resulting configuration of those aspects may be stored as at least a portion of the mutable metadata 630ab and/or the immutable metadata 830ab. Whether a piece of metadata is deemed mutable and immutable may be based on the relative frequency with which that piece of metadata is expected to change. By way of example, aspects of the storage of client device data 130 within the set of storage devices 800ab, such as a selection of file system, a RAID level, etc. may be deemed immutable as a result of being deemed less likely to change or likely to change less frequently than other metadata. In contrast, a network address of a M-module, a network protocol module or a data storage module of one of the other nodes 300a-d or 300y-z with which the node 300a may communicate via one of the interconnects 399, 599a or 699ab may be deemed mutable as a result of being deemed more likely to change or likely to change more frequently than other metadata.

Following generation of the mutable metadata 630ab and/or the immutable metadata 830ab, the processor component 650 may store both within the set of storage devices 800ab for later retrieval. During subsequent rebooting of the data storage module 600, the processor component 650 may be caused by its execution of the control routine 640 to access the set of storage devices 800ab to retrieve the mutable metadata 630ab and/or the immutable metadata 830ab. In this way, the processor component 650 retrieves indications of the manner in which various aspects of the operation of at least the node 300a are to be configured, including aspects of the manner in which the data storage module 600 is to operate the set of storage devices 800ab and/or the manner in which the data storage module 600 is to interact with other devices (e.g., the M-module 400 or the network protocol module 500 of the node 300a, and/or the network protocol module 500 or the data storage module 600 of one or more of the other nodes 300b-d or 300y-z). By storing the metadata 630ab and/or 830ab within the set of storage devices 800ab for later retrieval following a rebooting of the data storage module 600, the need for the data storage module 600 to await what may be a concurrent rebooting of the M-module 400 and/or the network protocol module 500 before being provided with metadata portions from which to again derive the metadata 630ab and/or 830ab is avoided.

There may be occasions where multiple components of the node 300a, including more than one of the M-module 400, the network protocol module 500 and the data storage module 600, are caused to reboot, including and not limited to, implementing updates, upgrades, expansions of storage space, repairs, etc. It may be deemed desirable to enable the data storage module 600 to obtain information concerning aspects of operation of the node 300a as quickly as possible by doing so independently of the M-module 400 and/or the network protocol module 500. Further, a situation may arise in which rebooting of the data storage module 600 is performed while the M-module 400 and/or network protocol module 500 are not operative. By way of example, where more than one of the M-module 400, the network protocol module 500 and the data storage module 600 are rebooted, and where the M-module 400 and/or the network protocol module 500 may entirely fail to reboot such that either of the M-module 400 or network protocol module 500 may remain unresponsive to any request from the data storage module 600 to provide metadata portions making up either of the metadata 630ab or 830ab for an extended period of time. Thus, the ability of the data storage module 600 to independently retrieve the metadata 630ab and/or 830ab may allow the data storage module 500 to still cooperate with network protocol modules 500 and/or data storage modules 600 of one or more of the other nodes 300b-d and/or 300y-z to provide fault-tolerant storage and retrieval of the client device data 130, despite the loss of at least some functionality of the node 300a.

Since the mutable metadata 630ab includes indications of aspects of the operation of the node 300a that are deemed likely to change with greater frequency than similar indications included in the immutable metadata 830ab, the information included in at least the mutable metadata 630ab stored within the set of storage devices 800ab may more frequently become out of date. If an attempt by the processor component 650 to employ information in the mutable metadata 630ab, as obtained from the storage devices 800ab, to communicate with other components of the node 300a and/or with components of others of the nodes 300a-d and/or 300y-z is unsuccessful, then the processor component 650 may operate the interface 690 to transmit a request to the M-module 400 and/or the network protocol module 500 via the intra-cluster interconnect 599a for metadata portions that include updated versions of the information included in the mutable metadata 630ab. Depending on whether the M-module 400 and/or the network protocol module 500 are also rebooting, the processor component 650 may be caused to await completion of their rebooting and to then retransmit its request for updated metadata portions. In response to receiving the request, the processor components 450 and/or 550 may be caused by execution of the control routines 440 and/or 540 to operate the interfaces 490 and/or 590, respectively, to transmit such updated metadata portions to the data storage module 600 via the intra-cluster interconnect 599a. Upon receiving the updated information within such updated metadata portion(s), the processor component 650 may then incorporate the updated information into the mutable metadata 630ab, store the now updated mutable metadata 630ab within the set of storage devices 800ab, and employ the now updated mutable metadata 630ab to operate the interface 690 to make another attempt to communicate with other components of the node 300a and/or with components of other(s) of the nodes 300a-d and/or 300y-z.

In some embodiments, if the attempt by the processor component 650 to communicate using the now updated mutable metadata 630ab is also unsuccessful, then the processor component 650 may operate the interface 690 to transmit a request to the M-module 400 and/or the network protocol module 500 for updated versions of the information making up the immutable metadata 830ab. It may be that an updated version of the immutable metadata 830ab includes indications of aspects of operation that are needed in conjunction with using the information contained within the updated version of the mutable metadata 630ab. Upon receiving updated metadata portion(s) that include updated versions of the information making up the immutable metadata 830ab, the processor component 650 may then incorporate the updated information into the immutable metadata 830ab, store the now updated immutable metadata 830ab within the set of storage devices 800ab, and employ the now updated immutable metadata 830ab to make a further attempt to communicate with other components of the node 300a and/or with components of other(s) of the nodes 300a-d and/or 300y-z.

As will be explained in greater detail, the processor component 650 may be further caused to operate the interface 690 to transmit duplicates of the metadata 630ab and/or 830ab to the data storage module 600 of the node 300b via the HA interconnect 699ab to better enable the node 300b to take over for the node 300a in the event of a failure within the node 300a. The processor component 650 may so transmit the metadata 630ab and/or 830ab in response to any updates made to the metadata 630ab and/or 830ab.

In further executing the control routine 640, the processor component 650 may operate the set of storage devices 800ab through the storage controller 665 to store and retrieve client device data 130 in response to data access commands to do so received via the intra-cluster interconnect 599a, as has been described. The processor component 650 may operate the interface 690 to receive the data access commands from and/or exchange data (including client device data 130) with the network protocol module 500 via the intra-cluster interconnect 599a. In storing data within and retrieving data from the set of storage devices 800ab (including client device data 130, the mutable metadata 630ab and/or the immutable metadata 830ab), the processor component 650 may configure the storage controller 665 to operate multiple storage devices making up the set of storage devices 800ab to implement fault tolerance by defining arrays of storage devices and/or by other techniques. By way of example, multiple ones of the storage devices making up the set of storage devices 800ab may be operated together to implement a redundant array of independent discs (RAID), and the storage controller 665 may be configured to perform the redundancy calculations to maintain the redundancy of such an array. Further, in operating the set of storage devices 800ab through the storage controller 665, the processor component 650 may organize at least the client device data 130 stored therein in a manner conforming to the specification(s) of one or more widely known and used file systems, including and not limited to, Write Anywhere File Layout (WAFL).

In addition to operating the storage controller 665 to execute data access commands to store client device data 130 within the set of storage devices 800ab and/or retrieve client device data 130 therefrom, the processor component 650 may also replicate the data access commands and operate the interface 690 to transmit the resulting replica data access commands via the inter-cluster interconnect 399 to a data storage module 600 of one of the nodes 300y-z of the HA group 1600yz of the other cluster 1300z. As has been discussed, and as will be explained in greater detail, the transmission of such replica data access commands to a node of another HA group may provide an additional degree of fault tolerance in the storage and/or retrieval of client device data 130 in which the replica data access commands may be performed by a node of another cluster at least partly in parallel with the performance of the original data access commands by the node 300a. Again, the processor component 650 may be caused to retry the transmission of such replica data access commands to either the same one of the nodes 300y-z within the HA group 1600yz and/or to a different one of the nodes 300y-z within the HA group 1600yz in response to indications of errors in either the receipt or performance of the replica data access commands.

As will also be explained in greater detail, information pertinent to the data storage module 600 establishing and maintaining communications sessions with the data storage module 600 of the node 300b with which the node 300a is partnered, as well as with the data storage modules 600 of nodes of another cluster (e.g., the nodes 300y-z of the cluster 1300z) may be retrieved and used by the processor component 650 from one or both of the metadata 630ab and 830ab. Stated differently, the processor component 650 may employ information retrieved from the mutable metadata 630ab and/or the immutable metadata 830ab to communicate with the data storage module 600 of the node 300b and/or to form at least a portion of a mesh of communications sessions between the data storage modules 600 of the nodes 300a-b of the HA group 1600ab and the data storage modules 600 of the nodes 300y-z of the HA group 1600yz.

Broadly, each of the client devices 100, the nodes 300a-d and 300y-z, the M-modules 400, the network protocol module 500, the data storage modules 600 and/or the storage devices 800ab, 800cd and 800yz may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

In some embodiments, one or more of the nodes 300a-d and 300y-z may be physically implemented as an assembly of one or more M-modules 400, one or more network protocol modules 500 and one or more data storage modules 600 that are each implemented as separate computing devices coupled by a physical implementation of a corresponding one of the intra-cluster interconnect 599a or 599z. However, in other embodiments, the M-module(s) 400, the network protocol module(s) 500 and data storage module(s) 600 of one or more of the nodes 300a-d and 300y-z may be implemented as sets of instructions that are executed as processes by a shared processor component (e.g., one of the processor components 450, 550 or 650). In such other embodiments, at least a portion of the intra-cluster interconnect 599a or 599z that extends entirely within a node and does not extend between nodes may be implemented as a buffer or other data structure defined within a shared storage (e.g., one of the memories 460, 560 or 660) and employed to exchange data access commands, client device data 130, mutable metadata 630ab and/or immutable metadata 830ab among the control routines 440, 540 and 640. As a result, and as previously discussed, portions of the intra-cluster interconnect 599a or 599z that extend entirely within a node may be considerably faster than portions thereof that extend between nodes, and again, this may tend to discourage partial takeovers in favor of complete takeovers in response to failures within nodes.

In the examples presented herein, one or more of the client devices 100 may be a computing device directly operated by one or more persons to generate and/or work with client device data 130, and one or more of the nodes 300a-d and 300y-z may be a computing device functioning as a server to remotely store such client device data 130, as well as to provide the client devices 100 with access thereto in a fault-tolerant manner. Alternatively or additionally, in examples presented herein, one or more of the client devices 100 may be a computing device functioning as a server to store and provide access to at least a portion of client device data 130, and one or more of the nodes 300a-d and 300y-z may be a computing device functioning as an additional server to augment the storage provided by one or more of the client devices 100.

Each of the sets of storage devices 800ab, 800cd and 800yz may be made up of storage devices based on any of a variety of storage technologies, including and not limited to, ferromagnetic "hard" or "floppy" drives, magneto-optical media drives, optical media drives, non-volatile solid state drives, etc. Each of the storage interconnects 899ab, 899cd and 899yz may be based on any of a variety of widely known and used storage interface standards, including and not limited to, SCSI, serially-attached SCSI (SAS), Fibre Channel, etc.

Figure 4:
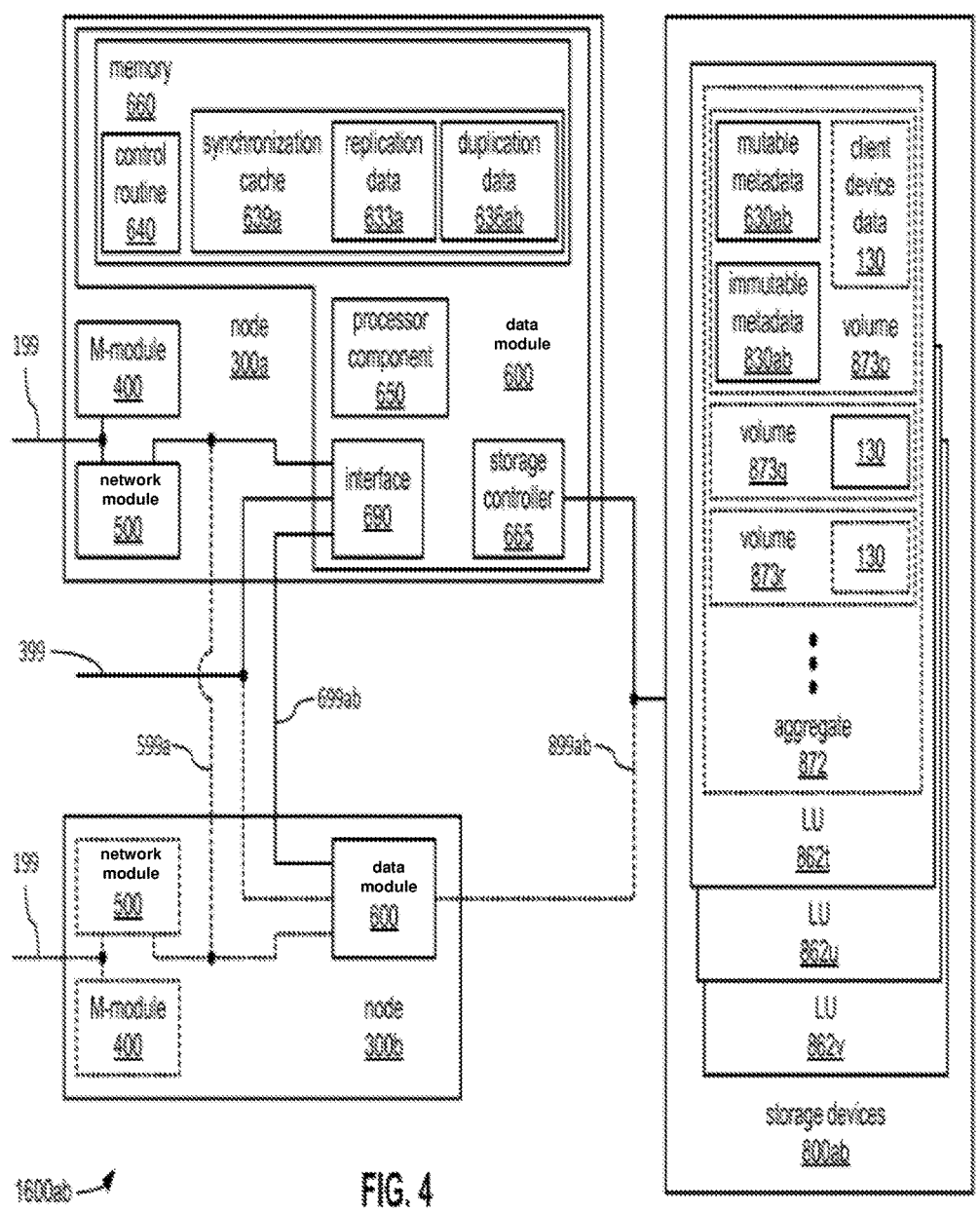
FIG. 4 illustrates an example embodiment of storing data within a shared set of storage devices.

FIG. 4 illustrates a block diagram of another example embodiment of the HA group 1600ab of the cluster 1300a of the storage cluster system 1000 in greater detail. As again depicted, of the nodes 300a and 300b of the HA group 1600ab, the node 300a may be active to engage in communications with a client device 100 and perform operations altering the client device data 130 within the set of storage devices 800ab, while the node 300b may be inactive and awaiting a need to take over for the node 300a. FIG. 4 also depicts various aspects of the generation, duplication and storage of the metadata 630ab within the set of storage devices 800ab alongside the client device data 130 under the control of the processor component 650 of the data storage module 600 of the node 300a in greater detail.

In some embodiments, the processor component 650 may treat each of the storage devices of the set of storage devices 800ab as a separate LU and/or may be caused to treat a group of those storage devices as a single LU. The exact manner in which LUs are defined among one or more storage devices of the set of storage devices 800ab may depend on any of a wide variety of factors. Multiple LUs may be operated together via the storage controller 665 to implement a level of RAID or other form of array that imparts fault tolerance in the storage of data therein. More specifically, and as depicted, the set of storage devices 800ab may include LUs 862t-v that may be operated separately or may be operated together to form one such array.

The processor component 650 may be caused to allocate storage space in any of a variety of ways within a single LU and/or within multiple LUs operated together to form an array. In so doing, the processor component 650 may be caused to subdivide storage space within a single LU and/or within multiple LUs operated together in any of a variety of ways. By way of example, such subdivisions may be effected as part of organizing client device data 130 into separate categories based on subject, as part of separating client device data 130 into different versions generated over time, as part of implementing differing access policies to different pieces of client device data 130, etc. In some embodiments, and as depicted, the storage space provided by the coordinated operation of the LUs 862t-v may be designated as an aggregate 872. Further, the aggregate 872 may be subdivided into volumes 873p-r, and the client device data 130 may be stored entirely within one of the volumes 873p-r or may be distributed among multiple ones of the volumes 873p-r (as depicted).

As also depicted, the mutable metadata 630ab and/or the immutable metadata 830ab may also be stored within the set of storage devices 800ab along with client device data 130, at least within the same aggregate 872. In some embodiments, the mutable metadata 630ab and/or the immutable metadata 830ab may be stored within one or more of the same volumes 873p-r as at least a portion of the client device data 130. In other embodiments, the mutable metadata 630ab and/or the immutable metadata 830ab may be stored within one of the volumes 873p-r that is separate from the one or more others of the volumes 873p-r within which client device data 130 may be stored.

Although the operation of multiple storage devices of the set of storage devices 800ab as an array to store client device data 130 may provide redundancy that addresses errors involving one or more of those storage devices, such use of multiple storage devices does not address the possibility of errors occurring within the node 300a. Specifically, the M-module 400, network protocol module 500 and/or the data storage module 600 of the node 300a may suffer some form of failure that may render the client device data 130 stored within the set of storage devices 800ab inaccessible to any of the client devices 100 through the node 300a. To address this possible failure mode, the processor component 650 may be caused by further execution of the control routine 640 to recurringly cooperate with a counterpart processor component 650 of a data storage module 600 of its partner node 300b of the HA group 1600ab via the HA interconnect 699ab to recurringly exchange status indications and/or duplicates of the most recently updated versions of the mutable metadata 630ab and/or the immutable metadata 830ab.

As previously discussed such exchanges of status indications may take the form of recurring "heartbeat" signals and/or indications of the current state of performing an operation (e.g., a performing a data access command received from a corresponding one of the network protocol modules 500). Again, an indication that a component of one of the nodes 300a-b has suffered a malfunction may be the lack of receipt of an expected heartbeat signal or other status indication by the other of the nodes 300a-b within a specified period of time (e.g., within a recurring interval of time). In response to such an indication of a failure, the processor component 650 of the data storage module 600 of the non-failing one of the nodes 300a-b may effect a takeover of the functionality of the failing one of the nodes 300a-b. By way of example, in response to a failure of the active node 300a, the processor component 650 of the data storage module 600 of the inactive node 300b may signal its corresponding one of the network protocol modules 500 to take over communications with one or more of the client devices 100 and/or may begin performing the data access commands that were performed by the processor component 650 of the data storage module 600 of the failing active node 300a. In taking over the performance of those data access commands, the processor component 650 of the data storage module 600 of the node 300b may take over access to and control of the set of storage devices 800ab via the coupling that the data storage modules 600 of both of the nodes 300a and 300b share to the set of storage devices 800ab through the storage interconnect 899ab. It is in this manner that the partnering of the nodes 300a and 300b to form the HA group 1600ab may enable cooperation therebetween to provide high availability in accessing the client data 130 as stored within the set of storage devices 800ab.

As part of enabling such a takeover between the partnered nodes 300a and 300b, the processor component 650 of the data storage module 600 of whichever one of the nodes 300a or 300b is currently active to perform data access commands may transmit updated versions of the metadata 630ab and/or 830ab to the data storage module of the other of the nodes 300a-b via the HA interconnect 699ab in addition to storing such updated versions within the set of storage devices 800ab. It may be deemed desirable to directly exchange updated versions of the metadata 630ab and/or 830ab between these data storage modules 600 to ensure that both of these data storage modules 600 are more immediately provided with such updated versions. More precisely, it may be deemed desirable for the data storage module 600 of the inactive one of the nodes 300a or 300b that awaits the need to take over for the active one of the nodes 300a-b to avoid the need to itself retrieve the most up to date version of the metadata 630ab and/or 830ab from the set of storage devices 830ab to avoid the delay that would be incurred in performing such a retrieval, and thereby enable a takeover to be effected more quickly. The processor component 650 of the data storage module 600 of the active one of the nodes 300a or 300b may duplicate the metadata 630ab and/or 830ab and transmit the duplicate to the data storage module 600 of inactive one of the nodes 300a-b via the HA interconnect 699ab either on a recurring basis (e.g., at a regular time interval) or in response to the updating of either of the metadata 630ab or 830ab.

Although the performance of such duplication of the metadata 630ab and/or 830ab between the data storage modules 600 of the nodes 300a-b may provide redundancy that addresses errors occurring within one of the nodes 300a or 300b, such use of duplication may not address errors involving portions of the network along which the client interconnect 199 may extend (e.g., the network 999). As familiar to those skilled in the art, the use of additional interconnect(s) between partnered nodes of a HA group (e.g., the HA interconnects 699ab, 699cd and 699yz) tends to encourage physically locating partnered nodes of a HA group in close proximity to each other such that a localized failure of a network may render all nodes of a HA group inaccessible to the client devices 100. Specifically, a failure of a portion of a network that includes the client interconnect 199 in the vicinity of both of the nodes 300a and 300b may render both of the nodes 300a and 300b inaccessible to the client devices 100 such that the client device data 130 stored within the sets of storage devices 800ab becomes inaccessible through either of the nodes 300a or 300b. Stated differently, the entirety of the HA group 1600ab may become inaccessible.

To address this possible failure mode, the processor component 650 of the data storage module 600 of the active one of the nodes 300a-b may be caused by further execution of the control routine 640 to replicate data access commands it receives from a network protocol module 500 and transmit the resulting replica data access commands to an active node of another HA group, such as an active one of the nodes 300y-z of the HA group 1600yz. In so doing, the processor component 650 of the data storage module 600 of the active one of the nodes 300a-b enables the active one of the nodes 300y-z to replicate the performances of those data access commands. This results in data access commands performed by the active one of the nodes 300a-b to at least store the client device data 130 and changes thereto within the set of storage devices 800ab (e.g., data access commands to alter the client device data 130 as stored within the set of storage devices 800ab) also being performed by the active one of the nodes 300y-z to similarly alter the client device data 130 as stored within the set of storage devices 800yz. As a result, synchronization of the current state of the client device data 130 as stored within the sets of storage devices 800ab and 800yz may be maintained such that if both of the nodes 300a and 300b of the HA group 1600ab should become inaccessible to the client devices 100, the client device data 130 will remain available via the active one of the nodes 300y-z of the HA group 1600yz.

In communicating with the network protocol module 500 of the node 300a via the intra-cluster interconnect 599a, with the data storage module 600 of the node 300y via the inter-cluster interconnect 399, and with the storage devices 800ab via the storage interconnect 899ab, the processor component 650 of the data storage module 600 of the node 300a may perform various protocol conversions on commands and/or client device data 130 exchanged through each of these interconnects. More specifically, while commands exchanged via the interconnects 599a and/or 399 may conform to a protocol that may be substantially agnostic of a choice of file system employed in storing client device data 130 within the set of storage devices 800ab, the commands exchanged via the storage interconnect 899ab may necessarily employ a protocol that is associated with one or more specific file systems. Thus, the processor component 650 may perform various conversions in altering identifiers of blocks of data, in resizing blocks of data, in splitting and/or in combining blocks of data to resolve differences in protocols. Alternatively or additionally, the processor component 650 may perform conversions in file names and/or identifiers, etc.

The processor component 650 may designate or otherwise use a portion of the memory 660 as the synchronization cache 639a to maintain information indicative of the current state of components of the nodes 300a and 300b, to maintain synchronization of versions of the metadata 630ab and/or 830ab between the data storage modules 600 of the nodes 300a and 300b, and/or to maintain synchronization of the client device data 130 as stored within each of the sets of storage devices 800ab and 800yz. More specifically, the processor component 650 may maintain duplication data 636ab within the synchronization cache 639a, which may include indications of the current state of performance of various operations by the counterpart of the processor component 650 within the node 300b and/or may serve as a buffer of portions of the metadata 630ab and/or 830ab exchanged via the HA interconnect 699ab. Alternatively or additionally, the processor component 650 may maintain replication data 633a within the synchronization cache 639a, which may include indications of the current state of performance of replica data access commands, the current state of communications concerning those commands with the active one of the nodes 300y-z and/or the current state of performance of those commands by the active one of the nodes 300y-z.

Figure 5:
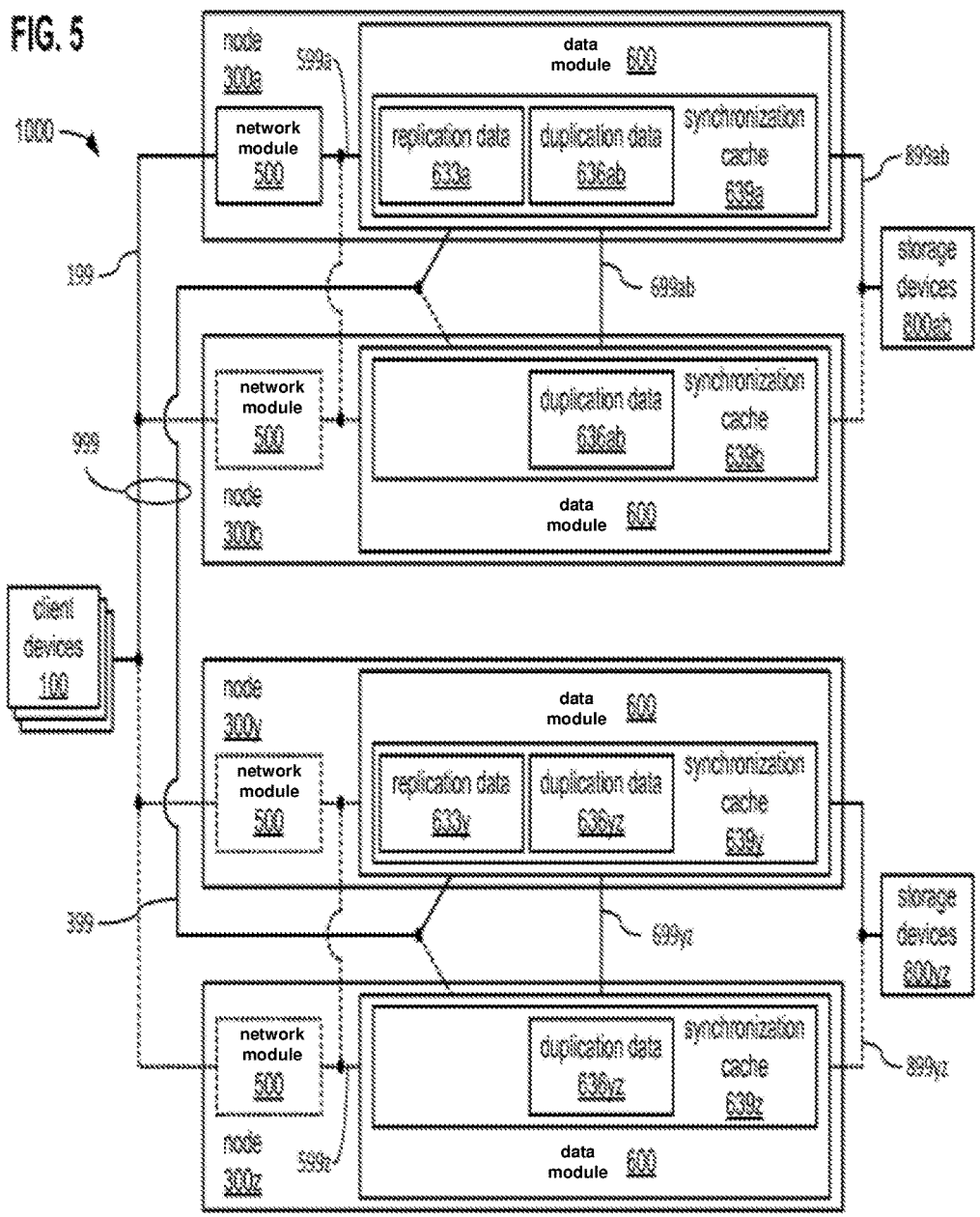
FIG. 5 illustrates an example embodiment of duplication data and replication of commands between nodes.

FIG. 5 depicts an example embodiment of duplication of metadata within a HA group, and replication of data access commands relating to the client device data 130 between nodes of different HA groups in greater detail. As depicted, the node 300a may be active within the HA group 1600ab to communicate with the client devices 100 via the client interconnect 199 and with node 300y, which may be active within the HA group 1600yz to communicate with the node 300a via the inter-cluster interconnect 399. The nodes 300b and 300z may be inactive as each awaits the need to take over for the nodes 300a or 300y, respectively. The active state of the node 300a for communication with the client devices 100 such that the network protocol module 500 of the node 300a is in use to do so is indicated by the portions of the client interconnect 199 coupling the node 300a to the client devices 100 being drawn with solid lines, while portions for coupling the nodes 300b and 300y-z to the client interconnect 199 are drawn with dotted lines. The active states of both the nodes 300a and 300y for communication with each other is indicated by the portions of the inter-cluster interconnect 399 coupling the nodes 300a and 300y being drawn with solid lines, while portions for coupling the nodes 300b and 300z to the inter-cluster interconnect 399 are drawn with dotted lines.

As depicted, synchronization caches 639b and 639y-z corresponding to the synchronization cache 639a may be formed within the memories 660 of the data storage modules 600 of each of the nodes 300b and 300y-z, respectively, to enable the duplication of metadata and/or the replication of data access commands as described above. The synchronization cache 639b may include the duplication data 636ab as part of enabling cooperation between the data storage modules 600 of the partnered nodes 300a and 300b to exchange status indications and/or duplicates of the metadata 630ab and/or 830ab therebetween. The synchronization caches 639a and 639b may be operated in a manner in which they are functionally linked to provide a portal between the data storage modules 600 of the nodes 300a and 300b that may be buffered at both ends of the HA interconnect 699ab. Indications of current status of these data storage modules 600 and/or duplicates of updated versions of the metadata 630ab and/or 830ab may be exchanged by writing such indications and/or pieces of metadata into the duplication data 636ab of one of the synchronization caches 639a or 639b, and retrieving such indications and/or pieces metadata from the duplication data 636ab of the other of the synchronization caches 639a or 639b. Stated differently, the contents of the duplication data 636ab may be recurringly "synchronized" between the synchronization caches 639a and 639b.

As also depicted, the synchronization cache 639y may include replication data 633y as a counterpart to the replication data 633a within the synchronization cache 639a as part of effecting cooperation between the data storage modules 600 of the nodes 300a and 300y to replicate the performance of data access commands received by the data storage module 600 of the node 300a from the network protocol module 500 of the node 300a. The replication data 633a and 633y may buffer information conveyed between the data storage modules 600 of the nodes 300a and 300y via the inter-cluster interconnect 399. More specifically, indications of current status of the replication of data access commands by the data storage module 600 of the node 300a, current status of at least partial parallel performance of the replica data access commands by the data storage module 600 of at least the node 300y, and/or current status of communications therebetween concerning the replica data access commands may be maintained as part of the replication data 633a. Alternatively or additionally, replica data access commands transmitted to the data storage module 600 of the node 300y, portions of client device data 130 conveyed with those replica data access commands and/or in response to those replica data access commands may also be maintained as part of the replication data 633a. Correspondingly, the replica data access commands received by the data storage module 600 of the node 300y via the inter-cluster interconnect 399 from the data storage module 600 of the node 300a may be buffered within the replication data 633y, along with any client device data 130 that accompanies those replica data access commands and/or responses thereto. Indications of the current status of performance of those replica data access commands by the data storage module 600 of the node 300y may also be buffered within the replication data 633y before being transmitted to the data storage module 600 of the node 300a.

As further depicted, the synchronization caches 639y and 639z may include duplication data 636yz as part of enabling cooperation between the data storage modules 600 of the partnered nodes 300y and 300z to exchange status indications and duplicates of updated metadata therebetween in much the same manner as described above between the data storage modules 600 of the nodes 300a and 300b. Stated differently, the data storage modules 600 of the nodes 300y and 300z may cooperate to recurringly exchange status indications (e.g., "heartbeat" signals and/or status of performing various operations) therebetween via the HA interconnect 699yz as part of each monitoring the other for indications of failure in a manner not unlike that in which the partnered nodes 300a and 300b exchange signals via the HA interconnect 699ab to monitor each other. Further, the data storage module 600 of the node 300y may transmit updated versions of metadata to the data storage module of the other of the nodes 300y-z via the HA interconnect 699yz in a manner not unlike that in which the partnered nodes 300a and 300b exchange updated metadata, in addition to storing such updated versions within the set of storage devices 800yz. It should be noted that the metadata used by and exchanged between the nodes 300y and 300z may be at least partly different from the metadata 630ab and/or 830ab used by and exchanged between the nodes 300a and 300b. This may arise at least partly due to the nodes 300a-b and the nodes 300y-z belonging to different HA groups and/or belonging to different clusters.

FIG. 6 depicts an example embodiment of a mesh of communications sessions formed among the nodes 300a-b and 300y-z through the inter-cluster interconnect 399 in greater detail. More specifically, through the inter-cluster interconnect 399, each of the nodes 300a and 300b of the HA group 1600ab forms a communications session with each of the nodes 300y and 300z of the HA group 1600yz, thereby forming the depicted mesh of communications sessions among the nodes 300a-b and 300y-z. As depicted, of these communications sessions, the communications session extending between the nodes 300a and 300y may be active (as indicated with a solid line), while the others of these communications sessions may be inactive (as indicated with dotted lines). This reflects the fact that the nodes 300a and 300y, at least initially, are each the active nodes of the HA groups 1600ab and 1600yz, respectively, that engage in communications to exchange replica data access commands and associated data to enable at least partially parallel performance of data access commands between the HA groups 1600ab and 1600yz.

Thus, during normal operation of the storage cluster system 1000 in which the nodes 300a and 300y are active nodes and no errors occur within either of the nodes 300a or 300y, a request for storage services is received by the node 300a via the client interconnect 199 from one of the client devices 100. Following conversion of the storage service request into a data access command by the network protocol module 500 of the node 300a, the data storage module 600 of the node 300a may both begin performance of the data access command and transmit a replica of that data access command to the node 300y via the active communications session formed through inter-cluster interconnect 399 between the nodes 300a and 300y. The data storage module 600 of the node 300y may then perform the replica data access command at least partly in parallel with the performance of the data access command by the data storage module 600 of the node 300a.

In preparation for such a transmission, the data storage module 600 of the node 300a may cooperate with the data storage module 600 of the node 300y to form the active communications session between the nodes 300a to 300y through an exchange of messages requesting and accepting formation of the active communications session. Following its formation, the data storage modules 600 of the nodes 300a and 300y may cooperate to maintain the active communications session by recurring exchanges of test signals (e.g., test messages) therethrough to monitor the state of the active communications session.

In addition to the data storage modules 600 of the nodes 300a and 300y cooperating to form and maintain the depicted active communications session through the inter-cluster interconnect 399 to support such exchanges of replica data access commands, the data storage modules 600 of all of the nodes 300a-b and 300y-z may cooperate to form and maintain the depicted inactive communications sessions through the inter-cluster interconnect 399 in preparation for handling an error condition affecting one of the nodes 300a or 300y. More specifically, in the event of a failure of at least a portion of the node 300a, the node 300b may take over for the node 300a, and in so doing, may change the state of the inactive communications session extending between the data storage modules 600 of the nodes 300b and 300y into an active communications session. By doing so, the node 300b becomes able to transmit replica data access commands to the node 300y in place of the node 300a. Correspondingly, in the event of a failure of at least a portion of the node 300y, the node 300z may take over for the node 300y, and in so doing, may change the state of the inactive communications session extending between the data storage modules 600 of the nodes 300a and 300z into an active communications session. By doing so, the node 300z becomes able to receive and perform replica data access commands from the node 300a in place of the node 300y.

Figure 7C:
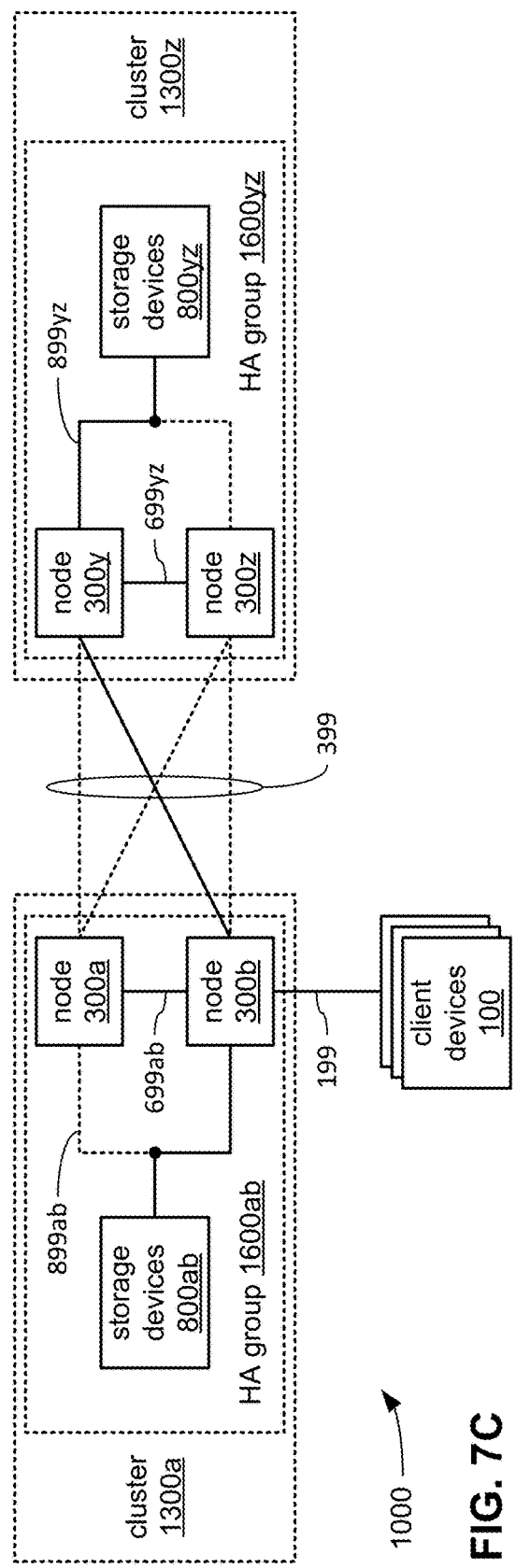

FIGS. 7A, 7B and 7C, together, depict example configurations of active and inactive communications sessions that may arise among the nodes 300a-b and 300y-z in response to different operating conditions of these nodes in greater detail. FIG. 7A depicts an example configuration that may arise where the nodes 300a and 300y are active nodes exchanging replica data access commands and performing data access commands at least partly in parallel between them. Again, in support of such exchanges between the active nodes 300a and 300y, an active communications session (depicted with a solid line) may be formed and maintained between the nodes 300a and 300y, while other inactive communications sessions (depicted with dotted lines) may be formed and maintained between other pairs of the nodes 300a-b of the HA group 1600ab and the nodes 300y-z of the HA group 1600yz in preparation for responding to error conditions that may occur involving either of the nodes 300a or 300y.

FIG. 7B depicts an example configuration that may arise where an error involving the node 300y has occurred such that the node 300y is no longer able to perform a replica data access command and/or is no longer able to receive a replica data access command from another node (e.g., the node 300a). As depicted, the communications session extending between the nodes 300a and 300y may no longer be active. Instead, the state of the communications session extending between the nodes 300a and 300z may be changed to active to support the node 300z taking over for the node 300y such that the node 300a transmits replica data access commands to the node 300z in lieu of the node 300y.

FIG. 7C depicts an example configuration that may arise where an error involving the node 300a has occurred such that the node 300a is no longer able to perform a data access command and/or is no longer able to transmit a replica of a data access command to another node (e.g., the node 300y). As depicted, the communications session extending between the nodes 300a and 300y may no longer be active. Instead, the state of the communications session extending between the nodes 300b and 300y may be changed to active to support the node 300b taking over for the node 300a such that the node 300b transmits replica data access commands to the node 300y in lieu of the node 300a. As also depicted in FIG. 7C, the node 300b may also take over for node 300a in communicating with one or more client devices 100. Thus, the node 300b may receive requests for storage services from one or more of the client devices 100 via the client interconnect 199 in lieu of the node 300a.

Returning to FIG. 6, in preparation for cooperating to form the mesh of communications sessions, the data storage modules 600 of the nodes 300a and 300y may each have been provided with indications of various aspects of operation of the storage cluster system 1000 by corresponding ones of the M-modules 400 and/or the network protocol modules 500 of each of the nodes 300a and 300y. Such aspects may include which nodes are members of which HA groups and/or clusters, what node within each HA group is to initially engage in communications with node(s) of other HA group(s), network addresses of nodes of other HA groups, etc. As previously discussed, such aspects of operation of the storage cluster system 1000 may be provided to a M-module 400 of one or more of the active ones of the nodes 300a-d or nodes 300y-z via the client interconnect 199 by one or more of the client devices 100. Alternatively or additionally, a network protocol module 500 of one or more of the active ones of the nodes 300a-d or nodes 300y-z may perform various tests on one or more of the interconnects 199, 599a and 599z to locate other nodes of other HA groups, to otherwise identify addresses of other nodes of other HA groups, and/or to obtain other information pertinent to establishing communications sessions with nodes of other HA groups.

Figure 8A:
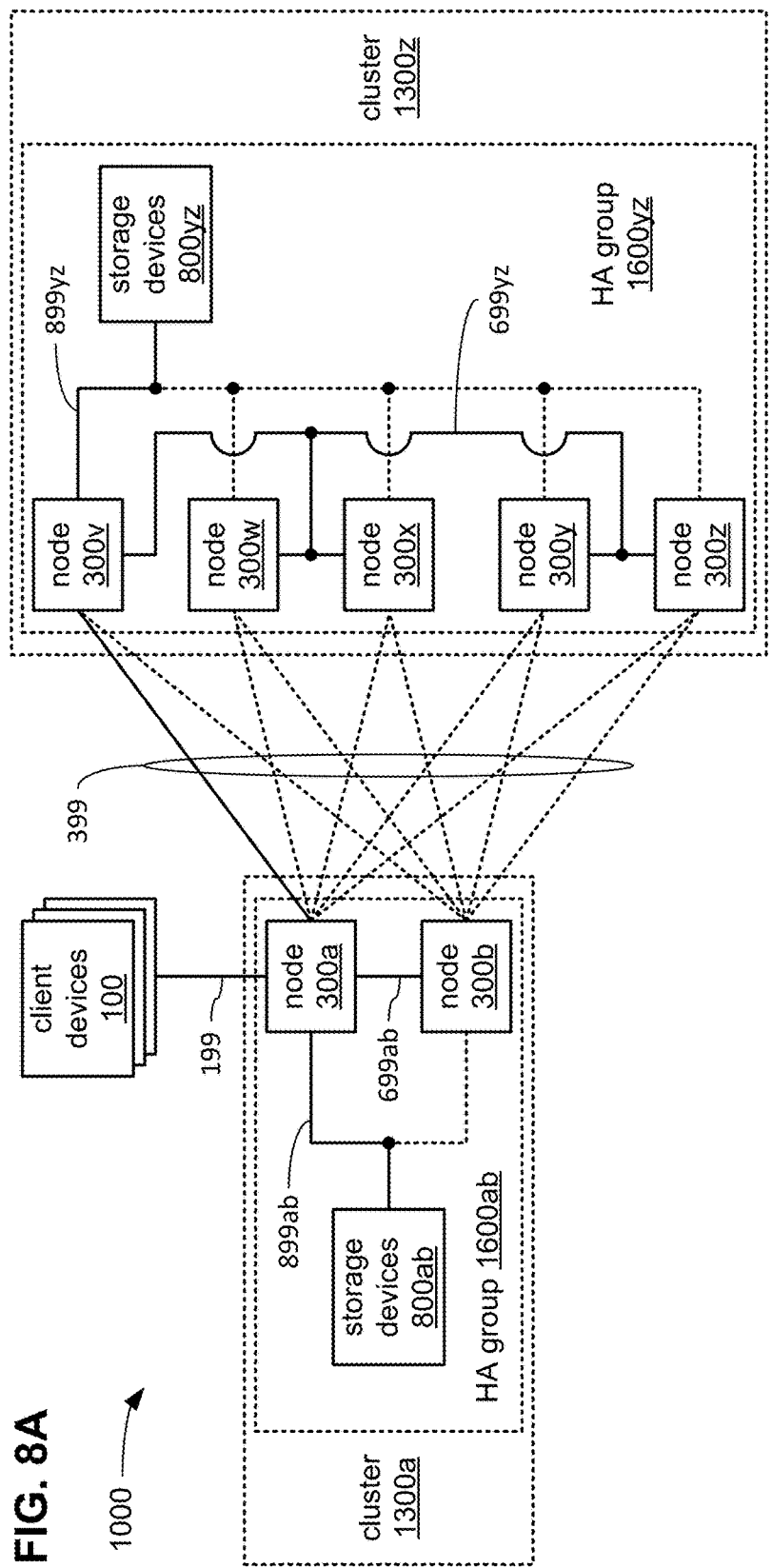

FIGS. 8A, 8B and 8C each depict an alternate example embodiment of a mesh of communications sessions formed among differing quantities of nodes. FIG. 8A depicts a mesh of communications sessions formed among a larger quantity of nodes 300a-b and 300v-z through the inter-cluster interconnect 399 in greater detail. FIG. 8B depicts a mesh of communications sessions formed among a smaller quantity of nodes 300a-b and 300e, and FIG. 8C depicts a mesh of communications sessions formed among a differing smaller quantity of nodes 300e and 300y-z.

Turning to FIG. 8A, the HA group 1600yz is depicted as including nodes 300v, 300w and 300x in addition to the nodes 300y and 300z. Apart from specifically illustrating that embodiments are possible in which a HA group may include more than two nodes, FIG. 8A also depicts the resulting expansion of the mesh of communications sessions among the nodes of the two depicted HA groups. More specifically, each of the nodes 300a and 300b of the HA group 1600ab is coupled via a communications session to each of the nodes 300v, 300w, 300x, 300y and 300z of the HA group 1600yz. As also depicted, despite the greater quantity of communications sessions, there may still be only one of the communications sessions in an active state (as depicted with a solid line) while the others are in an inactive state (as depicted with dotted lines). As also depicted, the HA interconnect 699yz is also extended to couple all of the nodes 300v-z of the HA group 1600yz.

In this example embodiment, if an error involving the node 300v occurs such that another node of the HA group 1600yz takes over for the node 300v, that other node may be any of nodes 300w, 300x, 300y or 300z. As part of such a takeover, the communications session between the node 300a and 300v may become inactive, while the communications session between the node 300a and whichever one of the nodes 300w-z takes over for the node 300v may become the new active communications session. To enable such a takeover, the node 300*v* may store metadata (and any updates thereto) concerning aspects of the operation of at least a portion of the storage cluster system 1000 (e.g., aspects of the operation of the HA group 1600*yz*) within the set of storage devices 800*yz* to enable whichever of the nodes 300*w-z* that may take over for the node 300*v* to retrieve that metadata from the set of storage devices 800*yz* following rebooting. Alternatively or additionally, the node 300*v* may transmit such metadata (and any updates thereto) to each of the nodes 300*w-z* via the HA interconnect 699*yz* to provide those nodes with more immediate access to that metadata.

Turning to FIG. 8B, the cluster 1300*a* is depicted as including node 300*e* in addition to the at least the nodes 300*a* and 300*b*. Unlike the nodes 300*a* and 300*b*, which are partners within the HA group 1600*ab*, the node 300*e* is not partnered within any other node in any HA group. Further, the node 300*e* belongs to the same cluster 1300*a* as the partnered nodes 300*a-b*. Much of the preceding discussion has centered on embodiments in which increased redundancy is provided by replication of performance of data access commands between active nodes of at least two different HA groups belonging to at least two separate clusters, which may be deemed a desirable approach to providing multiple forms of redundancy. However, FIG. 8B illustrates that a somewhat lesser increase in redundancy may be provided by replication of performance of data access commands between an active node of a HA group and another active node that is not a member of any HA group, and which may belong to the same cluster.

Turning to FIG. 8C, the cluster 1300*a* is again depicted as including node 300*e*. Again, unlike other earlier discussed nodes (e.g., the depicted nodes 300*y* and 300*z*), which are partners within a HA group, the node 300*e* is again not partnered within any other node in any HA group. Further, the node 300*e* again belongs to the cluster 1300*a*. Again, it may be deemed a desirable to employ the redundancy of active nodes in separate HA groups of separate clusters to increase redundancy. However, FIG. 8C illustrates that a somewhat lesser increase in redundancy may be provided by replication of performance of data access commands between an active node of a HA group and an active node that is not a member of any HA group and that is active to engage in communications with one or more of the client devices 100.

In various embodiments, each of the processor components 450, 550 and 650 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked.

In various embodiments, each of the memories 460, 560 and 660 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 490, 590 and 690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 10:
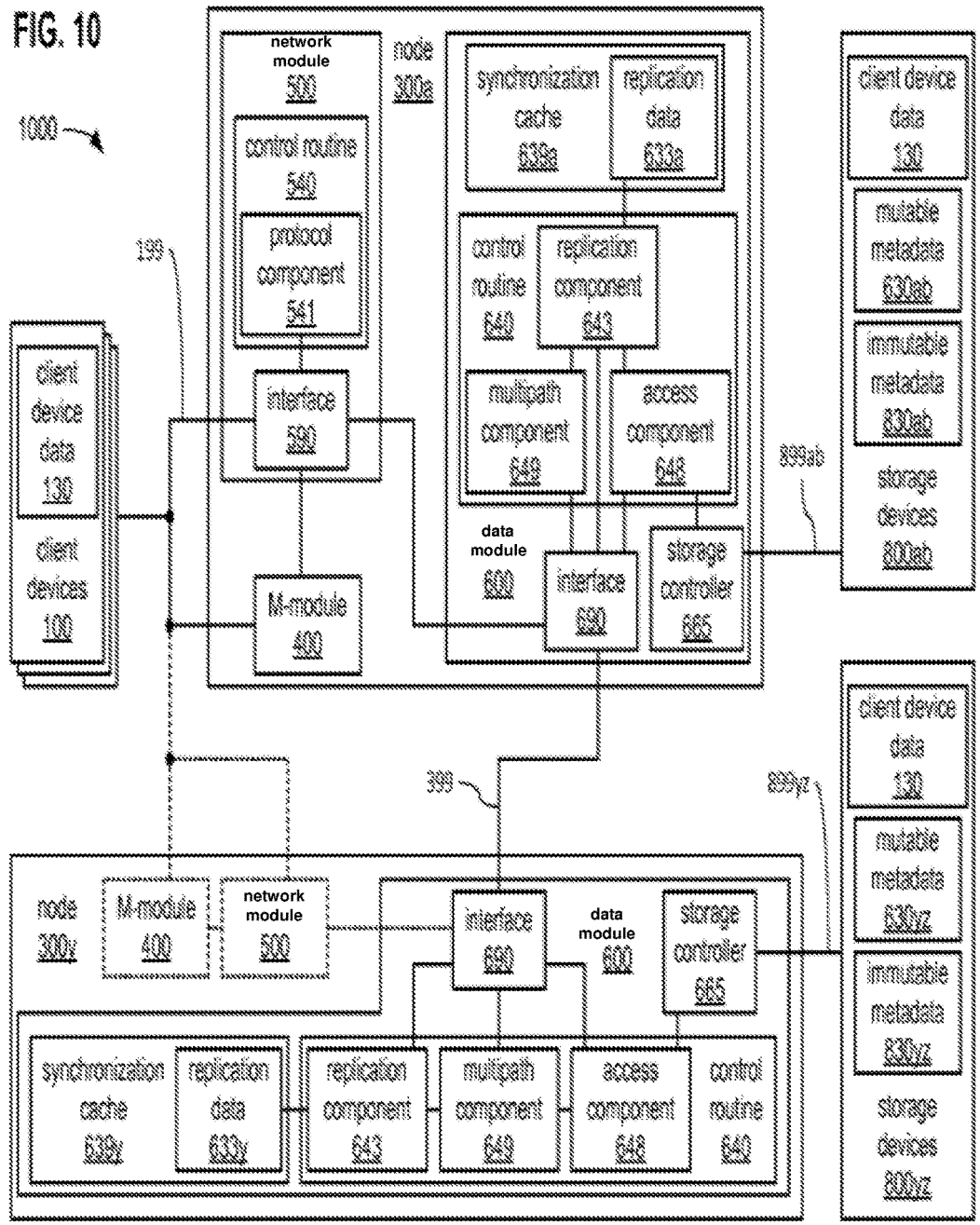
FIG. 10 illustrates an example embodiment of replicating a data access command between nodes.

FIGS. 9 and 10 each illustrate a block diagram of an example portion of an embodiment of the storage cluster system 1000 in greater detail. More specifically, each of FIGS. 9 and 10 depict aspects of the operating environments of the M-modules 400, network protocol modules 500 and data storage modules 600 in which the processor components 450, 550 and 650 are caused by their execution of the control routines 440, 540 and 640, respectively, to duplicate at least metadata and/or replicate data access commands that alter the client device data 130.

FIG. 9 depicts aspects of an example of cooperation among components of at least the data storage modules 600 of the nodes 300*a* and 300*b* to derive, duplicate and store the mutable metadata 630*ab* and/or the immutable metadata 830*ab* within the set of storage devices 800*ab* to make the metadata 630*ab* and/or 830*ab* more readily available to the data storage modules 600 of the nodes 300*a* and 300*b* after rebooting. FIG. 10 depicts aspects of an example of cooperation among components of at least the data storage modules 500 of the nodes 300*a* and 300*y* to replicate and coordinate the performance of data access commands at least partly in parallel. As recognizable to those skilled in the art, the control routines 440, 540 and 640, including the components of which each may be composed, are selected to be operative on whatever type of processor or processors may be selected to implement applicable ones of the processor components 450, 550 or 650, or to be operative on whatever type of processor or processors may be selected to implement a shared processor component.

In various embodiments, each of the control routines 440, 540 and 640 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for corresponding ones of the processor components 450, 550 or 650, or appropriate for a shared processor component. Where one or more device drivers are included, those device drivers may provide support for any of a variety of other components, whether hardware or software components, of corresponding ones of the modules 400, 500 or 600.

Turning to FIG. 9, it should noted that nodes 300*a* and 300*b* are depicted as partnered (e.g., their data storage modules 600 are coupled via the HA interconnect 699*ab*) with the node 300*a* active and the node 300*b* inactive in readiness to take over for its partner, the node 300*a*. As a result, it may be the M-module 400 and the network protocol module 500 of the node 300*a* that engage in communications with one or more of the client devices 100 via the client interconnect 199, and not the M-module 400 or the network protocol module 500 of the node 300*b*. This is depicted in FIG. 9 by the M-module 400 and the network protocol module 500 of the node 300*a* being drawn with solid lines, while the M-module 400 and the network protocol module 500 of the node 300*b* are drawn with dotted lines. It should further be noted that, although FIG. 9 depicts cooperation among components of data storage modules 600 of the partnered nodes 300*a-b* and the set of storage devices 800*ab*, such cooperation may also occur among components of data storage modules 600 of the partnered nodes 300*c-d* and the set of storage devices 800*cd*, and/or may also occur among components of data storage modules 600 of the partnered nodes 300*y-z* and the set of storage devices 800*yz*.

The control routine 440 may include a configuration component 441 that may be executable by the processor component 450 to accept configuration information concerning various aspects of the operation of at least the node within which the control routine 440 is executed from one or more of the client devices 100 via the client interconnect 199. As previously discussed, any of a variety of mechanisms may be employed to accept configuration information from one or more of the client devices 100, including and not limited to, the configuration component 441 providing a webpage, supporting a telnet connection, accepting a file or other data structure conveying configuration information, etc., via the client interconnect 199. Upon receiving configuration information and/or updates thereto, the configuration component 441 may operate the interface 490 to provide such configuration information as metadata to one or both of the network protocol module 500 and the data storage module 600 of the same node.

The control routine 540 may include a discovery component 543 that may be executable by the processor component 550 to perform various tests to determine various aspects of the operation of at least the node within which the control routine 540 is executed. By way of example, the discovery component 543 may perform tests on the client interconnect 199 to determine and/or verify address(es) at which M-module(s) 400 and/or network protocol module(s) 500 of one or more others of the nodes 300*a-d* and/or 300*y-z* may be accessible via the client interconnect 199. Alternatively or additionally, the discovery component 543 may perform tests on the intra-cluster interconnect to which it is coupled (e.g., one of the intra-cluster interconnects 599*a* or 599*z*) to determine and/or verify address(es) at which network protocol module(s) 500 and/or data storage module(s) 600 of one or more of the nodes 300*a-d* or 300*y-z* may be accessible via that inter-cluster interconnect. While performing tests of accessibility of data storage module(s) 600 of one or more of the nodes 300*a-d* or 300*y-z*, the discovery component 543 may request that each such data storage module 600 indicate the address at which it may be accessible on a HA interconnect to which it may be coupled (e.g., one of the HA interconnects 699*ab*, 699*cd* or 699*yz*).

Where the discovery component 543 seeks to verify aspects of accessibility of components of one or more of the nodes 300*a-d* and/or 300*y-z*, the discovery component 543 may do so to confirm and/or update metadata provided by the configuration component 441 of the M-module 400 that reflects configuration information received by the configuration component 441. Following the performance of such tests, the discovery component 543 may operate the interface 590 to provide results of those tests as metadata to the data storage module 600 of the same node.

The control routine 640 within a data storage module 600 of each of the partnered nodes 300*a* and 300*b* may include an access component 648 that may be executable by a processor component 650 to operate a corresponding storage controller 665 to perform data access commands received from a network protocol module 500. The access component 648 may operate the storage controller 665 to define and maintain one or more arrays of storage devices of a set of storage devices (e.g., the set of storage devices 800*ab*) to provide redundancy. The access component 648 may also operate the storage controller 665 to operate one or more of such storage devices to store pieces of client device data 130 and/or retrieve pieces of client device data 130 as commanded by the received data access commands.

The access component 648 and/or the controller 665 may recurringly perform tests on a set of storage devices (e.g., the set of storage devices 800*ab*) to which the controller 665 may be coupled via a storage interconnect (e.g., the storage interconnect 899*ab*) and/or may monitor the results of performing previous data access commands to determine whether an error condition exists. The access component 648 may employ the results of such tests and/or of performing previous data access commands to determine whether to provide an indication to one or more other components of the data storage module 600 of successfully accepting and/or being able to successfully accept data access commands, or to provide an indication of an error precluding performance of a data access command. Further, the access component 648 may condition providing an indication of successfully accepting a data access command and/or being able to successfully accept a subsequent data access command on whether the data access component 648 and/or the controller 665 encounter no errors in commencing (e.g., not necessarily completing) performance of a data access command.

Where two or more nodes of a HA group share a coupling to a set of storage devices (e.g., the nodes 300a and 300b sharing the set of storage devices 800ab via the storage interconnect 899ab), the access components 648 of data storage modules 600 of each of those partnered nodes may cooperate to coordinate which node has access to and control over that set of storage devices at any given time. It may be that access to that set of storage devices is to be provided only to whichever one of those nodes of that HA group is currently active, while the one or more partners of that node in that HA group do not have access until one of those partner(s) takes over for the active node. When such a take over occurs, the access components 648 of the node to be taken over from and the node that does the taking over may cooperate to transfer access to that set of storage devices from one to the other.

The control routine 640 within a data storage module 600 of each of the partnered nodes 300a and 300b may include a duplication component 646 that may be executable by a processor component 650 to form, distribute, store and update the mutable metadata 630ab and/or the immutable metadata 830ab. The duplication component 646 within whichever one of the nodes 300a-b is active may receive portions of metadata and/or updates thereto from at least one or both of the M-module 400 and the network protocol module 500 of the same one of the nodes 300a or 300b via the intra-cluster interconnect 599a. Within that one of the nodes 300a or 300b, the duplication component 646 may combine such portions of metadata and/or updates to those portions of metadata to form the mutable metadata 630ab and/or the immutable metadata 830ab. Again, the mutable metadata 630ab may include indications of addresses at which one or more of the nodes 300a-d and/or 300y-z (or at which various components thereof) may be accessible on one or more of the client interconnect 199; the inter-cluster interconnect 399; one of the intra-cluster interconnects 599a or 599z; and/or one of the HA interconnects 699ab, 699cd or 699yz. As previously discussed, the information selected for inclusion in the mutable metadata 630ab (such as addresses on networks) may be deemed likely to change more frequently than the information selected for inclusion within the immutable metadata 830ab. Thus, the immutable metadata 830ab may include indications of which of the nodes 300a-d and/or 300y-z are partnered into HA groups (e.g., one of the HA groups 1600ab, 1600cd or 1600yz), or which of the nodes 300a-d and/or 300y-z belong to which of one or more clusters (e.g., one of the clusters 1300a or 1300z). Alternatively or additionally, the immutable metadata 830ab may include indications of what RAID level and/or what file system is used in storing data (e.g., the metadata 630ab, the immutable metadata 830ab, the client device data 130 and/or the other client device data 131) within one or more of the sets of storage devices 800ab, 800cd or 800yz. Where a HA group includes more than two nodes, the immutable metadata 830ab may indicate an order of succession by which each node in that HA group takes over for one of its partners. By way of example, the immutable metadata 830ab may indicate relationships between nodes (e.g., what HA group and/or what cluster each belongs to), while the mutable metadata 630ab may indicate current known addresses by which components of each of those nodes may be accessed on various ones of the interconnects 199, 399, 599a, 599z, 699ab, 699cd and/or 699yz.

Following formation of the mutable metadata 630ab and/or the immutable metadata 830ab from portions of metadata or updates thereto from at least the M-module 400 and/or the network protocol module 500, the duplication component 646 within whichever one of the nodes 300a-b is active may provide one or both of the metadata 630ab and/or 830ab to the access component 646 within the same one of the nodes 300a-b to store within the set of storage devices 800ab. Again, the metadata 630ab and/or 830ab may be stored within either the same volume and/or aggregate as at least a portion of the client device data 130. Such storage of the metadata 630ab and/or 830ab within the set of storage devices 800ab makes available a relatively persistent copy of the metadata 630ab and/or 830ab that may be retrieved by the data storage module 600 of whichever one of the nodes 300a-b is active after a rebooting procedure that may cause the relatively non-persistent copy of the metadata 630ab and/or 830ab that may have been present within the memory 660 of that data storage module 600 to be lost. Again, the ability to so retrieve the metadata 630ab and/or 830ab from the set of storage devices 800ab may preclude the need to request a M-module 400 and/or network protocol module 500 (either of which may also be rebooting or have rebooted) which may incur an undesirable delay. Thus, retrieval of the metadata 630ab and/or 830ab from the set of storage devices 800ab may take less time, thereby allowing a data storage module 600 of whichever one of the nodes 300a-b is active to more quickly resume performing data access commands In some embodiments, the data storage module 600 of whichever one of the partnered nodes 300a-b stands by to take over for its partner may also be able to retrieve the metadata 630ab and/or 830ab from the set of drives 800ab.

Also following formation of the mutable metadata 630ab and/or the immutable metadata 830ab from portions of metadata or updates thereto from at least the M-module 400 and/or the network protocol module 500, the duplication component 646 within whichever one of the nodes 300a-b is active may operate the interface 690 to transmit duplicates of one or both of the metadata 630ab and/or 830ab to the data storage module 600 of its partner via the HA interconnect 699ab. This may be done in addition to storage of the metadata 630ab and/or 830ab within the set of storage devices 800ab as a way to more immediately synchronize the copies of the metadata 630ab and/or 830ab maintained by each of the data storage modules 600 of the partnered nodes 300a and 300b within their respective memories 660. This may be deemed desirable to enable a quicker takeover of one of the nodes 300a-b by its partner by not requiring the one of the nodes 300a-b that takes over to retrieve the current version of the metadata 630ab and/or 830ab from the set of storage devices 800ab. It should be noted that transitioning access to and/or control over the set of storage devices 800ab from one of the nodes 300a-b to its partner may take an amount of time that it is deemed to be undesirably long, as it may cause too great a delay in enabling the one of the nodes 300a-b that takes over to begin performing data access commands. In performing such an exchange of duplicates of the metadata 630ab and/or 830ab between data storage modules 600 of the nodes 300a-b, the duplication components 646 of those data storage modules may each maintain duplication data 636ab within corresponding ones of the synchronization caches 639a and 639b. These duplication components 646 may cooperate to employ the 636ab within each of the synchronization caches 639a and 639*b* as a double-buffered portal in exchanging the duplicates of the metadata 630*ab* and/or 830*ab* therebetween.

In various embodiments, the duplication component 646 may repeat formation of the metadata 630*ab* and/or 830*ab* to thereby form updated versions of the metadata 630*ab* and/or 830*ab* in response to the receipt of updates to at least portions of metadata received from a M-module 400, a network protocol module 500 and/or some other source. The duplication component 646 may also repeat storage of the metadata 630*ab* and/or 830*ab* within the set of storage devices 800*ab* to persistently store the more updated versions of the metadata 630*ab* and/or 830*ab* therein. Alternatively or additionally, the duplication component 646 may also repeat operation of the interface 690 to repeat transmission of duplicates of the metadata 630*ab* and/or 830*ab* to another data storage module 600 of the nodes 300*a-b* to provide duplicates of the updated versions of the metadata 630*ab* and/or 830*ab* thereto.

The control routine 640 within data storage modules 600 of each partnered node of a HA group may include a partnering component 645 that may be executable by a processor component 650 in each of those partnered nodes to cooperate to monitor the status of other partnered node(s) and to effect a takeover of one of those nodes by a partner in response to a failure. Again, as depicted in FIG. 9, it is the node 300*a* that is active to engage in communications with client devices 100 such that the data storage module 600 of the node 300*a* receives and performs data access commands, while it is the data storage module 600 of the node 300*b* that is inactive while awaiting an indication of a failure occurring within the node 300*a* as a trigger to act to take over for the node 300*a*. Thus, the partnering component 645 of a data storage module 600 of each of the nodes 300*a-b* may operate corresponding interfaces 690 to exchange indications of the current state of each of the nodes 300*a-b* on a recurring basis via the HA interconnect 699*ab*. Again, such recurring exchanges may include a "heartbeat" signal transmitted across the HA interconnect 699*ab* by each of the nodes 300*a-b* to its partner. Alternatively or additionally, such exchanges may include indications of the status of performance of a data access command and/or other operation. As yet another alternative, such exchanges may include indications of addresses at which each of the data storage modules 600 of the nodes 300*a-b* is accessible on one or both of the interconnects 599*a* and 699*ab*. The partnering component 645 of at least the active node (e.g., the node 300*a*) may update the metadata 630*ab* and/or 830*ab* to indicate the change and/or may store the updated version of the metadata 630*ab* and/or 830*ab* within the set of storage devices 800*ab*, or the partnering component 645 may signal the duplication component 646 of the same node to do so.

Absence of receipt of a heartbeat signal and/or other indication within an expected period of time by one of the nodes 300*a-b* may be taken as an indication of a failure having occurred in its partner. Alternatively or additionally, where a failure has occurred within one of the nodes 300*a-b*, the partnering component 645 of that failing one of the nodes 300*a-b* may transmit an indication describing an aspect of that failure via the HA interconnect 699*ab* to its non-failing partner. Regardless of the exact form of an indication of a failure within an active one of partnered nodes of a HA group, the partnering component 645 within an inactive partner of the failing active node may take action in response to the indication to effect a takeover of the failing active node by that inactive partner. In contrast, if failure is indicated as occurring within an inactive node of a HA group, there may be no take over performed in response, since inactive nodes, by definition, are not be engaged in communications or in performing data access commands that must be taken over by a partner.

Thus, in FIG. 9, the partnering component 645 of the node 300*b* may respond to an indication of failure within the node 300*a* by signaling one or more other components of the node 300*b* to effect a takeover. More specifically, the partnering component 645 of the node 300*b* may signal the network protocol module 500 of the node 300*b* to begin accepting requests for storage services from one or more of the client devices 100 in place of the network protocol module 500 of the node 300*a*. Alternatively or additionally, the partnering component 645 of the node 300*b* may signal other components within the data storage module 600 of the node 300*b* to begin performing data access commands in place of the data storage module 600 of the node 300*a*. In preparation for such performance of data access commands, the partnering component 645 of the node 300*b* may signal the access component 648 of the node 300*b* to operate the storage controller 665 of the node 300*b* to take over access to and control of the set of storage devices 800*ab* from the node 300*a*. In some embodiments, the partnering component 645 of the node 300*b* may further respond to an indication of failure within the node 300*a* by updating the mutable metadata 630*ab* and/or the immutable metadata 830*ab* to indicate that node 300*b* is now the active node of the nodes 300*a-b* and/or that the node 300*a* has suffered a failure. Alternatively, the partnering component 645 of the node 300*b* may signal the duplication component 646 of the node 300*b* to so update the metadata 630*ab* and/or 830*ab*. Further, once the storage controller 665 of the node 300*b* has access to and/or control over the set of storage devices 800*ab* as a result of the take over from the node 300*a*, the partnering component 645 and/or the duplication component 646 may store the updated version of the metadata 630*ab* and/or 830*ab* within the set of storage devices 800*ab*.

Turning to FIG. 10, it should noted that nodes 300*a* and 300*y* are each depicted as the active nodes within their respective HA groups 1600*ab* and 1600*yz*, with the node 300*a* in communication with one or more of the client devices 100 to perform data access commands and the node 300*y* in communication with the node 300*a* to perform replica data access commands. As a result, it may be the M-module 400 and the network protocol module 500 of the node 300*a* that engage in communications with one or more of the client devices 100 via the client interconnect 199, and not the M-module 400 or the network protocol module 500 of the node 300*y*. This is depicted in FIG. 10 by the M-module 400 and the network protocol module 500 of the node 300*a* being drawn with solid lines, while the M-module 400 and the network protocol module 500 of the node 300*b* are drawn with dotted lines.

The control routine 540 may include a protocol component 541 that may be executable by the processor component 550 to convert protocols between the client interconnect 199 and the intra-cluster interconnect 599*a*. As has been discussed, various requests for storage services that may be received from one or more of the client devices 100 via the client interconnect 199 may include requests to store client device data 130 and/or to retrieve client device data 130. As also previously discussed, the protocols employed in communications with the client devices 100 may include file-based access protocols, including and not limited to, Common Internet File System (CIFS) protocol or Network File System (NFS) protocol, over TCP/IP. Alternatively or additionally, the protocols employed in communications with the client devices 100 may include block-based access protocols, including and not limited to, Small Computer Systems Interface (SCSI) protocol encapsulated over TCP (iSCSI) and/or SCSI encapsulated over Fibre Channel (FCP). Again, the use of one or more of these protocols may reflect the use of a client/server model for the handling of client device data 130 between the client devices 100 and the nodes 300*a-d* and/or 300*y-z*.

More specifically, the protocol component 541 may convert requests for storage services received from the client devices 100 via the client interconnect 199 into data access commands to provide the requested storage services, before operating the interface 590 to relay those data access commands to a data storage module 600 via the interconnect 599*a*. The protocol component 541 may also convert responses received from a data storage module 600 into an appropriate protocol for responding to a request for storage services, before operating the interface 590 to relay those responses to one or more of the client devices 100 via the client interconnect 199. The protocol component 541 may further convert the protocols employed in conveying pieces of the client device data 130 as the protocol component 541 relays the pieces of the client device data 130 between the client interconnect 199 and the intra-cluster interconnect 599*a*.

The control routine 640 may include a replication component 643 that may be executable by the processor component 650 within one active node to both control performance of and replicate data access commands received by a data storage module 600 of from a network protocol module 500, and to transmit those replica data access commands to a data storage module 600 of another active node of a different HA group and/or different cluster. Within the other active node, the replication component 643 may be executable by the processor component 650 to receive and control performance of the replica data access commands to cause such performance to occur at least partly in parallel with the performance of the data access commands. Thus, the replication components 643 of data storage modules 600 of two active nodes, one of which may be in communication with one of the client devices 100, cooperate via the inter-cluster interconnect 399 to coordinate replication and at least partial parallel performance of data access commands between those two data storage modules 600.

Again, as depicted in FIG. 10, it is the node 300*a* that is active within one HA group to engage in communications with client devices 100 such that the data storage module 600 of the node 300*a* receives data access commands therefrom to perform, while it is the data storage module 600 of node 300*y* that is active within another HA group to receive the replica data access commands to perform. Thus, it is the replication component 643 of the data storage module 600 of the node 300*a* that replicates data access commands received from the network protocol module 500 of the node 300*a* and transmits the replica data access commands to the data storage module 600 of the node 300*y* via the inter-cluster interconnect 399, while also relaying those data access commands to the access component 648 within the data storage module 600 of the node 300*a* to be performed. In contrast, the replication component 643 of the data storage module 600 of the node 300*y* does not perform such replication, and instead, relays the replica data access commands received from the data storage module 600 of the node 300*a* to the access component 648 within the data storage module 600 of the node 300*y* to be performed at least partly in parallel with the performance of the data access commands by the access component 648 within the node 300*a*.

As previously discussed, the access component 648 within each of the nodes 300*a-d* and 300*y-z* may perform various tests of corresponding ones of the sets of storage devices 800*ab*, 800*cd* and 800*yz* and/or may monitor the results of the performance of data access commands to determine whether an error condition precluding the performance of subsequent data access commands exists. Further, in response to receiving subsequent data access commands to perform from a corresponding one of the replication components 643, each of the data access components 648 may provide the corresponding one of the replication components 643 with an indication of successful acceptance of the subsequent data access commands or an indication of an error. Thus, after relaying a data access command to the access component 648 of the data storage module 600 of the node 300*a* and after transmitting a replica of that data access command to the data storage module 600 of the node 300*y* via the inter-cluster interconnect 399, the replication component 648 of the node 300*a* may await receipt of indications of success and/or errors from each. Further, after relaying the replica data access command to the access component 648 of the data storage module 600 of the node 300*y*, the replication component 643 of the data storage module 600 of the node 300*y* may await receipt of an indication of success and/or errors therefrom.

Again, each data access component 648 may condition the provision of an indication of successful acceptance of a data access command (or replica thereof) on whether commencement of performance of that data access command (or replica thereof) proves to be possible without errors. Thus, the replication component 643 of the data storage module 600 of the node 300*y* may receive an indication of successful acceptance of the replica data access command from the access component 648 of the data storage module 600 of the node 300*y*, and may take such an indication as an assurance that the replica data access command will be successfully performed. The replication component 643 of the data storage module 600 of the node 300*y* may then relay the indication of successful acceptance of the replica data access command back to the replication component 643 of the data storage module 600 of the node 300*a* via the inter-cluster interconnect 399. In turn, the replication component 643 of the data storage module 600 of the node 300*a* may receive the indication of successful acceptance of the replica data access command from the node 300*y*, may receive an indication of successful acceptance of the data access command from the access component 648 of the data storage module 600 of the node 300*a*, and may take the pair of such indications as an assurance that the data access command will be successfully performed at least partly in parallel within both of the nodes 300*a* and 300*y*. The replication component 643 of the data storage module 600 of the node 300*a* may then transmit an indication of successful performance of the data access command back to one or more of the client devices 100 via the client interconnect 199. Since, the replication component 643 of the data storage module 600 of the node 300*a* may command the network protocol module 500 of the node 300*a* to provide an indication of success in performing a data access command to one of the client devices 100 based on the indications of successful acceptance of the data access command and its replica, the transmission of the indication of successful performance to that client device 100 may occur at least partly in parallel with the performance of that data access command and/or its replica.

In replicating data access commands, the replication component 643 of the data storage module 600 of the node 300*a* may store copies and/or indications of what the replica data access commands are as part of replication data 633*a* within the synchronization cache 639*a*, and may do so along with pieces of client device data 130 that may accompany the replica data access commands. Correspondingly, the replication component 643 of the data storage module 600 of the node 300*y* may store copies and/or indications of the replica data access commands received from the node 300*a* via the inter-cluster interconnect 399 as part of replication data 633*y* within the synchronization cache 639*y*, and may also do so along with pieces of client device data 130 that may accompany the replica data access commands. Further, the replication component 643 of the data storage module 600 of the node 300*y* may buffer indications of the status of the performance of the replica data access commands by the access component 648 of the data storage module 600 of the node 300*y* as part of the replication data 633*y* before transmitting those indications to the node 300*a* via the inter-cluster interconnect 399. Correspondingly, the replication component 643 of the data storage module 600 of the node 300*a* may maintain indications of the status of the performance of the replica data access commands by the access component 648 of the data storage module 600 of the node 300*y* as part of the replication data 633*a*.

Unfortunately, errors may occur in such partially parallel performances of data access commands. Such errors may include unavailability of an active node to which replica data access commands are to be transmitted, failure of a component within an active node, and/or unavailability of access to a set of storage devices coupled to a node.

In one example of an error, the replication component 643 of the data storage module 600 of the node 300*a* may attempt to relay the data access command to the access component 648 to be performed through the storage controller 665 on the set of storage devices 800*ab*, and may further attempt to both replicate the data access command and transmit the resulting replica data access command to the node 300*y*. However, the access component 648 of the node 300*a* may provide the replication component 648 of the node 300*a* with an indication of an error preventing the performance of the data access command with the set of storage devices 800*ab* such that the access component 648 is not yet able to accept the data access command.

The replication component 643 of the node 300*a* may analyze the indication and determine that the error is a short-term error that will resolve relatively soon. Such an indication of a short-term error may be an indication that the storage controller 665 of the node 300*a* is already busy performing another operation involving the set of storage devices 800*ab*. Stated differently, such a short-term error may arise from a condition that the access component 648 and/or the storage controller 665 are able to address without intervention on the part of maintenance personnel and/or are able to address within a relatively short period of time (e.g., within a fraction of a second and/or within less than a minute). In response to determining that the error is such a short-term error, the replication component 643 may proceed with transmitting the replica data access command to the node 300*y*, and may await a predetermined retry time period before again attempting to relay the data access command to the access component 648 in a retry of the data access command within the node 300*a*. If the attempt at retrying the data access command within the node 300*a* is successful such that the access component 648 responds with an indication of successful acceptance of data access command (and presuming that the node 300*y* has responded with an indication of successful acceptance of the replica of the data access command), then the replication component 648 may transmit an indication of success in performing the data access command back to the client device 100 through the network protocol module 500 of the node 300*a*. Again, since the transmitting of the status indication of successful performance to the client device 100 may be triggered by these two indications of successful acceptance, which may indicate that performance has commenced without errors, such transmission of successful performance to the client device 100 may occur at least partly in parallel with the at least partially parallel performances of the data access command and the replica data access command.

In another example of an error, the access component 648 of the data storage module 600 of the node 300*a* may indicate successful acceptance of the data access command to the replication component 643 such that the replication component 643 proceeds with transmitting the replica of the data access command to the node 300*y* via the inter-cluster interconnect 399. However, the replication component 643 of the data storage module 600 of the node 300*a* may receive a response from the node 300*y* that includes an indication of an error within the node 300*y* preventing performance of the replica of the data access command with the set of storage devices 800*yz*.

The replication component 643 of the node 300*a* may analyze the indication and determine that the error is a short-term error that will be resolved without assistance from maintenance personnel and/or may be resolved within a relatively short period of time (e.g., a fraction of a second and/or less than a minute). Not unlike the above-described short-term error involving the node 300*a* and the set of storage devices 800*ab*, such a short-term error involving the node 300*y* and the set of storage devices 800*yz* may arise from the set of storage devices 800*yz* already being busy performing another operation. In response to determining that the error is a short-term error, the replication component 643 of the node 300*a* may continue to allow the access component 648 of the data storage module 600 of the node 300*a* to proceed with performing the data access command, and may await the predetermined retry time period before again attempting to transmit the replica data access command to the node 300*y* in a retry of the replica data access command with the node 300*y*. If the attempt at retrying the data access command with the node 300*y* is successful (and presuming there is no indication of an error connected with the performance of the data access command within the node 300*a*), then the replication component 643 of the node 300*a* may transmit an indication of success in performing the data access command back to one of the client devices 100 through the network protocol module 500 of the node 300*a* and the client interconnect 199.

However, if one or more attempts at retrying the replica data access command with the node 300*y* is unsuccessful, or if the replication component 643 of the data storage module 600 of the node 300*a* determines that the error is a long-term error (e.g., an error requiring the intervention of maintenance personnel to address such that substantially more than a short period of time may elapse before the error is corrected), then the replication component 643 of the node 300*a* may transmit the replica data access command to the node 300*z*. In essence, the replication component 643 of the data storage module 600 of the node 300*a* may retry the replica data access command with the node 300z, instead of retrying it with the node 300y. Presuming there is no indication of an error connected with the performance of the replica data access command within the node 300z, then the replication component 648 of the node 300a may transmit an indication of success in performing the data access command back to the client device 100 through the network protocol module 500 of the node 300a and the client interconnect 199. The replication component 648 of the node 300a may also update the mutable metadata 630ab and/or the immutable metadata 830ab to indicate that the node 300z is now the active node of the HA group 1600yz to with which the node 300a communicates to exchange replicas of data access commands. Such an indication may include an address by which the data storage module 600 of the node 300z is accessible via the inter-cluster interconnect 399.

The control routine 640 within data storage modules 600 of an active node of each of two different HA groups and/or of two different clusters may include a multipath component 649 that may be executable by a processor component 650 in each of those active nodes to cooperate to form and maintain a mesh of communications sessions among those two nodes and their partners to better support a take over of one of those two nodes in response to a failure. As previously discussed, the inter-cluster interconnect 399 may be implemented as a network coupling data storage modules of multiple ones of the nodes 300a-d and/or 300y-z to enable active ones of those data storage modules to exchange replica data access commands and/or responses thereto. As also previously discussed, a failure occurring within a node may cause a change in which node of a HA group is the active node that engages in communications and/or performs data access commands (or replicas thereof). As a result, which node of one HA group generates and transmits replica data access commands may change and/or which node of another HA group that receives and performs the replica data access commands may change.

Again, as depicted in FIG. 10, it is the node 300a that is active within one HA group to engage in communications with client devices 100 via the client interconnect 199 such that the node 300a receives data access commands therefrom to perform, while it is the node 300y that is active to engage in communications with the node 300a via the inter-cluster interconnect 399 to receive replica data access commands therefrom to perform. In support of such exchanges between of replica data access commands between the active nodes 300a and 300y, the multipath components 649 of the data storage modules 600 of each of the nodes 300a and 300y may cooperate to form an active communications session therebetween through the inter-cluster interconnect 399. In so doing, the multipath component 649 of the node 300a may retrieve an indication from the metadata 630ab and/or 830ab of the node 300y currently being the active node to which the node 300a is to transmit replica data access commands generated by the replication component 643 of the node 300a via the inter-cluster interconnect 399. Correspondingly, the multipath component 649 of the node 300y may retrieve an indication from the metadata 630yz and/or 830yz of the node 300a currently being the active node from which the replication component 643 of the node 300y is to receive those replica access commands via the inter-cluster interconnect 399. Thus, the multipath components 649 may each retrieve a portion of metadata to obtain an indication of what other active node each is to exchange replica data access commands with. In some embodiments, those indications may include addresses at which the data storage modules 600 of each of the nodes 300a and 300y are accessible on the inter-cluster interconnect 399. The multipath component 649 of at least one of the nodes 300a and 300y may then employ such retrieved information concerning the other to exchange messages with the data storage module 600 of the other through the inter-cluster interconnect 399 to request and accept formation of an active communications session therebetween.

With the active communications session thereby formed between the data storage modules 600 of the nodes 300a and 300y through the inter-cluster interconnect 399, the multipath components 649 of each of those data storage modules 600 may then exchange indications of addresses of data storage modules 600 of other nodes that are partners of the nodes 300a and 300y through that active communications session. Presuming the partners of nodes 300a and 300y are the nodes 300b and 300z, respectively, then the multipath component 649 of the node 300a transmits an indication of the address of the data storage module 600 of the node 300b to the node 300y, and the multipath component 649 of the node 300y transmits an indication of the address of the data storage module 600 of the node 300z to the node 300a. Once supplied with the address of the data storage module 600 of the node 300z on the inter-cluster interconnect 399, the multipath component 649 of the node 300a may form an inactive communications session between the data storage modules 600 of the nodes 300a and 300z through the inter-cluster interconnect 399. Correspondingly, once supplied with the address of the data storage module 600 of the node 300b on the inter-cluster interconnect 399, the multipath component 649 of the node 300y may form an inactive communications session between the data storage modules 600 of the nodes 300y and 300b through the inter-cluster interconnect 399. The formation of such inactive communications sessions may or may not entail an exchange of messages through the inter-cluster interconnect 399 to request and accept their formation.

With these active and inactive communications sessions formed through the inter-cluster interconnect 399, the multipath components 649 of at least the nodes 300a and 300y may continue to cooperate to at least monitor the status of each of these communications sessions. Such monitoring may entail exchanges of test signals through at least the active communications session formed between the nodes 300a and 300y. Such test signals may be exchanged therebetween either in lieu of in addition to exchanges of replica data access commands and responses thereto. By way of example, where an exchange of a replica data access command or a response thereto has not occurred through the active communications session between the nodes 300a and 300y within a specified interval of time, one or both of the multipath components 649 of the nodes 300a and 300y may transmit a test signal (e.g., transmit a test message) through that active communications session to the other to check the status of that active communications session. The multipath components 649 of the nodes 300a and 300y may or may not also transmit test signals through the inactive communications sessions between the nodes 300a and 300z, and between the nodes 300y and 300b to check the status of those inactive communications sessions. In embodiments in which there are exchanges of test signals (e.g., test messages) through inactive communications sessions, such exchanges may occur less frequently than the exchanges of test signals through the active communications session. By way of example, exchanges of test signals through inactive communications sessions may occur in response to a circumstance in which an inactive communications session may become active, such as when a possibility arises of retrying an exchange of replica data access commands with an inactive node after failure has occurred in attempting such an exchange with an active node. Where at least the active communications session between the nodes 300a and 300y is lost due to a change in the address at which one of the nodes 300a or 300y is accessible on the inter-cluster interconnect 399, one or both of the multipath components 649 of the nodes 300a and 300y may update corresponding ones of the metadata 630ab and/or 830ab, and the metadata 630yz and/or 830yz with an indication of the changed address.

The multipath component 649 of the node 300a and/or 300y (or of the partner node 300b and/or 300z) may change the state of one or more of the communications sessions formed among the nodes 300a-b and 300y-z through the inter-cluster interconnect 399 in response to a failure in one the active nodes 300a or 300y. By way of example, where one of the active nodes 300a or 300y is taken over by one of the partner nodes 300b or 300z, respectively, at least the multipath component 649 of the other of the active nodes 300a and 300y may respond by changing the state of the active communications session between the nodes 300a and 300y to an inactive state. Further, where the node 300a is taken over by the node 300b, the multipath component 649 of the node 300y and/or of the node 300b may act to make the communications session between the nodes 300b and 300y active. Correspondingly, where the node 300y is taken over by the node 300z, the multipath component 649 of the node 300a and/or of the node 300z may act to make the communications session between the nodes 300a and 300z active. The change of an inactive communications session into an active communications session may entail an exchange of messages between the nodes coupled through that inactive communications session to agree to make that inactive communications session active. As previously discussed, where an active node is taken over by an inactive partner of that active node, metadata associated with those nodes may be updated to indicate the change in which of those two nodes is now the active node.

By way of another example, where the node 300a initially transmits a replica data access command to the node 300y to be performed, but then retries the replica data access command with the node 300z as a result of a failure in the node 300y, the multipath component 649 of the node 300a may change the state of the communications session between the nodes 300a and 300y from active to inactive, and may change the state of the communications session between the nodes 300a and 300z from inactive to active. Such a change in which of the nodes 300y-z is the node to which the node 300a transmits replica data access commands may either trigger or reflect a takeover of the node 300y by the node 300z, and as previously discussed, the metadata 630ab and/or 830ab, and/or the metadata 630yz and/or 830yz may be updated to indicate that the node 300z is now the active node to which replica data access commands are to be transmitted to be performed.

Figure 11A:
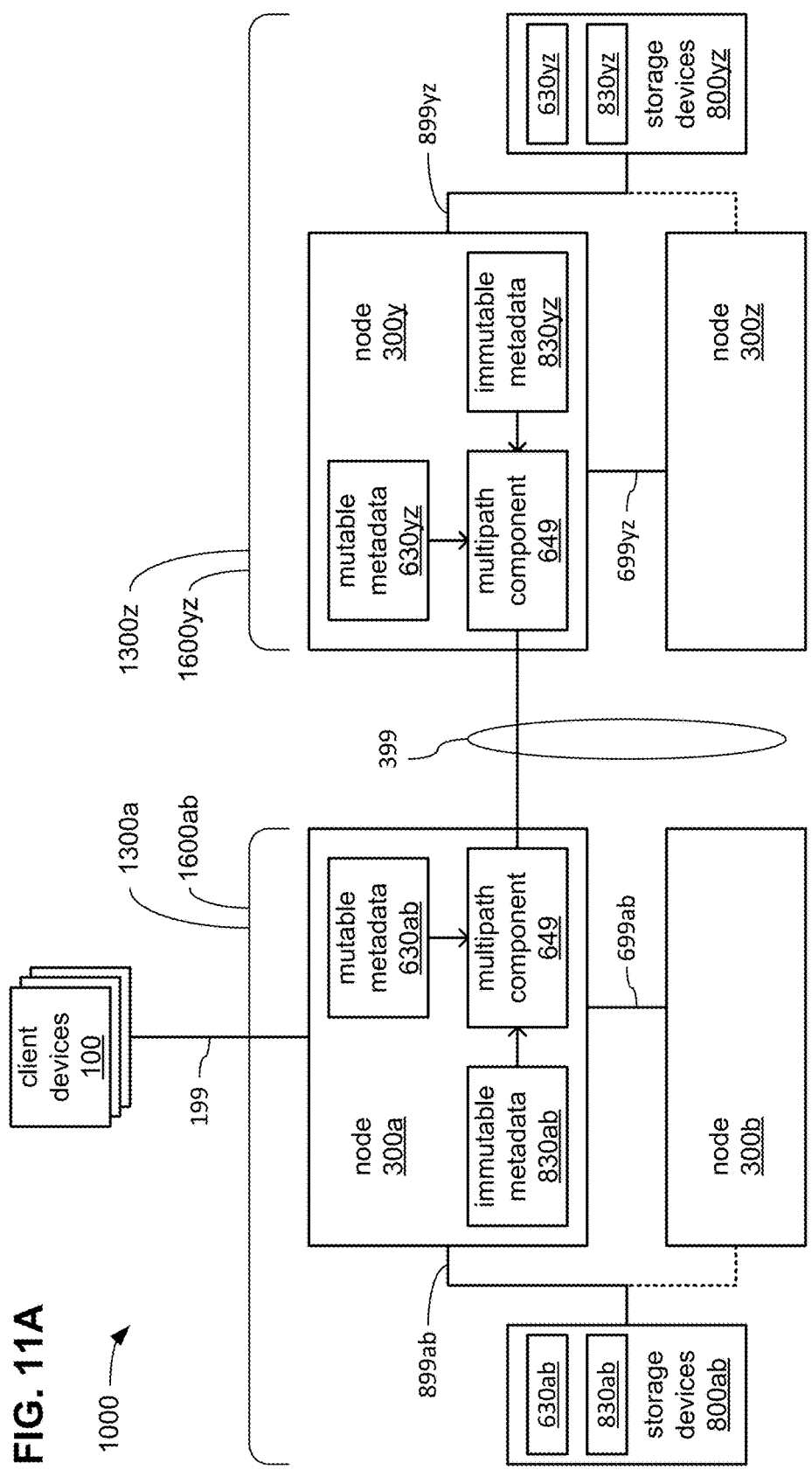
FIGS. 11A, 11B, 11C, 11D and 11E, together, illustrate an example embodiment of forming and operating a mesh of communications sessions.
Figure 11B:
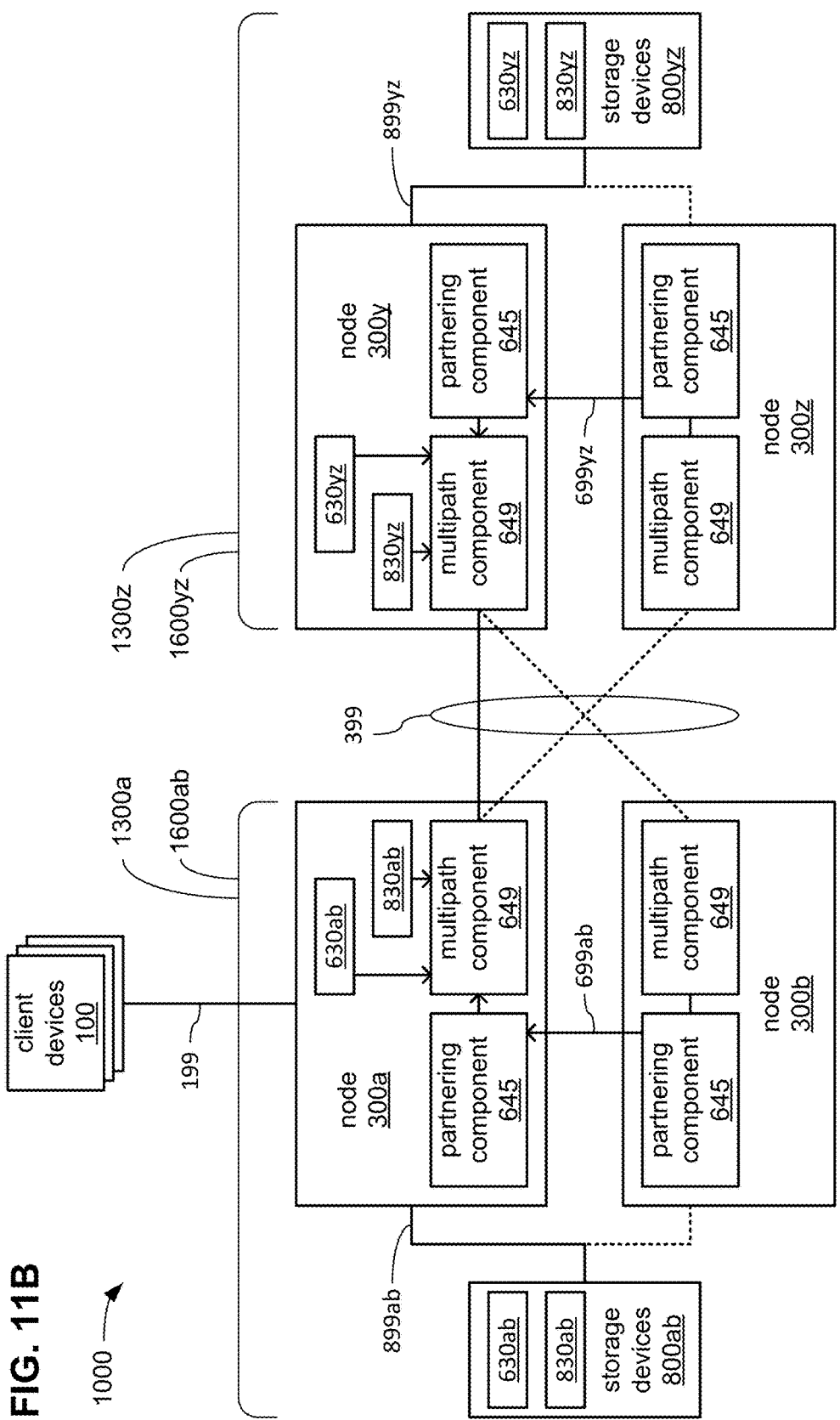
Figure 11C:
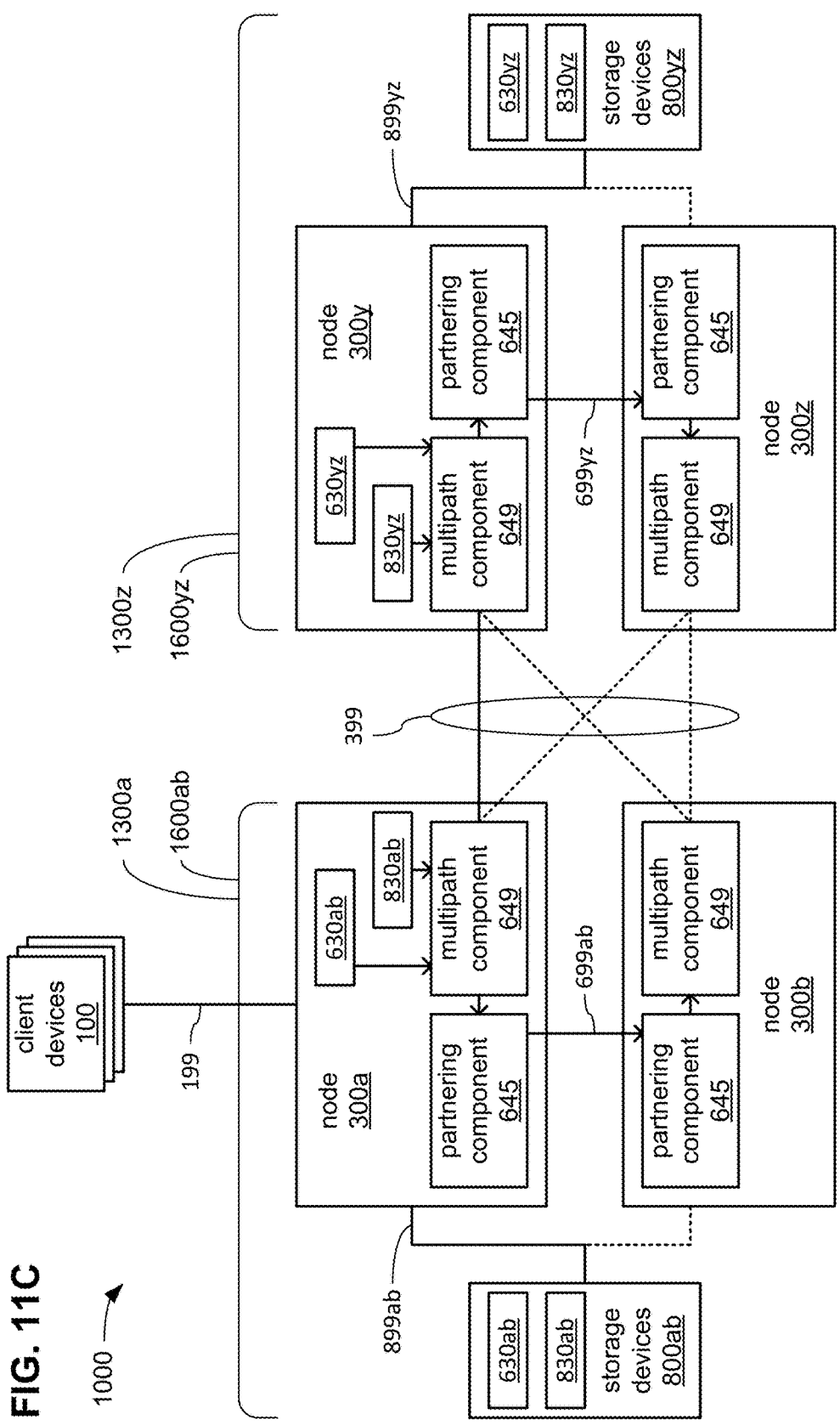
Figure 11D:
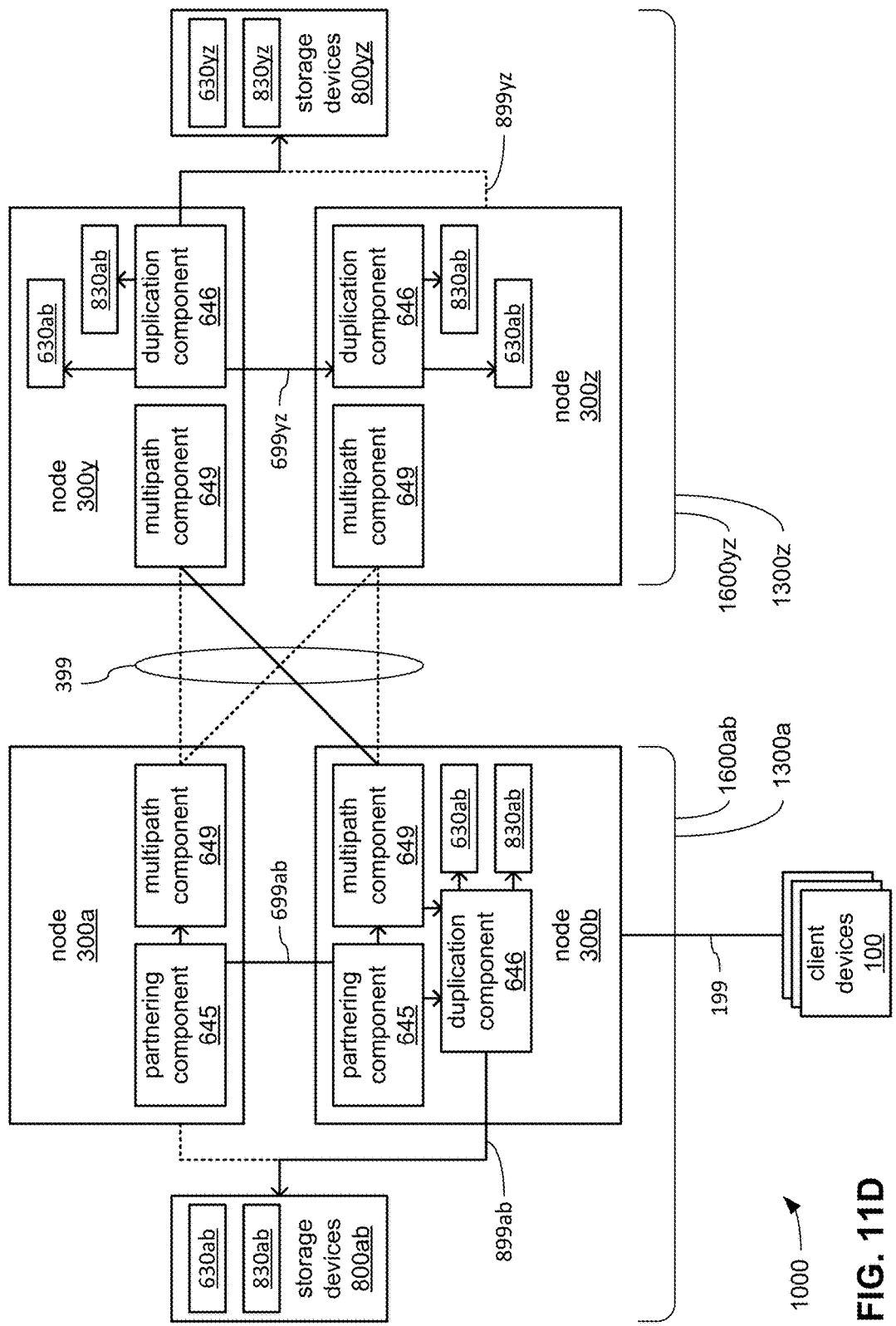
Figure 11E:
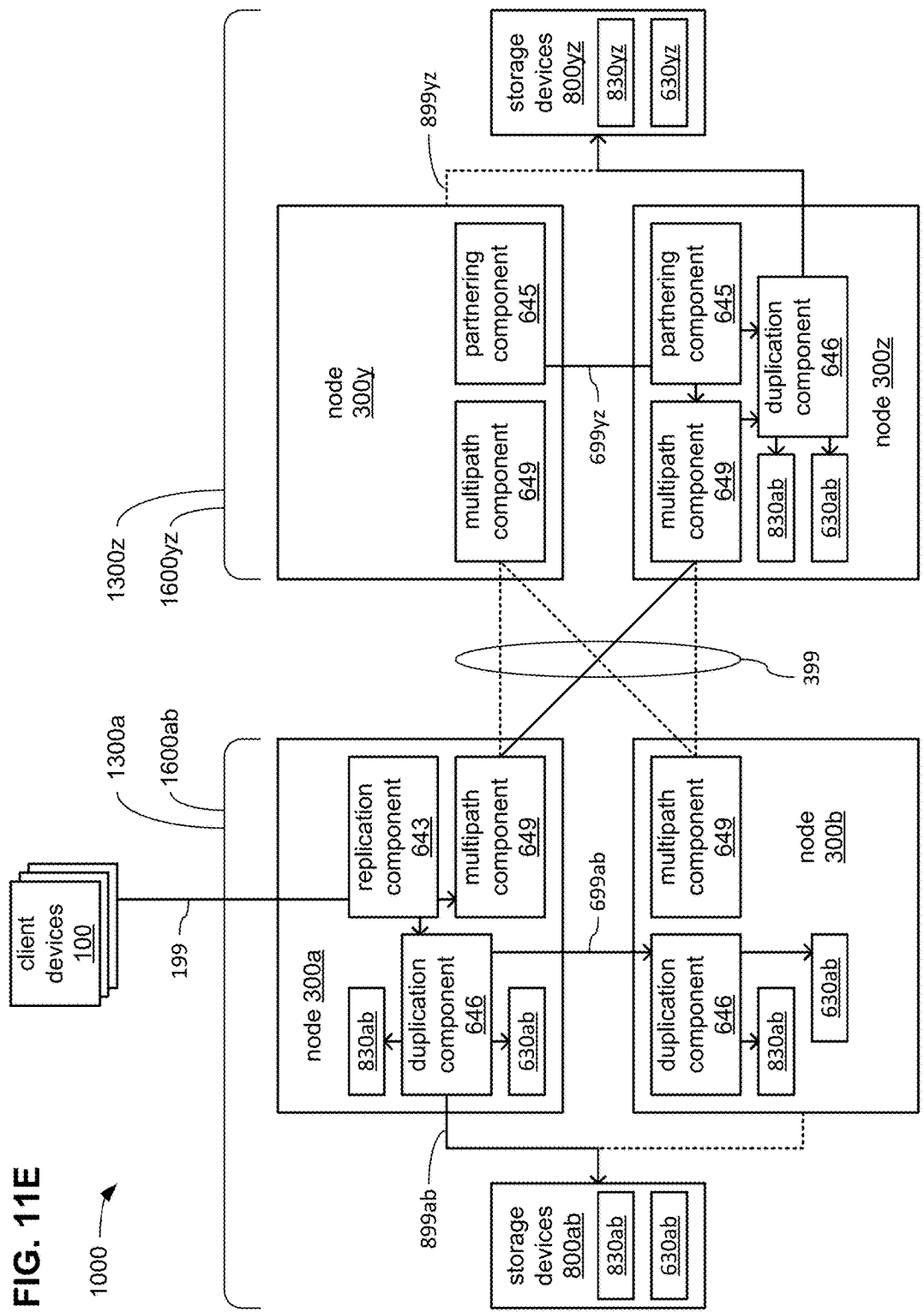

FIGS. 11A through 11E, together, depict an example of formation, maintenance and use of a mesh of active and inactive communications sessions that may arise among the nodes 300a-b of the HA group 1600ab of the cluster 1300a and the nodes 300y-z of the HA group 1600yz of the cluster 1300z in greater detail. More specifically, FIGS. 11A-C depict various aspects of the formation and maintenance of a mesh of communications sessions through the inter-cluster interconnect 399, including an active communications session and multiple inactive communications sessions. FIG. 11D depicts aspects of a change in state among the communications sessions arising from a take over in an active node in communication with the client devices 100. FIG. 11E depicts aspects of a change in state among communications sessions arising from a need to retry a replica data access command to a different node.

FIG. 11A depicts an initial configuration of the nodes 300a-b and 300y-z in which the node 300a may be the active node of the HA group 1600ab engaged in communications with the client devices 100 to perform data access commands, and the node 300y may be the active node of the HA group 1600yz engaged in communications with the active node 300a to perform replicas of those data access commands. In support of communications to exchange replica data access commands and responses thereto between the nodes 300a and 300y, the multipath component 649 of the node 300a may retrieve an indication of the node 300y as the other active node in such communications and an indication of an address of the node 300y (specifically, the data storage module 600 of the node 300y) on the inter-cluster interconnect 399 from the metadata 630ab and/or 830ab. Correspondingly, the multipath component 649 of the node 300y may retrieve an indication of the node 300a as the other active node in such communications and an indication of an address of the node 300a (specifically, the data storage module 600 of the node 300a) on the inter-cluster interconnect 399 from the metadata 630yz and/or 830yz.

As previously discussed, mutable metadata may include indications of aspects of operation of a storage cluster system that may be deemed likely to change more frequently than other aspects of operation that may be indicated in immutable metadata. Thus, in some embodiments, the immutable metadata 830ab may include the indication that the node 300y is the other active node to which the node 300a is to transmit replica data access commands, and the immutable metadata 830yz may include the indication that the node 300a is the other active node from which the node 300y is to receive the replica data access commands. Further, mutable metadata 630ab and 630yz may include the indications of the addresses of the nodes 300y and 300a, respectively, on the inter-cluster interconnect 399 based on an assumption that the addresses of the nodes 300a and 300y are more apt to change and more frequently than the fact of the nodes 300a and 300y being the two active nodes that are to exchange replica data access commands. However, in other embodiments, both the indications of the nodes 300a and 300y as the active nodes that are to exchange replica data access commands and the indications of the addresses of each on the inter-cluster interconnect 399 may be deemed to be relatively likely to change, and therefore, may both be stored among the mutable metadata 630ab and 630yz.

Regardless of which of the metadata 630ab, 830ab, 630yz and/or 830yz such indications may be stored within, the multipath components 649 of the nodes 300a and 300y may use such indications to cooperate to form an active communications session (indicated with a solid line) between the nodes 300a and 300y to support exchanges of replica data access commands and responses thereto. More specifically, the node 300a may use this active communications session formed through the inter-cluster interconnect 399 to transmit replicas of data access commands to the node 300y, and the node 300y may use this active communications session to transmit responses thereto to the node 300a, including indications of success or failure in performing the replica data access commands.

Following formation of the active communications session between the nodes 300a and 300y through the inter-cluster interconnect 399, the multipath components 649 of the nodes 300*a* and 300*y* may engage in a recurring exchange of signals therethrough to monitor the status of the active communications session. By way of example, test signals that may include test messages and/or test data may be transmitted by the multipath component 649 of one of the nodes 300*a* and 300*y* to the multipath component 649 of the other on a recurring interval of time. In some embodiments, such exchanges of test signals may be suspended if an exchange of a replica data access command or a response thereto has already occurred within that interval of time. If an exchange of a test signal is attempted, but fails, then the multipath component 649 of one or both of the nodes 300*a* and 300*y* may attempt to retrieve an updated indication of a new address on the inter-cluster interconnect 399 to which one of the nodes 300*a* or 300*y* may have moved and/or an updated indication of what other active node may have taken over for or otherwise replaced one or the other of the nodes 300*a* or 300*y*. Upon retrieving such an updated indication, the multipath component 649 of one or both of the nodes 300*a* and 300*y* may attempt to again form the active communications session.

FIG. 11B depicts initial preparations for the possibility that one of the nodes 300*a* or 300*y* may be taken over by one of the nodes 300*b* or 300*z*, respectively, such that one of the nodes 300*a* or 300*y* may cease to be an active node. More precisely, and as previously discussed, a failure in an active node may trigger a takeover by an inactive partner of that active node belonging to the same HA group to which the failing active node belongs. As also previously discussed, such a takeover may be accompanied by a change in configuration of communications sessions in which an active communications session between two active nodes is changed to an inactive state, while an inactive communications session extending between what becomes the two active nodes is changed to an active state.

In preparing for such possibilities, the multipath components 649 of the nodes 300*a* and 300*y* may exchange indications of the addresses of the nodes 300*b* and 300*z* (specifically, the data storage modules 600 of the nodes 300*b* and 300*z*) on the inter-cluster interconnect 399. The multipath components 649 of the nodes 300*a* and 300*y* may perform this exchange through the active node formed between the nodes 300*a* and 300*y*. The multipath component 649 of the node 300*a* may retrieve an indication of this address of the node 300*b* from the metadata 630*ab* or 830*ab*, and the multipath component 649 of the node 300*y* may retrieve an indication of this address of the node 300*z* from the metadata 630*yz* or 830*yz*. Again, in some embodiments, these addresses may be deemed more apt to change and more frequently than other information concerning operation of the storage cluster system 1000 such that these addresses may be stored among the mutable metadata 630*ab* and 630*yz*.

In some embodiments, indications of the addresses of the nodes 300*b* and 300*z* on the inter-cluster interconnect 399 may be received by the nodes 300*a* and 300*y* from the nodes 300*b* and 300*z* through the HA interconnects 699*ab* and 699*yz*, respectively. More specifically, the signals exchanged between the partnering components 645 of the nodes 300*a* and 300*b* through the HA interconnect 699*ab* to monitor for failures within each of the nodes 300*a* and 300*b* may include indications of addresses of the data storage modules 600 of the nodes 300*a* and/or 300*b* on the inter-cluster interconnect 399. Correspondingly, the signals exchanged between the partnering components 645 of the nodes 300*y* and 300*z* through the HA interconnect 699*yz* to monitor for failures within each of the nodes 300*y* and 300*z* may include indications of addresses of the data storage modules 600 of the nodes 300*y* and/or 300*z* on the inter-cluster interconnect 399.

Regardless of the exact manner in which addresses of the nodes 300*b* and 300*z* are obtained, the multipath components 649 of the nodes 300*a* and 300*y* may then use the addresses of the nodes 300*b* and 300*z* to form an inactive communications session (indicated with dotted lines) between the nodes 300*a* and 300*z*, and between the nodes 300*y* and 300*b* through the inter-cluster interconnect 399. With these inactive nodes so formed, less time may be required to recommence exchanges of replica data access commands and responses thereto following a takeover of one of the active nodes 300*a* or 300*y* by one of their partners 300*b* or 300*z*, respectively.

Following formation of the inactive communications sessions between the nodes 300*a* and 300*z*, and between the nodes 300*y* and 300*b*, the multipath components 649 of the nodes 300*a* and 300*y* may recurringly transmit test signals through each of these inactive communications sessions to monitor the status of each. In embodiments in which the cooperation by the nodes 300*b* and 300*z* is required to effect such monitoring, the multipath components 649 of the nodes 300*a* and 300*y* may signal the nodes 300*b* and 300*z* to provide such cooperation through the ongoing exchanges of signals between the partnering components 645 of the nodes 300*a* and 300*b*, and between the partnering components 645 of the nodes 300*y* and 300*z*. Thus, despite the inactive status of the nodes 300*z* and 300*b*, the multipath components 649 may return copies of test messages and/or test data transmitted to them via the inactive communications sessions as part of enabling the multipath components 649 of the nodes 300*a* and 300*y*, respectively, to recurringly test the inactive communications sessions.

FIG. 11C depicts preparations for the possibility that both of the nodes 300*a* and 300*y* may be taken over by one of the nodes 300*b* and 300*z*, respectively, such that both the nodes 300*a* and 300*y* may cease to be active nodes. Though it may be deemed to be far less likely that both of the nodes 300*a* and 300*y* would be taken, it may still be deemed a possibility that would be desirable to prepare for. In preparing for such a possibility, the multipath component 649 of the node 300*a* may employ the ongoing exchanges of signals between the partnering components 645 of the nodes 300*a* and 300*b* to provide the multipath component 649 of the node 300*b* with the address of the node 300*z* (specifically, the data storage module 600 of the node 300*z*). Correspondingly, the multipath component 649 of the node 300*y* may employ the ongoing exchanges of signals between the partnering components 645 of the nodes 300*y* and 300*z* to provide the multipath component 649 of the node 300*z* with the address of the node 300*b* (specifically, the data storage module 600 of the node 300*b*).

The multipath components 649 of the nodes 300*b* and 300*z* may then each use the addresses of the other on the inter-cluster node 399 to form an inactive communications session (indicated with dotted lines) between the nodes 300*b* and 300*z* through the inter-cluster interconnect 399. With this inactive node so formed, less time may be required to recommence exchanges of replica data access commands and responses thereto following a takeover of both of the active nodes 300*a* and 300*y* by their partners 300*b* and 300*z*, respectively. Following formation of this inactive communications session between the nodes 300*b* and 300*z*, the multipath components 649 of the nodes 300*b* and 300*z* may recurringly exchange test signals through each of this inactive communications session to monitor its status.

FIG. 11D depicts aspects of a change in configuration of the mesh of communications sessions formed throughout FIGS. 11A-C as a result of the node 300b taking over for the node 300a. As previously discussed, the partnering components 645 of partnered nodes in a HA group may recurringly exchange signals to monitor the status of the nodes of which each is a part, and a partnering component 645 of an inactive node may signal other components of that node to take over for an active partner in response to an indication of a failure occurring within that active partner. Thus, in FIG. 11D, the partnering component 645 of the node 300b may have received an indication of a failure occurring within the node 300a and may respond by triggering a takeover of the node 300a by the node 300b such that the node 300b becomes the new active node of the HA group 1600ab that engages in communications with the client devices 100 and exchanges replica data access commands with the node 300y.

As previously discussed, among the actions the partnering component 645 of the node 300b may take to effect such a takeover may be to signal the multipath component 649 of the node 300b to change the state of the inactive communications session between the nodes 300b and 300y to an active state. In some embodiments, the multipath component 649 of the node 300b may effect this change in state by signaling the multipath component 649 of the node 300y through the inactive communications session therebetween that the node 300b is taking over for the node 300a, and therefore, the inactive communications session between the nodes 300b and 300y is to become active. In response, the multipath component 649 of the node 300y may change the active communications session between the nodes 300a and 300y to an inactive state, and may cooperate with the multipath component 649 of the node 300b in changing the inactive communications session between the nodes 300b and 300y to an active state. With these changes in state of these two communications sessions, the nodes 300b and 300y may be prepared to exchange replica data access commands and responses thereto in the manner in which the nodes 300a and 300y previously did so.

Following these changes in state of these two communications sessions, the duplication component 646 of the now active node 300b may update the metadata 630ab and/or 830ab with an indication that the node 300b is now the active node of the HA group 1600ab that engages in communications with the client devices 100 and transmits replica data access commands to the node 300y. The duplication component 646 of the node 300b may then store the now updated metadata 630ab and/or 830ab within the set of storage devices 800ab. Correspondingly, the duplication component 646 of the node 300y may update the metadata 630yz and/or 830yz with an indication that the node 300b is now the active node from which the node 300y receives replica data access commands and/or with an indication of the address of the node 300b (specifically, the address of the data storage module 600 of the node 300b). The duplication component 646 of the node 300y may then store the now updated metadata 630yz and/or 830yz within the set of storage devices 800yz. Further, the duplication component 646 of the node 300y may transmit a duplicate of the now updated metadata 630yz and/or 830yz to the node 300z via the HA interconnect 699yz to better enable the node 300z to later take over for the node 300y if the need to do so should arise.

Depending on the nature of the failure occurring within the node 300a, the multipath component 649 and/or the duplication component 646 of the node 300a may not be capable of responding to signals conveyed through either or both of the interconnects 399 and 699ab. As a result, the multipath component 649 of the node 300y may make the aforedescribed change in state of the communications session between the nodes 300a and 300y to an inactive state without seeking cooperation in doing so from the multipath component 649 of the node 300a. Also, the duplication component 646 of the node 300b may attempt to transmit the now updated metadata 630ab and/or 830ab to the node 300a via the HA interconnect 699ab, and the duplication component 646 of the node 300a may or may not be able to accept such metadata.

FIG. 11E depicts aspects of a change in configuration of the mesh of communications sessions formed throughout FIGS. 11A-C as a result of the node 300z taking over for the node 300y. As previously discussed, the replication component 643 of an active node that generates replica data access commands may retry transmission of a replica data access command to a partner of another active node if the other active node provides an indication of a failure that precludes it from performing the replica data access command. Thus, in FIG. 11E, the replication component 643 of the node 300a may have attempted to transmit a replica data access command to the node 300y and may have received an indication of a failure from the node 300y that precludes the node 300y from performing that replica data access command. In response, the replication component 643 of the node 300a may retry transmission of the replica data access command to the node 300z, which may trigger a takeover of the node 300y by the node 300z such that the node 300z becomes the new active node of the HA group 1600yz that exchanges replica data access commands with the node 300a and performs those replica data access commands.

As previously discussed, among the actions the replication component 643 of the node 300a may take to effect such retrying to the node 300z may be to signal the multipath component 649 of the node 300a to change the state of the inactive communications session between the nodes 300a and 300z to an active state. In some embodiments, the multipath component 649 of the node 300a may effect this change in state by signaling the multipath component 649 of the node 300z through the inactive communications session therebetween that the node 300z is to receive a retrial of transmission of a replica data access command, and therefore, the inactive communications session between the nodes 300a and 300z is to become active. With these changes in state of these two communications sessions, the nodes 300a and 300z may be prepared to exchange replica data access commands and responses thereto in the manner in which the nodes 300a and 300y previously did so.

These changes in state of these two communications sessions may be taken as an indication and/or a trigger of the node 300z taking over for the node 300y. Thus, the duplication component 646 of the node 300a may update the metadata 630ab and/or 830ab with an indication that the node 300z is now the active node of the HA group 1600yz to which the node 300a transmits replica data access commands and/or with an indication of the address of the node 300z (specifically, the address of the data storage module 600 of the node 300z). The duplication component 646 of the node 300a may then store the now updated metadata 630ab and/or 830ab within the set of storage devices 800ab, and may transmit duplicates of the now updated metadata 630ab and/or 830ab to the node 300b via the HA interconnect 699ab. Correspondingly, the duplication component 646 of the node 300z may update the metadata 630yz and/or 830yz with an indication that the node 300z is now the active node that receives replica data access commands from the node 300a. The duplication component 646 of the node 300z may then store the now updated metadata 630yz and/or 830yz within the set of storage devices 800yz.

Depending on the nature of the failure occurring within the node 300y, the multipath component 649 and/or the duplication component 646 of the node 300y may not be capable of responding to signals conveyed through either or both of the interconnects 399 and 699yz. As a result, the multipath component 649 of the node 300a may make the aforedescribed change in state of the communications session between the nodes 300a and 300y to an inactive state without seeking cooperation in doing so from the multipath component 649 of the node 300y. Also, the duplication component 646 of the node 300z may attempt to transmit the now updated metadata 630yz and/or 830yz to the node 300y via the HA interconnect 699yz, and the duplication component 646 of the node 300y may or may not be able to accept such metadata.

Figure 12:
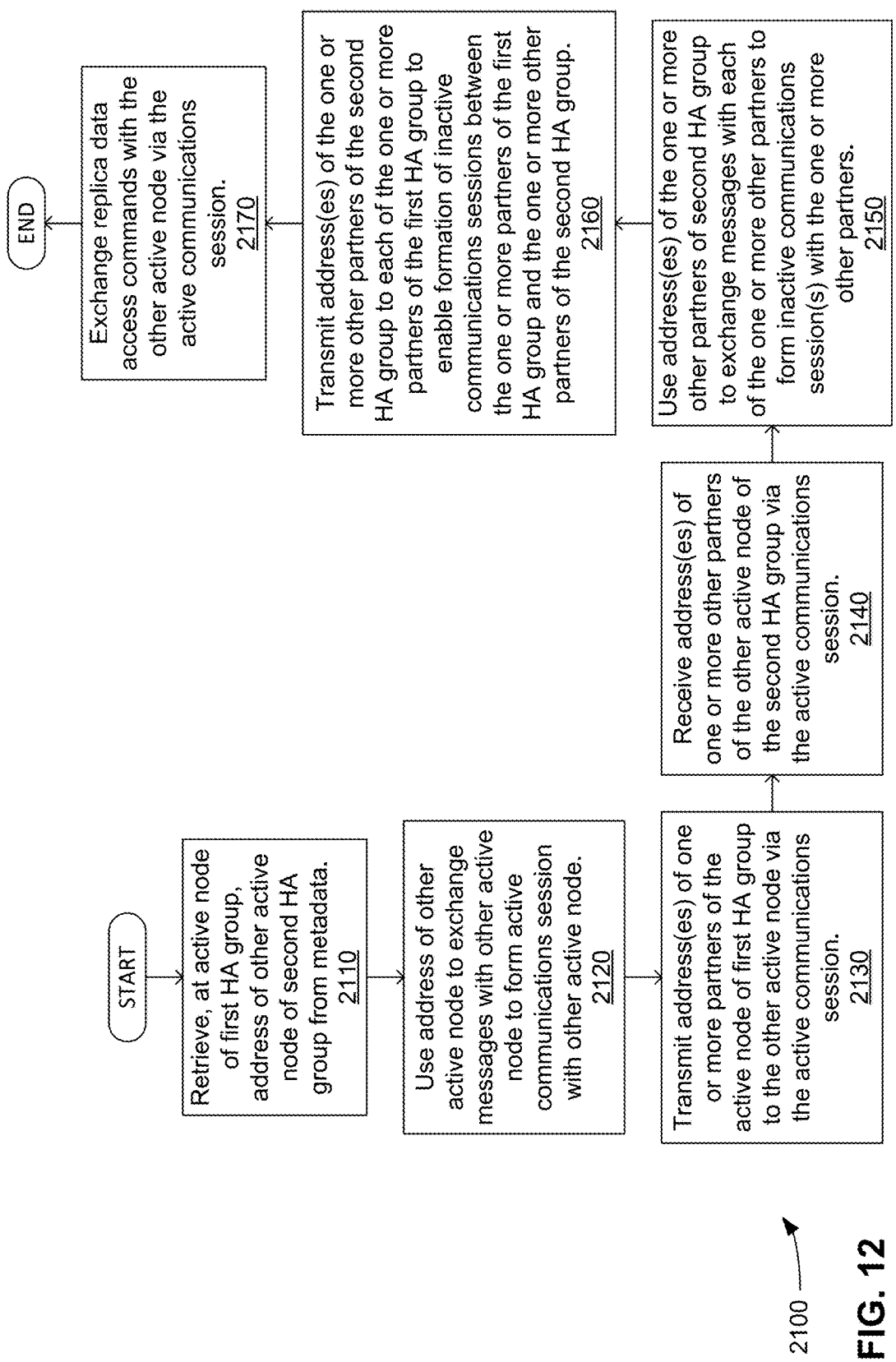
FIG. 12 illustrates a logic flow according to an embodiment.

FIG. 12 illustrates one embodiment of a logic flow 2100. The logic flow 2100 may be representative of some or all of the operations executed by one or more embodiments described herein. More specifically, the logic flow 2100 may illustrate operations performed by the processor component 650 in executing at least the control routine 640, and/or performed by other component(s) of a data storage module 600.

At 2110, a processor component of a data storage module of an active node of a first HA group of one cluster of a storage cluster system may retrieve an address at which another active node (specifically, the data storage module thereof) of a second HA group of another cluster of the storage cluster system may be accessed on an inter-cluster interconnect of the storage cluster system. Examples of each of the active node and of the other active node may be one each of one of the nodes 300a-d of one of the HA groups 1600ab or 1600cd of the cluster 1300a of the storage cluster system 1000, and one of the nodes 300y-z of the HA group 1600yz of the cluster 1300z of the storage cluster system 1000, with the inter-cluster interconnect 399.

At 2120, the processor component may use the retrieved address of the other active node to exchange messages with the other active node to form an active communications session with the other active node. As previously discussed, a message requesting formation of such a communications session may be transmitted to the other active node and another message from the other active node accepting the request may be received, thereby forming the communications session.

At 2130, the processor component may transmit address(es) of one or more inactive nodes of the first HA group that are partners of the active node to the other active node via the active communications session. At 2140, the processor component may receive, from the other active node, address(es) of one or more other inactive nodes of the second HA group that are partners of the other active node via the active communications session. As previously discussed, nodes that are partnered within a HA group may include one active node and one or more inactive nodes, all of which may be coupled via a HA interconnect (e.g., one of the HA interconnects 699ab, 699cd or 699yz). One of the inactive partner nodes of the active node may be configured to monitor the state of the active node in preparation for taking over for the active node if a failure occurs within the active node.

At 2150, the processor component may use the received address(es) of the one or more other partners of the other active node to exchange messages with those other partners to form inactive communications sessions between the active node and each of the other partners of the other active node. At 2160, the processor component may transmit the same received address(es) to each of the partners of the active node to enable each of the partners of the active node to also form an inactive communications session with each of the other partners of the other active node. As a result, a mesh of communications sessions, including the one active communications session and multiple inactive communications sessions, are formed between each of the active node and its partners of the first HA group and each of the other active node and its other partners of the second HA group.

At 2170, the active node and the other active node begin exchanging replica data access commands and responses thereto via the active communications session. As previously discussed, such exchanges enable at least partial parallel performance of data access commands between the data storage modules of these two active nodes.

Figure 13:
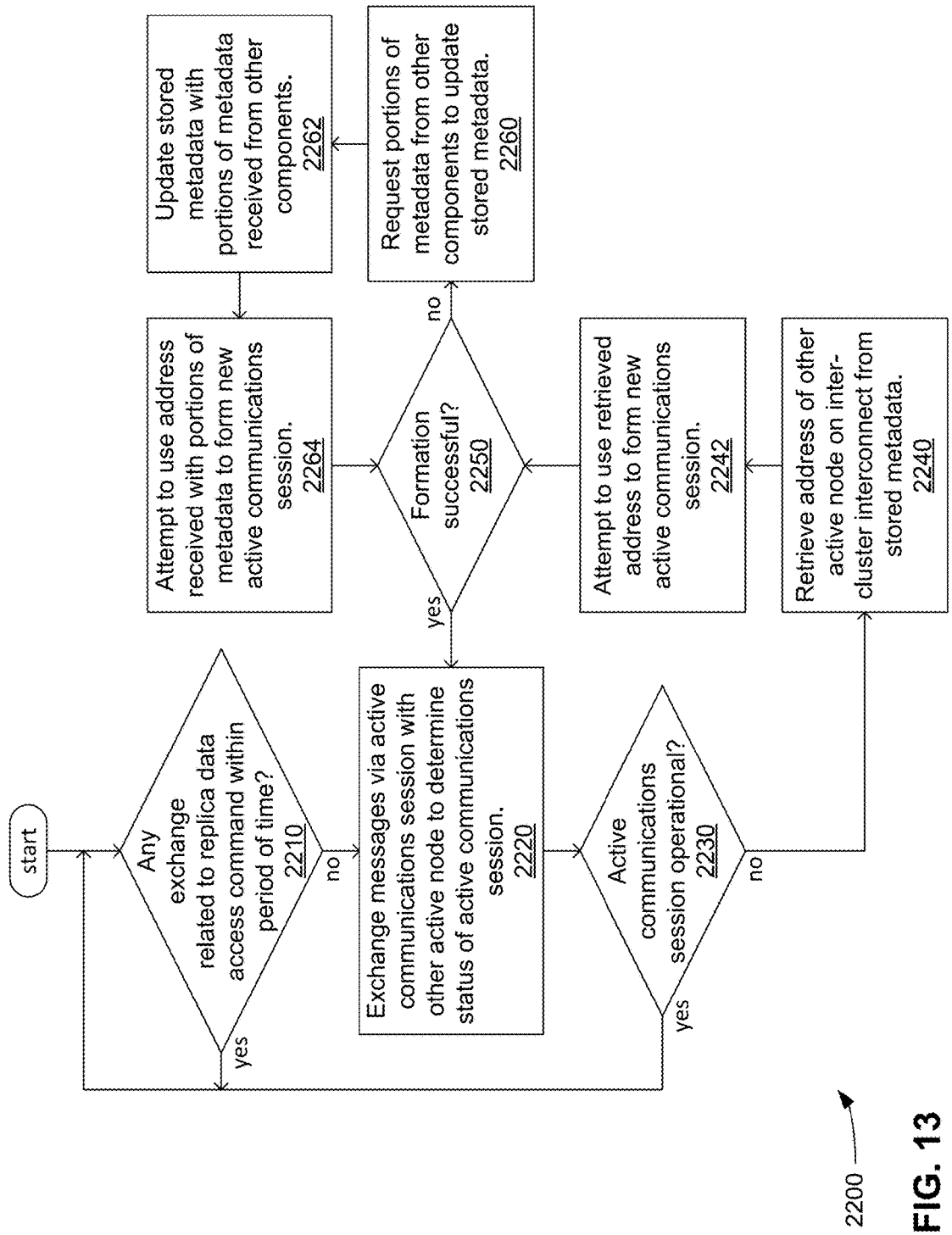
FIG. 13 illustrates a logic flow according to an embodiment.

FIG. 13 illustrates one embodiment of a logic flow 2200. The logic flow 2200 may be representative of some or all of the operations executed by one or more embodiments described herein. More specifically, the logic flow 2200 may illustrate operations performed by the processor component 650 in executing at least the control routine 640, and/or performed by other component(s) of a data storage module 600.

At 2210, a processor component of a data storage module of an active node of one HA group of one cluster of a storage cluster system may check whether there has been any exchange between the active node and another active node of another HA group of another cluster of the storage cluster system that is related to a replica data access command via an inter-cluster interconnect of the storage cluster system within a predetermined period of time. Again, examples of each of the active node and of the other active node may be one each of one of the nodes 300a-d of one of the HA groups 1600ab or 1600cd of the cluster 1300a of the storage cluster system 1000, and one of the nodes 300y-z of the HA group 1600yz of the cluster 1300z of the storage cluster system 1000, with the inter-cluster interconnect 399. If the processor component determines that such an exchange has occurred within the predetermined period of time, then the processor component may repeat the check at 2210.

However, if the processor component determines that no such exchange has occurred within the predetermined period of time, then at 2220, the processor component may exchange messages via the active communications session through the inter-cluster interconnect with the other active node to determine the current status of the active communications session. If, at 2230, the processor component determines that the status of the active communications session is an operational status, then the processor component may repeat the check at 2210.

However, if the processor component determines that the current status of the active communications session is not an operational status, then the processor component may retrieve an address of the other active node on the inter-cluster interconnect at 2240 from metadata stored within the data storage module. At 2242, the processor component may attempt to use the retrieved address to exchange messages with the other node to form a new active communications session with that other node. As previously discussed, a situation may arise in which the address of a node on the inter-cluster interconnect may change, thereby disrupting communications sessions that may have been formed with that node. Further, there may be a planned change from one node to another, which would also disrupt communications sessions, since those communications sessions would have to be formed again with the other active node.

At 2250, the processor component may make check whether the attempt to form the new active communications session with the other active node was successful. If so, then the processor component may use the new active communications session to again exchange messages with the other active node at 2220.

However, if the processor component determines that the attempt to form a new active communications session with the other active node was not successful, then at 2260, the processor component may request portions of metadata conveying more up to date information from one or more other components of the active node (e.g., a M-module 400 and/or a network protocol module 500). As previously discussed, the storage of mutable and/or immutable metadata within a data storage module (as well as more persistently with a set of storage devices, such one of the set of storage devices 800*ab*, 800*cd* or 800*yz*) enables a data storage module to have quicker access to metadata information than may be possible if that metadata information had to be requested from a M-module or a network protocol module. However, a M-module or a network protocol module may have metadata information that is more up to date than what may already be stored within a data storage module.

Following the request made at 2260, the processor component may receive portions of metadata from other components and may use those portions to update the stored metadata at 2262. Then, at 2264, the processor component may use the new address received with the received portions of metadata to again attempt to form a new active communications session at 2264, before again testing the success of such an attempt at 2250.

Figure 14:
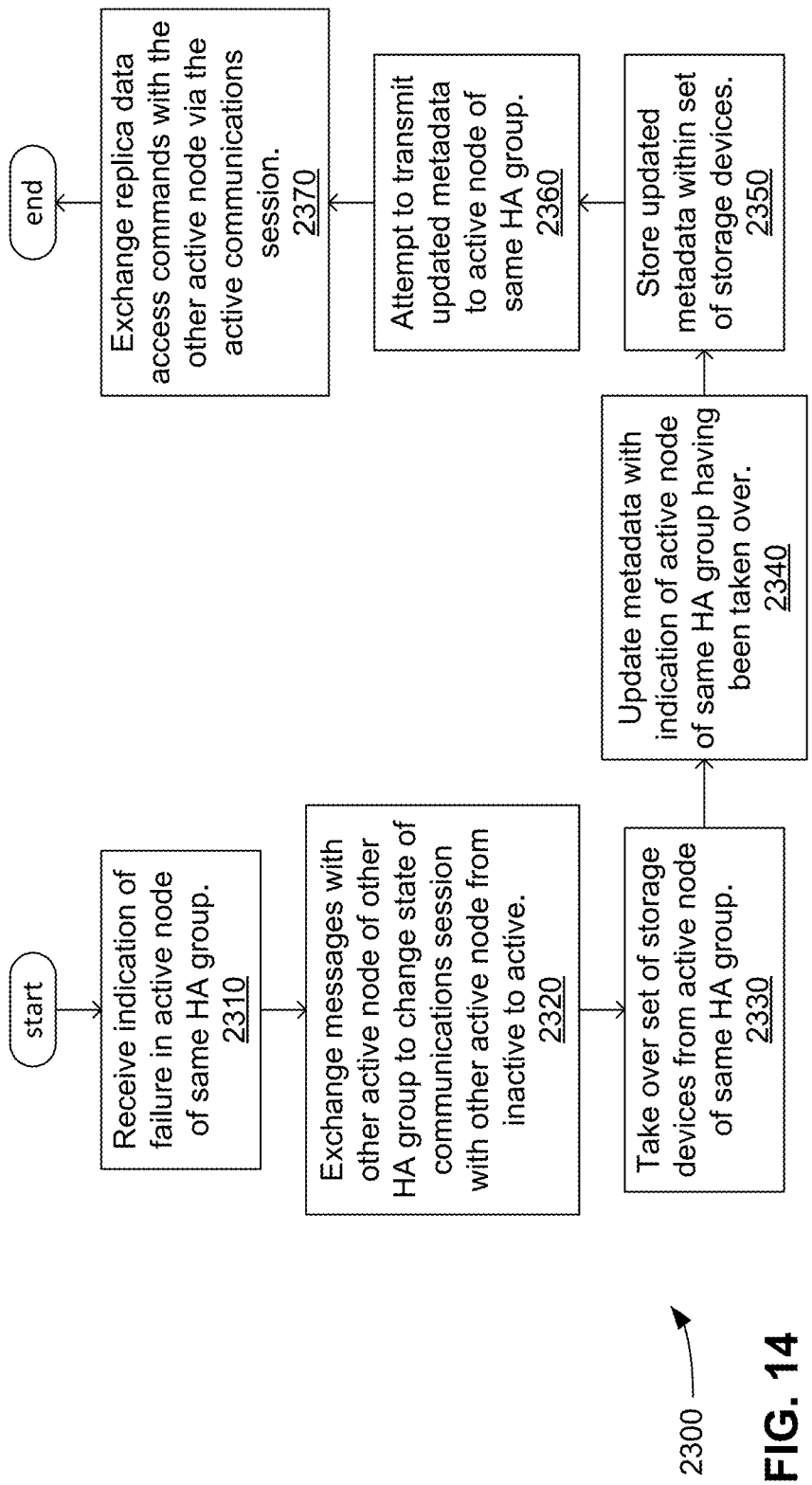
FIG. 14 illustrates a logic flow according to an embodiment.

FIG. 14 illustrates one embodiment of a logic flow 2300. The logic flow 2300 may be representative of some or all of the operations executed by one or more embodiments described herein. More specifically, the logic flow 2300 may illustrate operations performed by the processor component 650 in executing at least the control routine 640, and/or performed by other component(s) of the data storage module 600.

At 2310, a processor component of a data storage module of an inactive node of one HA group of one cluster of a storage cluster system may receive an indication of a failure occurring within an active node of the same HA group. At 2320, the processor component may exchange messages with an active node of another HA group of another cluster of the storage cluster system via an inactive communications session formed through an inter-cluster interconnect of the storage cluster system between the inactive node and the active node of the other HA group to change the state of the inactive communications session from inactive to active. Again, examples of each of the inactive node and the active node of the other HA group may be one each of one of the nodes 300*a-d* of one of the HA groups 1600*ab* or 1600*cd* of the cluster 1300*a* of the storage cluster system 1000, and one of the nodes 300*y-z* of the HA group 1600*yz* of the cluster 1300*z* of the storage cluster system 1000, with the inter-cluster interconnect 399.

At 2330, the processor component may act to take over control of a set of storage devices from the active node of the same HA group to which the inactive node belongs. As previously discussed, the taking over of control of a set of storage devices from an active node of a HA group by an inactive node of the same HA group may be part of that inactive node becoming the new active node of that HA group.

At 2340, the processor component updates metadata stored within the inactive node (now becoming the new active node, as just discussed) to include an indication of the takeover of the active node of the same HA group (now ceasing to be the active node, as just discussed). At 2350, the processor component stores the now updated metadata within the set of storage devices over which the processor component has taken control.

At 2360, the processor component may attempt to transmit the now updated metadata to the once active node of the same HA group. However, as previously discussed, depending on the manner of the failure occurring within the once active node, the once active node may not be able to accept the now updated metadata. At 2370, the processor component exchanges replica data access commands with the active node of the other HA group via the communications session that has just been made active.

Figure 15:
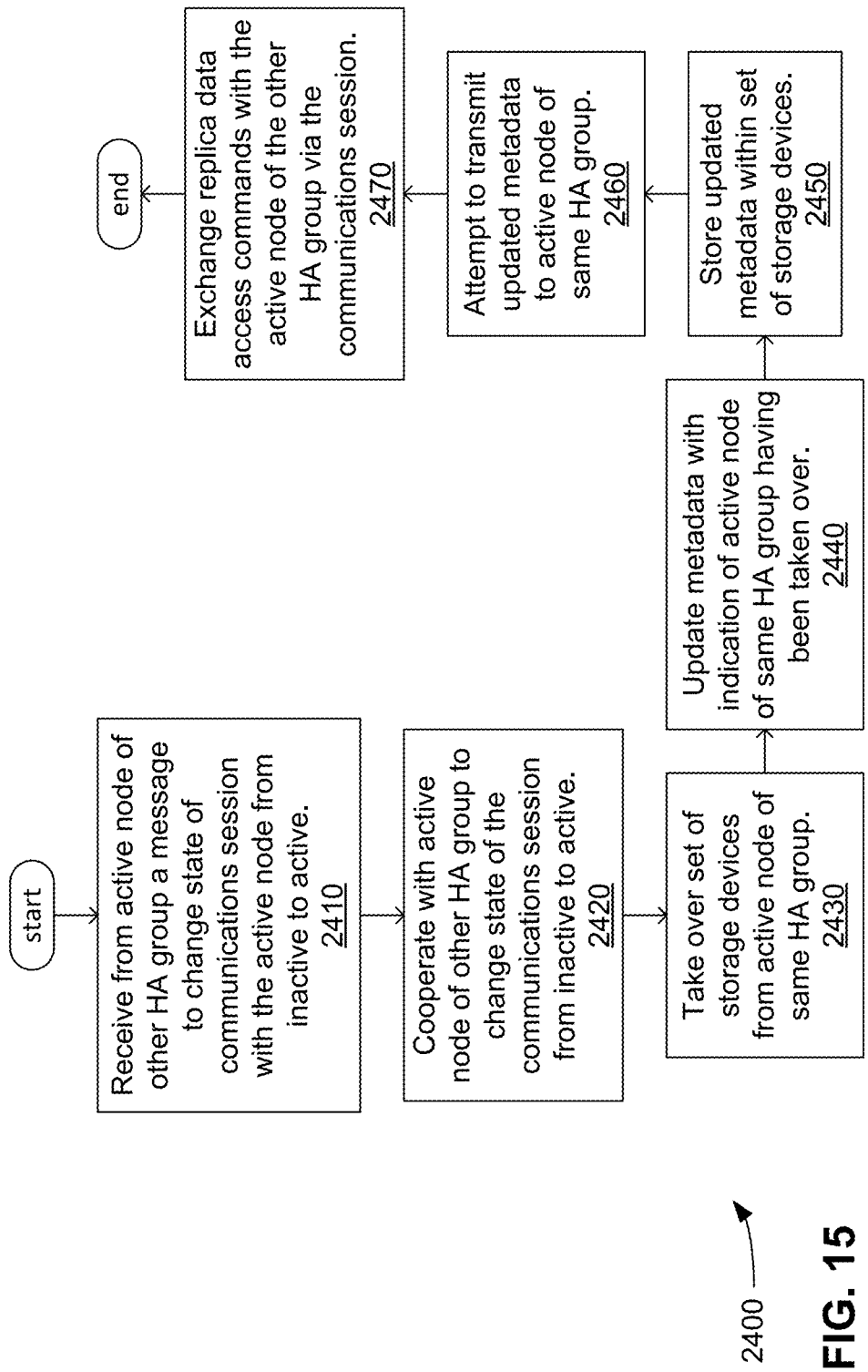
FIG. 15 illustrates a logic flow according to an embodiment.

FIG. 15 illustrates one embodiment of a logic flow 2400. The logic flow 2400 may be representative of some or all of the operations executed by one or more embodiments described herein. More specifically, the logic flow 2400 may illustrate operations performed by the processor component 650 in executing at least the control routine 640, and/or performed by other component(s) of the data storage module 600.

At 2410, a processor component of a data storage module of an inactive node of one HA group of one cluster of a storage cluster system may receive a message from an active node of another HA group of another cluster of the storage cluster system via an inactive communications session formed through an inter-cluster interconnect of the storage cluster system between the inactive node and the active node of the other HA group to change the state of the inactive communications session from inactive to active. At 2420, the processor component may cooperate with the active node of the other HA group to so change the state of that communications session. Again, examples of each of the inactive node and the active node of the other HA group may be one each of one of the nodes 300*a-d* of one of the HA groups 1600*ab* or 1600*cd* of the cluster 1300*a* of the storage cluster system 1000, and one of the nodes 300*y-z* of the HA group 1600*yz* of the cluster 1300*z* of the storage cluster system 1000, with the inter-cluster interconnect 399.

At 2430, the processor component may act to take over control of a set of storage devices from an active node of the same HA group to which the inactive node belongs. As previously discussed, the taking over of control of a set of storage devices from an active node of a HA group by an inactive node of the same HA group may be part of that inactive node becoming the new active node of that HA group.

At 2440, the processor component updates metadata stored within the inactive node (now becoming the new active node, as just discussed) to include an indication of the takeover of the active node of the same HA group (now ceasing to be the active node, as just discussed). At 2450, the processor component stores the now updated metadata within the set of storage devices over which the processor component has taken control.

At 2460, the processor component may attempt to transmit the now updated metadata to the once active node of the same HA group. However, as previously discussed, depending on the manner of the failure occurring within the once active node, the once active node may not be able to accept the now updated metadata. At 2370, the processor component exchanges replica data access commands with the active node of the other HA group via the communications session that has just been made active.

Figure 16:
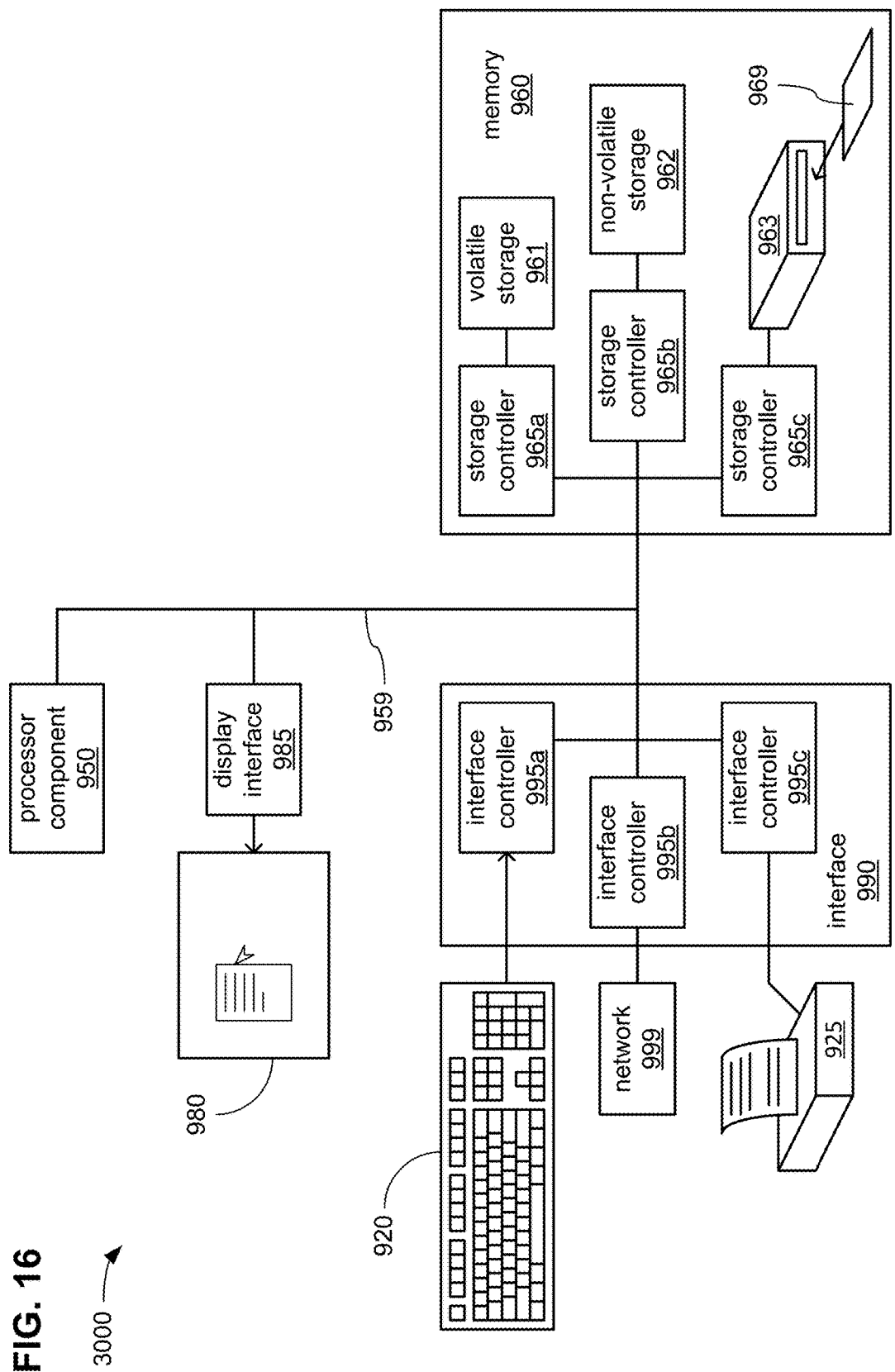
FIG. 16 illustrates a processing architecture according to an embodiment.

FIG. 16 illustrates an embodiment of an exemplary processing architecture 3000 suitable for implementing various embodiments as previously described. More specifically, the processing architecture 3000 (or variants thereof) may be implemented as part of one or more of the client devices 100, the M-modules 400, the network protocol modules 500, the data storage modules 600 or the sets of storage devices 800ab, 800cd or 800yz. It should be noted that components of the processing architecture 3000 are given reference numbers in which the last two digits correspond to the last two digits of reference numbers of at least some of the components earlier depicted and described as part of the modules 400, 500 and 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a memory 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the memory 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 450, 550 and 650) may include any of a wide variety of commercially available processors, employing any of a wide variety of technologies and implemented with one or more cores physically combined in any of a number of ways.

As previously discussed, the memory 960 (corresponding to the memories 460, 560 and 660) may be made up of one or more distinct storage devices based on any of a wide variety of technologies or combinations of technologies. More specifically, as depicted, the memory 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the memory 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for long-term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 490 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

The invention claimed is:

1. A method comprising:
establishing a first communications session between a first node and a second node, the first communications session having an active state that enables replication of data access commands between the first node and the second node;
receiving, over the first communications session, an address of a third node that is locally partnered with the second node;
utilizing the address to pre-establish a second communications session between the first node and the third node, the second communications session having an inactive state that disables replication of data access commands between the first node and the third node;
identifying a partial failure of the second node that affects a first component of the second node but not a second component of the second node;
instructing the third node to perform a partial takeover of the first component but not the second component, wherein the second component of the second node remains operable by the second node; and
changing the second communications session from the inactive state to the active state to enable replication of data access commands between the first node and the third node.

2. The method of claim 1, comprising:
identifying a failure to replicate a data access command to the second node using the first communications session; and
changing the first communications session from the active state to the inactive state to disable replication of data access commands between the first node and the second node.

3. The method of claim 1, comprising:
maintaining the establishment of the second communications session in the inactive state based upon information, regarding the third node, exchanged over the first communications session between the first node and the second node.

4. The method of claim 1, wherein the second node and the third node are connected to a storage device, the second node being an active node that actively provides client devices with access to the storage device, and the third node being an inactive node that does not provide the client devices with access to the storage device.

5. The method of claim 4, comprising:
determining that the second node has failed;
facilitating performance of a takeover of the storage device by the third node;
changing the third node to being the active node for providing the client devices with access to the storage device; and
changing the second node to being the inactive node.

6. The method of claim 5, comprising:
changing the first communications session from the active state to the inactive state that disables replication of data access commands between the first node and the second node.

7. The method of claim 1, comprising:
triggering the changing of the second communications session to the active state based upon the third node performing a takeover of a storage device accessible to the second node in response to the second node failing.

8. The method of claim 1, comprising:
automatically establishing the second communications session in the inactive state without exchanging messages between the first node and the third node.

9. The method of claim 1, comprising:
exchanging a test signal between the first node and the second node over the first communications session.

10. The method of claim 1, comprising:
exchanging a test signal between the first node and the third node over the second communications session while the second communications session is in the inactive state.

11. A machine-readable storage medium having stored thereon instructions for performing a method comprising computing code which when executed by a machine, cause the machine to:
establish a first communications session between a first node and a second node, the first communications session having an active state that enables replication of data access commands between the first node and the second node;

receive, over the first communications session, an address of a third node that is locally partnered with the second node;

utilize the address to pre-establish a second communications session between the first node and the third node, the second communications session having an inactive state that disables replication of data access commands between the first node and the third node;

identify a partial failure of the second node that affects a first component of the second node but not a second component of the second node;

instruct the third node to perform a partial takeover of the first component but not the second component, wherein the second component of the second node remains operable by the second node; and change the second communications session from the inactive state to the active state to enable replication of data access commands between the first node and the third node.

12. The machine-readable storage medium of claim 11, wherein the code causes the machine to:
change the first communications session from the active state to the inactive state to disable replication of data access commands between the first node and the second node.

13. The machine-readable storage medium of claim 11, wherein the code causes the machine to:
facilitate a message exchange between the first node and the third node over the second communications session to agree upon changing the second communications session from the inactive state to the active state.

14. The machine-readable storage medium of claim 11, wherein the second node and the third node are connected to a storage device, the second node being an active node that actively provides client devices with access to the storage device, and the third node being an inactive node that does not provide the client devices with access to the storage device.

15. The machine-readable storage medium of claim 14, wherein the code causes the machine to:
determine that the second node has failed;
facilitate performance of a takeover of the storage device by the third node;
change the third node to being the active node for providing the client devices with access to the storage device; and
change the second node to being the inactive node.

16. The machine-readable storage medium of claim 15, wherein the code causes the machine to:
change the first communications session from the active state to the inactive state that disables replication of data access commands between the first node and the second node.

17. The machine-readable storage medium of claim 11, wherein the code causes the machine to:
trigger the changing of the second communications session to the active state based upon the third node performing a takeover of a storage device accessible to the second node in response to the second node failing.

18. The machine-readable storage medium of claim 11, wherein the code causes the machine to:
automatically establish the second communications session in the inactive state without exchanging messages between the first node and the third node.

19. The machine-readable storage medium of claim 11, wherein the code causes the machine to:
maintain mutable metadata, of the second node, corresponding to a first type of data that changes at a frequency greater than a threshold; and
maintain immutable metadata, of the second node, corresponding to a second type of data that changes at a frequency less than the threshold.

20. The machine-readable storage medium of claim 19, wherein the mutable metadata comprises a network address and the immutable data comprises a file system selection and a RAID level section.

21. A computing device comprising:
a memory containing machine-readable storage medium comprising computing code having stored thereon instructions for performing a method; and
a processor coupled to the memory, the processor configured to execute the machine-readable storage medium to cause the processor to:
establish a first communications session between a first node and a second node, the first communications session having an active state that enables replication of data access commands between the first node and the second node;
receive, over the first communications session, an address of a third node that is locally partnered with the second node;
utilize the address to pre-establish a second communications session between the first node and the third node, the second communications session having an inactive state that disables replication of data access commands between the first node and the third node;
identify a partial failure of the second node that affects a first component of the second node but not a second component of the second node;
instruct the third node to perform a partial takeover of the first component but not the second component, wherein the second component of the second node remains operable by the second node; and
change the second communications session from the inactive state to the active state to enable replication of data access commands between the first node and the third node.

22. The computing device of claim 21, wherein the computing code causes the processor to:
identify a failure to replicate a data access command to the second node using the first communications session; and
change the first communications session from the active state to the inactive state to disable replication of data access commands between the first node and the second node.

23. The computing device of claim 21, wherein the computing code causes the processor to
maintain the establishment of the second communications session in the inactive state based upon information, regarding the third node, exchanged over the first communications session between the first node and the second node.

24. The computing device of claim 21, wherein the second node and the third node are connected to a storage device, the second node being an active node that actively provides client devices with access to the storage device, and the third node being an inactive node that does not provide the client devices with access to the storage device.

25. The computing device of claim 24, wherein the computing code causes the processor to:
- determine that the second node has failed;
- facilitate performance of a takeover of the storage device by the third node;
- change the third node to being the active node for providing the client devices with access to the storage device; and
- change the second node to being the inactive node.

26. The computing device of claim 25, wherein the computing code causes the processor to:
- change the first communications session from the active state to the inactive state that disables replication of data access commands between the first node and the second node.

27. The computing device of claim 21, wherein the computing code causes the processor to:
- trigger the changing of the second communications session to the active state based upon the third node performing a takeover of a storage device accessible to the second node in response to the second node failing.

28. The computing device of claim 21, wherein the computing code causes the processor to:
- automatically establish the second communications session in the inactive state without exchanging messages between the first node and the third node.

29. The computing device of claim 21, wherein the computing code causes the processor to:
- exchange a test signal between the first node and the second node over the first communications session.

30. The computing device of claim 21, wherein the code causes the processor to:
- exchange a test signal between the first node and the third node over the second communications session while the second communications session is in the inactive state.

* * * * *